(12) United States Patent
Ikriannikov et al.

(10) Patent No.: US 9,331,499 B2
(45) Date of Patent: May 3, 2016

(54) SYSTEM, METHOD, MODULE, AND ENERGY EXCHANGER FOR OPTIMIZING OUTPUT OF SERIES-CONNECTED PHOTOVOLTAIC AND ELECTROCHEMICAL DEVICES

(75) Inventors: Alexandr Ikriannikov, Castro Valley, CA (US); Anthony J. Stratakos, St. Helena, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 1124 days.

(21) Appl. No.: 13/211,984

(22) Filed: Aug. 17, 2011

(65) Prior Publication Data

US 2012/0043923 A1    Feb. 23, 2012

Related U.S. Application Data

(60) Provisional application No. 61/374,991, filed on Aug. 18, 2010.

(51) Int. Cl.
*H02J 7/00* (2006.01)
*H02J 1/10* (2006.01)

(52) U.S. Cl.
CPC .............. *H02J 7/0014* (2013.01); *H02J 1/10* (2013.01); *Y10T 307/707* (2015.04)

(58) Field of Classification Search
CPC ........... H02J 7/0014; H02J 7/022; H02J 7/35; H02J 1/10
USPC .................................. 320/101, 103, 140, 166
See application file for complete search history.

(56) References Cited

U.S. PATENT DOCUMENTS

| | | | |
|---|---|---|---|
| 4,649,334 | A | 3/1987 | Nakajima |
| 6,020,729 | A | 2/2000 | Stratakos et al. |
| 6,064,178 | A | 5/2000 | Miller |
| 6,160,441 | A | 12/2000 | Stratakos et al. |
| 6,225,795 | B1 | 5/2001 | Stratakos et al. |
| 6,262,558 | B1 | 7/2001 | Weinberg |

(Continued)

FOREIGN PATENT DOCUMENTS

| | | |
|---|---|---|
| EP | 2 280 469 | 2/2011 |
| JP | 11103538 | 4/1999 |

(Continued)

OTHER PUBLICATIONS

Algora et al., "III-V Multijunction Solar Cells for Ultra-High Concentration Photovoltaics," PVSC 2009, pp. 1571-1575.

(Continued)

*Primary Examiner* — Edward Tso
*Assistant Examiner* — Aaron Piggush
(74) *Attorney, Agent, or Firm* — Lathrop & Gage LLP

(57) ABSTRACT

An energy transfer device for solar power systems operates to draw power from high-producing photovoltaic devices and apply that power across low-producing photovoltaic devices. An embodiment is a self-regulating energy exchanger using bidirectional DC-DC converters that operates to maintain uniform voltage across each series-connected photovoltaic device. An alternative embodiment is an energy exchanger that is controlled to maintain each of several series-connected photovoltaic devices at a maximum power point by drawing power from high-performing devices and applying that power across low-performing devices to provide uniform current among series-connected photovoltaic devices.

40 Claims, 27 Drawing Sheets

(56) References Cited

U.S. PATENT DOCUMENTS

| | | | |
|---|---|---|---|
| 6,278,264 | B1 | 8/2001 | Burstein et al. |
| 6,362,986 | B1 | 3/2002 | Schultz et al. |
| 6,395,972 | B1 | 5/2002 | Tran et al. |
| 6,445,244 | B1 | 9/2002 | Stratakos et al. |
| 6,462,522 | B2 | 10/2002 | Burstein et al. |
| 6,844,739 | B2 | 1/2005 | Kasai et al. |
| 6,984,970 | B2 | 1/2006 | Capel |
| 7,068,017 | B2 | 6/2006 | Willner et al. |
| 7,126,053 | B2 | 10/2006 | Kurokami et al. |
| 7,514,900 | B2 | 4/2009 | Sander et al. |
| 7,989,953 | B1 | 8/2011 | Jergovic et al. |
| 8,158,877 | B2 | 4/2012 | Klein et al. |
| 2004/0113586 | A1 | 6/2004 | Chen |
| 2004/0135545 | A1* | 7/2004 | Fowler et al. .......... 320/118 |
| 2005/0057214 | A1 | 3/2005 | Matan |
| 2005/0057215 | A1 | 3/2005 | Matan |
| 2005/0121067 | A1 | 6/2005 | Toyomura et al. |
| 2005/0139258 | A1* | 6/2005 | Liu et al. .......... 136/293 |
| 2005/0172995 | A1 | 8/2005 | Rohrig et al. |
| 2006/0001406 | A1 | 1/2006 | Matan |
| 2006/0174939 | A1 | 8/2006 | Matan |
| 2006/0185727 | A1 | 8/2006 | Matan |
| 2007/0212596 | A1* | 9/2007 | Nebrigic et al. .......... 429/61 |
| 2007/0228838 | A1 | 10/2007 | Delmerico et al. |
| 2007/0273351 | A1 | 11/2007 | Matan |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0143188 | A1* | 6/2008 | Adest et al. .......... 307/82 |
| 2008/0179949 | A1 | 7/2008 | Besser et al. |
| 2008/0191560 | A1 | 8/2008 | Besser et al. |
| 2008/0191675 | A1 | 8/2008 | Besser et al. |
| 2008/0236648 | A1 | 10/2008 | Klein et al. |
| 2008/0303503 | A1 | 12/2008 | Wolfs |
| 2009/0020151 | A1 | 1/2009 | Fornage |
| 2009/0283128 | A1 | 11/2009 | Zhang et al. |
| 2009/0284078 | A1 | 11/2009 | Zhang et al. |
| 2009/0284232 | A1 | 11/2009 | Zhang et al. |
| 2009/0284240 | A1 | 11/2009 | Zhang et al. |
| 2009/0284998 | A1 | 11/2009 | Zhang et al. |
| 2010/0002349 | A1 | 1/2010 | LaScala et al. |
| 2010/0195361 | A1 | 8/2010 | Stem |
| 2010/0207455 | A1 | 8/2010 | Erickson, Jr. et al. |
| 2010/0213897 | A1 | 8/2010 | Tse |
| 2010/0253150 | A1 | 10/2010 | Porter et al. |
| 2010/0265747 | A1 | 10/2010 | Egiziano et al. |
| 2010/0288327 | A1 | 11/2010 | Lisi et al. |
| 2010/0305770 | A1 | 12/2010 | Bhowmik et al. |
| 2010/0326492 | A1 | 12/2010 | Tan et al. |
| 2010/0327659 | A1 | 12/2010 | Lisi et al. |
| 2011/0062784 | A1 | 3/2011 | Wolfs |
| 2011/0082600 | A1 | 4/2011 | Capel |
| 2011/0115436 | A1 | 5/2011 | Zhang et al. |
| 2011/0285375 | A1 | 11/2011 | Deboy |
| 2012/0043818 | A1 | 2/2012 | Stratakos et al. |
| 2012/0119746 | A1 | 5/2012 | Macris |
| 2012/0212064 | A1 | 8/2012 | Spanoche et al. |

FOREIGN PATENT DOCUMENTS

| | | |
|---|---|---|
| JP | 2000112545 | 4/2000 |
| KR | 2012-0075970 | 7/2012 |
| WO | WO 2008/097591 | 8/2008 |
| WO | WO 2009/035995 | 3/2009 |

OTHER PUBLICATIONS

Baughman et al., "Double-Tiered Capacitive Shuttling Method for Balancing Series-Connected Batteries," Vehicle Power and Propulsion, 2005 IEEE Conference, Sep. 2005, 5 pages.

Cornfeld et al., "The 3J-IMM Solar Cell: Pathways for Insertion into Space Power Systems," PVSC 2009, Jun. 2009, pp. 954-959.

Erickson, Robert W., "Future of Power Electronics for Photovoltaics," Applied Power Electronics Conference and Exposition, Feb. 18, 2009, 23 pages.

Fahrenbruch, S., "Active Bypass Diodes," Intersolar 2010, Jul. 14, 2010, 26 pages.

Griggs et al., "p-n. Junction Heterostructure Device Physics Model of a Four Junction Solar Cell," Proc. SPIE 6339, Sep. 2006, 8 pages.

Hopkins et al., "The Use of Equalizing Converters for Serial Charging of Long Battery Strings," APEC 1991, pp. 493-498, Mar. 1991.

McDonald, M., "Spectral Efficiency Scaling of Performance Ratio for Multijunction Cells," 34 IEEE photovoltaic Specialist Conference, 2009, pp. 1215-1220.

Moore et al., "A Review of Cell Equalization Methods for Lithium Ion and Lithium Polymer Battery Systems," SAE Publication 2001-01-0959, 2001, 5 pages.

Pulvirenti et al., "DC-DC Converters with MPPT control for Photovoltaic Panels," 25th EU PVSEC/WCPEC-5, Sep. 7, 2010, 8 pages.

Pulvirenti et al., poster, "DC-DC Converters with MPPT control for Photovoltaic Panels," 25th EU PVSEC/WCPEC-5, Sep. 7, 2010, 1 page.

Saha et al., "ST and Solar Photovoltaic," date unknown, but Applicant notes that www.archive.org suggests that this document was posted at least as of Jan. 19, 2010, 22 pages.

Seyrling et al., "Development of Multijunction Thin Film Solar Cells," PVSC 2009, Jun. 2009, pp. 622-625.

Shvarts et al., "Nonlinearity Effects in III-V Multi-Junction Solar Cells," PVSC 2009, Jun. 2009, pp. 1412-1417.

ST SPV1020 datasheet, Interleaved DC-DC boost converter with built-in MPPT algorithm, Copyright 2010, 18 pages.

Stratakos, A., "High-Efficiency Low-Voltage DC-Dc Conversion for Portable Applications," 1998, 245 pages.

Texas instruments by76PL102 datasheet, "PowerLAN Dual-Cell Li-Ion Battery Monitor with PowerPump Cell Balancing," Copyright 2008, 16 pages.

TIGO Energy Module Maximizer-EP (MM-EP) Data Sheet, Copyright 2009, 2 pages.

Varonides et al., "III-V Triple Junctions and MQW-Fine Turing at 1 EV in Synergy for High Efficiency Solar Cells," PVSC 2009, pp. 282-286.

Wang, M. W., "Novel CdSe-based PV Structure for High Efficiency CdSe/CIGS Tandem Solar Cells," PVSC 2009, pp. 489-493.

Web page, "National Semi SolarMagic Technology—greenpowerZone," retrieved from www.en-genius.net/site/zones/greenpowerZone/product_reviews/grnpowp_071408 on Jun. 29, 2009, 3 pages.

Web page, "SolarMagic Power Optimizers and Blocking Diodes Maximize Solar PV Panel Energy," retrieved from www.solarmagic.com/products on Jun. 29, 2009, 2 pages.

Wilcox et al., "A Case Study of System Power Efficiency Loss Mechanisms in a Multijunction, Spectral Splitting, Concentrator Solar Cell System," PVSC 2009, pp. 616-621.

Wolfs et al., "Distributed Maximum Power Tracking for High Performance Vehicle Solar Arrays," AUPEC 2004, Sep. 2004, 6 pages.

Wolfs et al., Abstract, "A Single Cell Maximum Power Point Tracking Converter without a Current Sensor for High Performance Vehicle Solar Arrays," PESC 05, Jun. 2005, 1 page.

Zhao et al., Development of Ultra-Thin One-Side Contacted GaAs Solar Cells for Mechanically Stacked Multi-Junction Solar Cells, PVSC 2009, Jun. 2009, pp. 202-205.

Sullivan, C.R. et al., "A high-efficiency maximum power point tracker for photovoltaic arrays in a solar-powered race vehicle" Abstract, Power Electronics Specialists Conference, 1993. PESC '93 Record., 24th Annual IEEE, 1 page.

English-language summary of first Office Action in related Taiwanese Patent Application No. 100129638, 2 pages.

PCT/US11/48320 International Search Report & Written Opinion mailed Apr. 9, 2012, 12 pages.

PCT/US11/48324 International Search Report & Written Opinion mailed Apr. 9, 2012, 11 pages.

PCTUS1148321 International Search Report & Written Opinion mailed Apr. 9, 2012, 11 pages.

PCTUS1148322 International Search Report & Written Opinion mailed Apr. 9, 2012, 10 pages.

ABS Alaskan, Inc., "Diodes in Solar Arrays," copyright 2001, 2 pages.

(56) References Cited

OTHER PUBLICATIONS

Al-Atrash, H., "Analysis and Design of a Modular Solar-Fed Fault-Tolerant Power System with Maximum Power Point Tracking," 2005, 144 pages.

Alonso et al., "Cascaded H-Bridge Multilevel Converter for Grid Connected Photovoltaic Generators with Independent Maximum Power Point Tracking of each Solar Array," PESC 2003, Jun. 15-19, 2003, pp. 731-735.

Barchowsky et al., "A Comparative Study of MPPT Methods for Distributed Photovoltaic Generation," PES 2012, Jan. 16-20, 2012, pp. 1-7.

Dondi et al., Modeling and Optimization of a Solar Energy Harvester System for Self-Powered Wireless Sensor Networks, IEEE Trans. on Industrial Electronics, Jul. 2008, pp. 2759-2766.

Ghaisari et al., "An MPPT Controller Design for Photovoltaic (PV) Systems Based on the Optimal Voltage Factor Tracking," 2007 IEEE Canada Electrical Power Conference, Oct. 25-26, 2007, pp. 359-362.

Kjaer, et al. "A Review of Single-Phase Grid-Connected Inverters for Photovoltaic Modules," IEEE Trans. on Industry Applications, Sep. 19, 2005, pp. 1292-1306.

Koutroulis et al., Development of a Microcontroller-Based Photovoltaic Maximum Power Point Tracking Control System, IEEE Trans. on Power Electronics, Jan. 2001, pp. 46-54.

Lindgren, B., "A Power Converter for Photovoltaic Applications," 2000, 69 pages.

Martin et al., "Renewable Energy Storage Analysis for Irrigation and Residential Applications in Colorado's San Luis Valley," Aug. 30, 2006, 20 pages.

Noguchi et al., "Short-Current Pulse-Based Maximum-Power-Point Tracking Method for Multiple Photovoltaic-and-Converter Module System," IEEE Transactions on Industrial Electronics, Feb. 2002, pp. 217-223.

Pongratananukul, N., "Analysis and Simulation Tools for Solar Array Power Systems," 2005, 125 pages.

Shmilovitz et al., "Distributed Maximum Power Point Tracking in Photovoltaic Systems—Emerging Architectures and Control Methods," Automatika vol. 53-1012 No. 2, Jun. 2012, pp. 142-155.

Shannon, J., Shrink Solar Panel Size by Increasing Performance, copyright 2006, 2 pages.

Tan, Y. T., "Impact on the Power System With a Large Penetration of Photovoltaic Generation," 2004, 160 pages.

Walker et al., "Cascaded DC-DC Converter Connection of Photovoltaic Modules," IEEE Trans. on Power Electronics, Jul. 2004, pp. 1130-1139.

\* cited by examiner

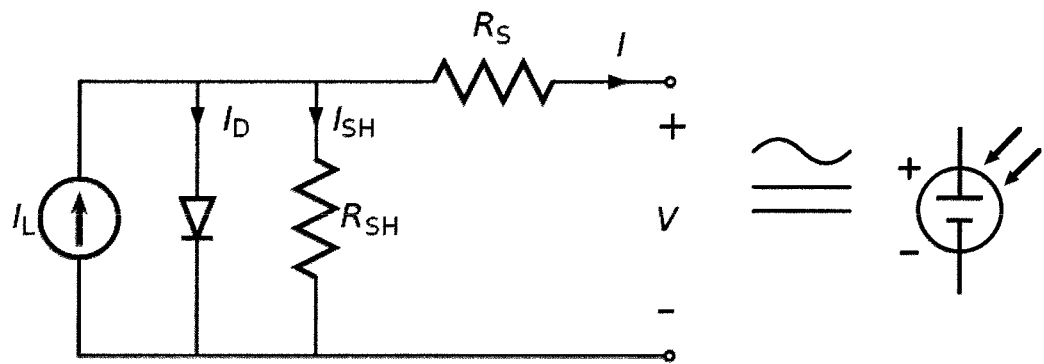
Fig. 1
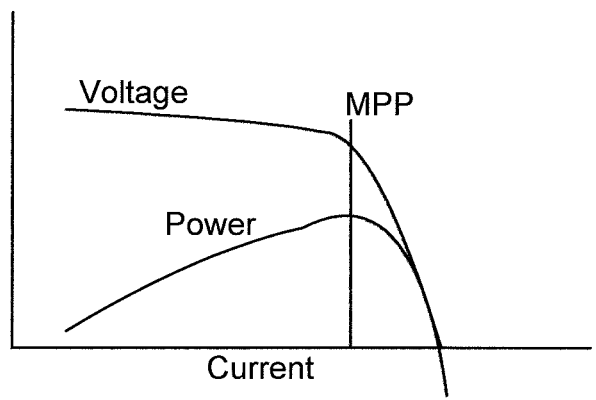
Fig. 2

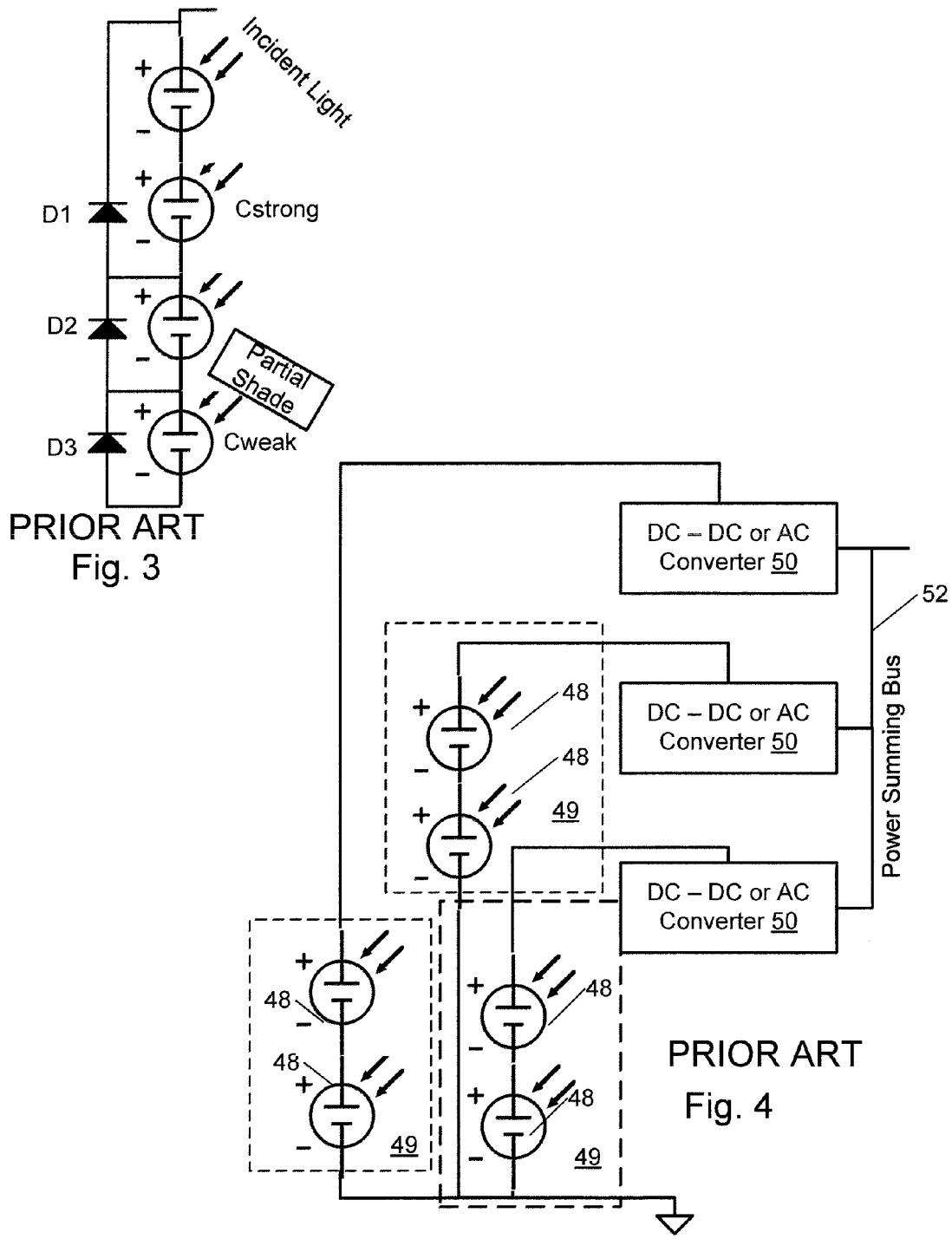
PRIOR ART
Fig. 3
PRIOR ART
Fig. 4

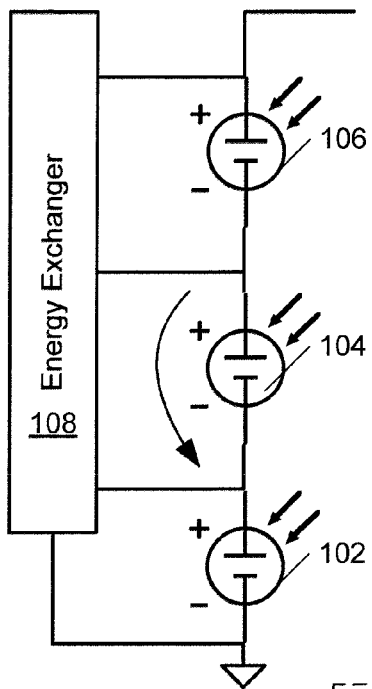
Fig. 5
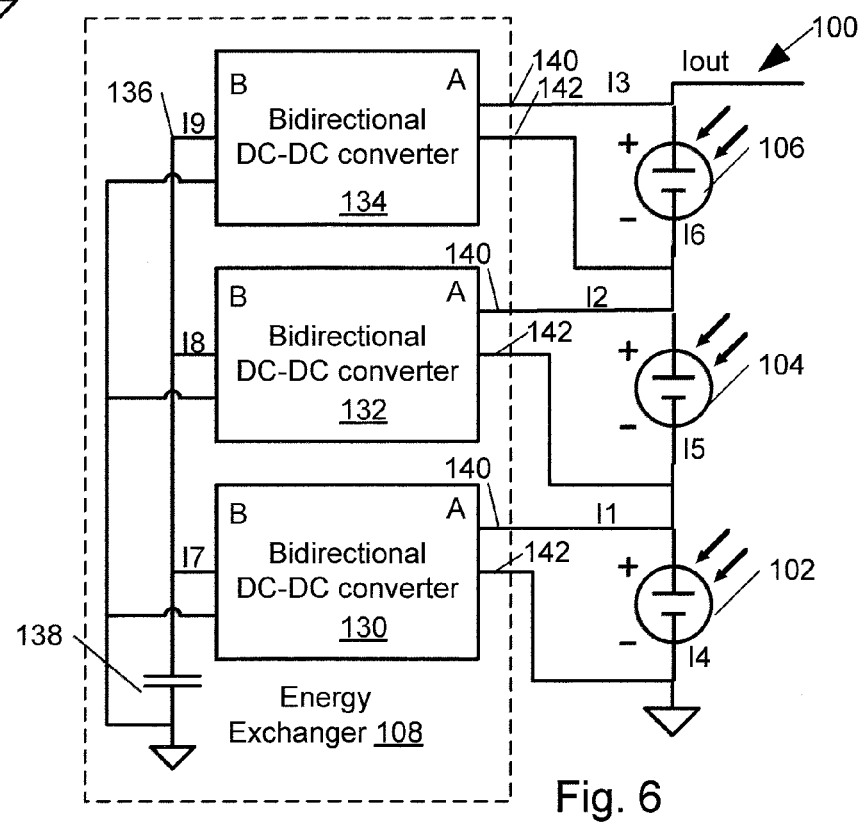
Fig. 6

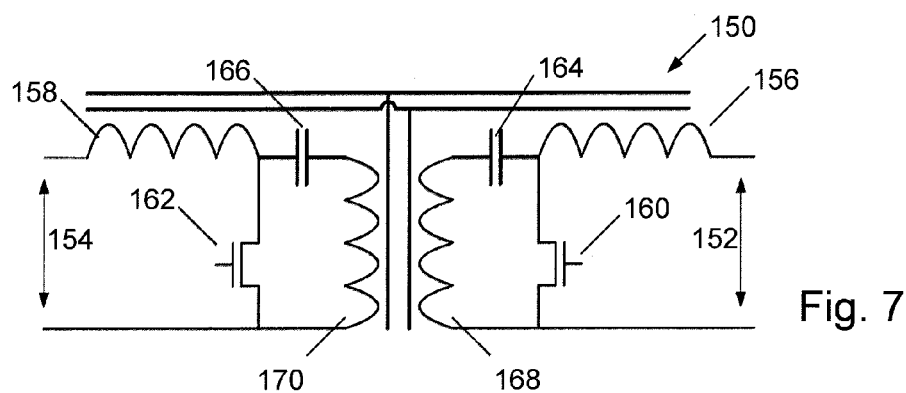
Fig. 7
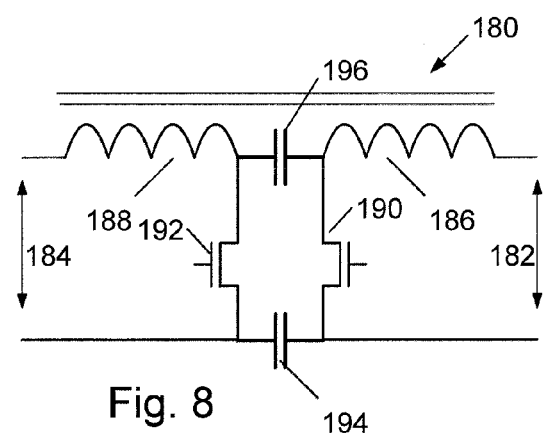
Fig. 8

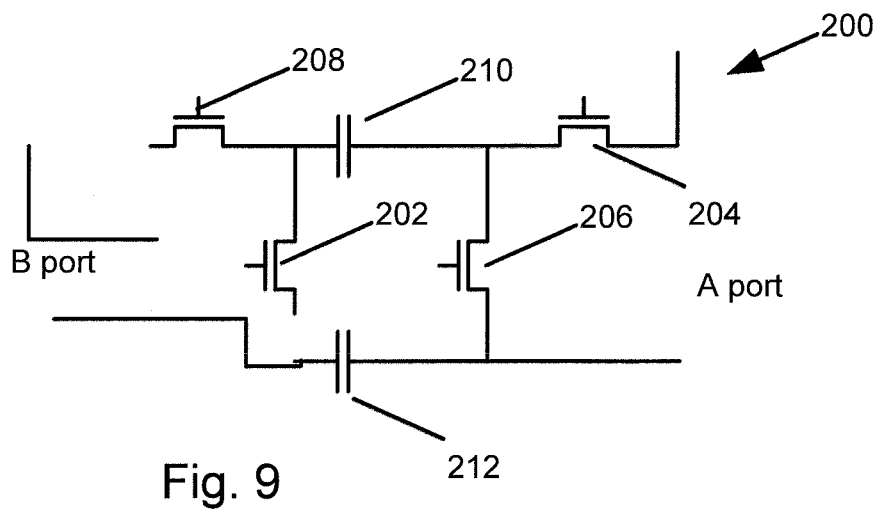
Fig. 9
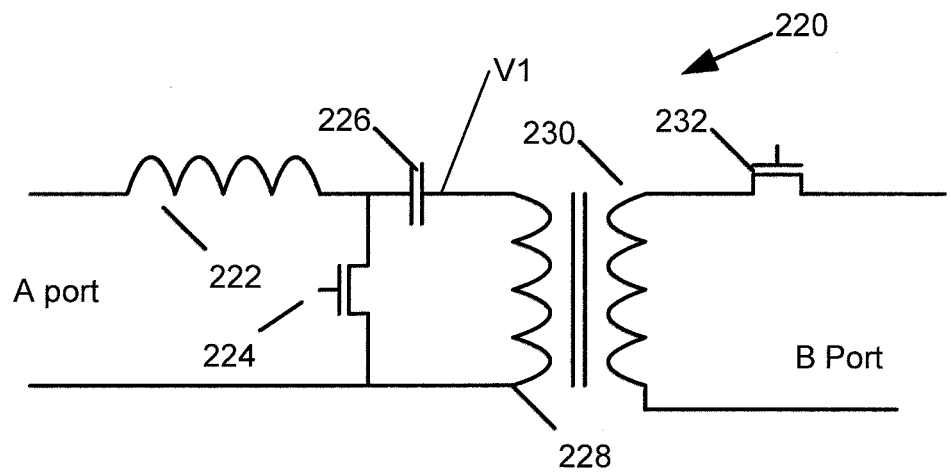
Fig. 10

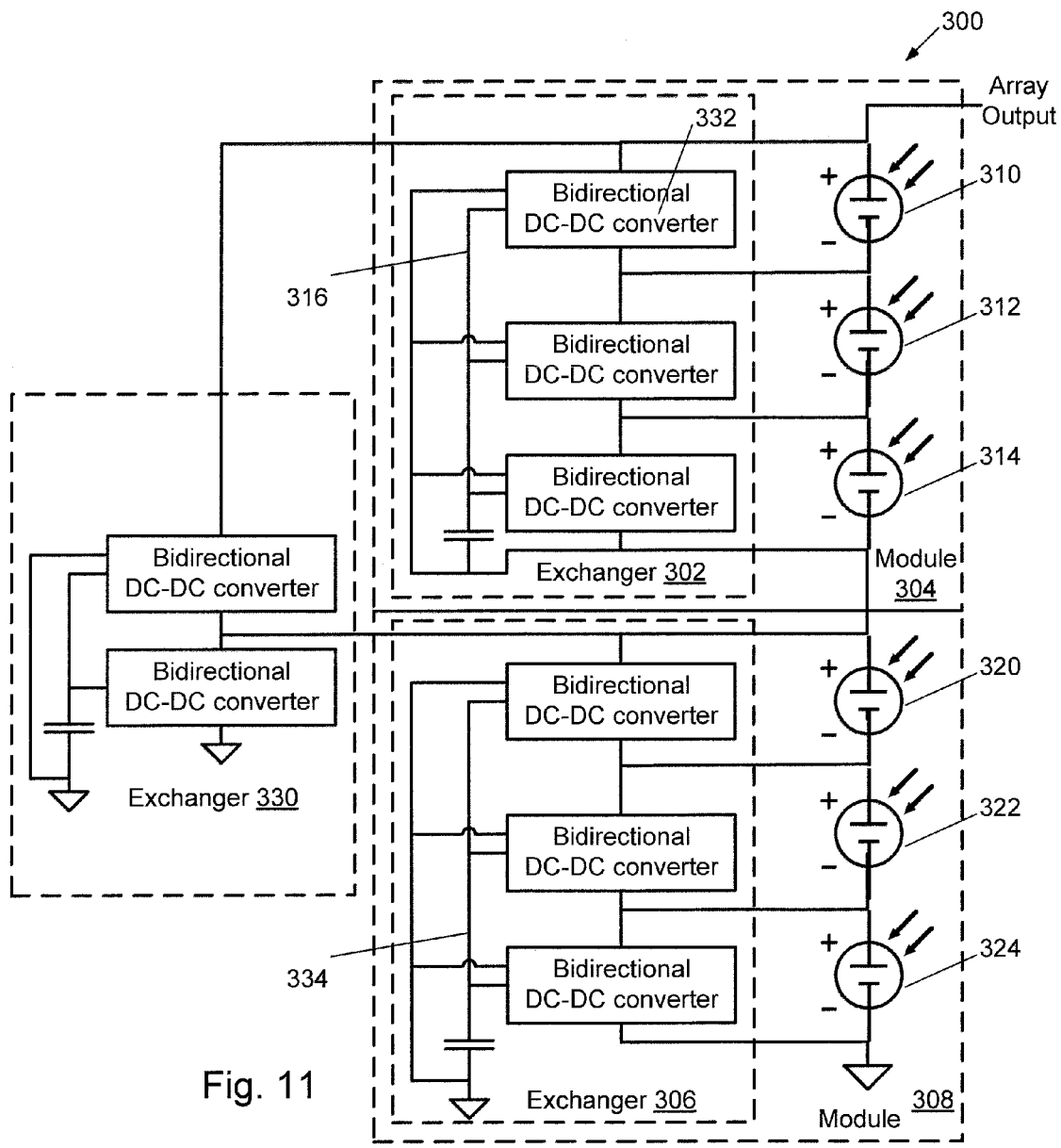
Fig. 11

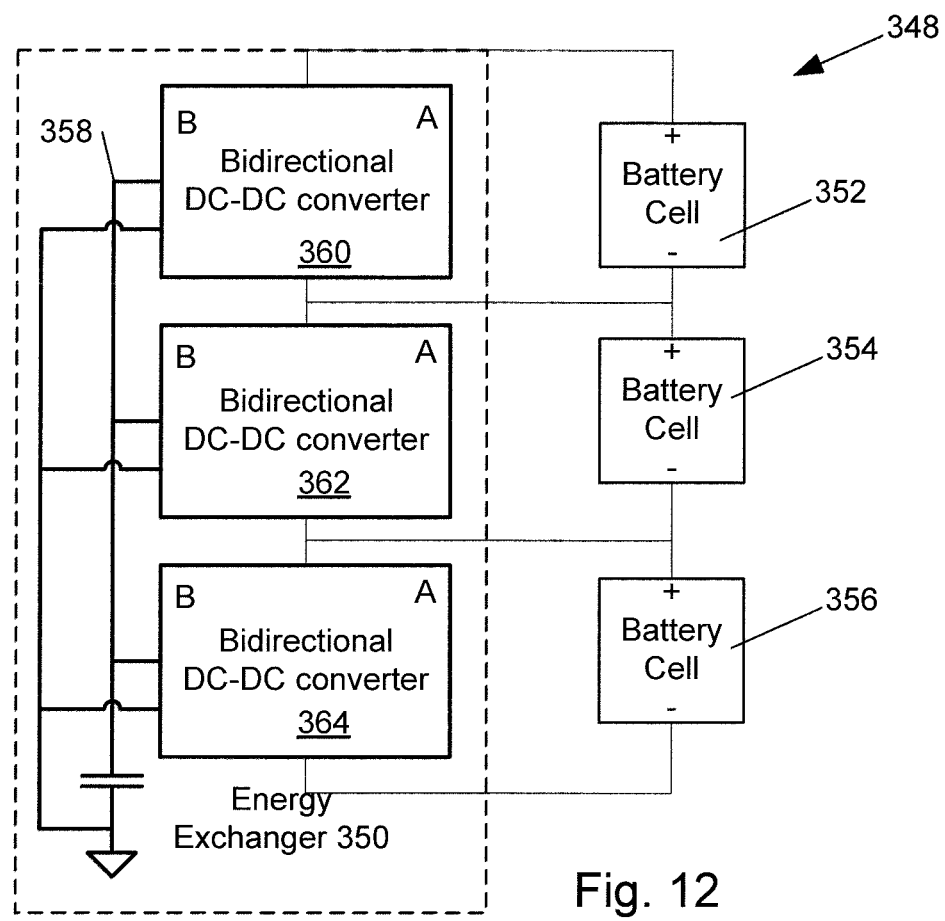
Fig. 12

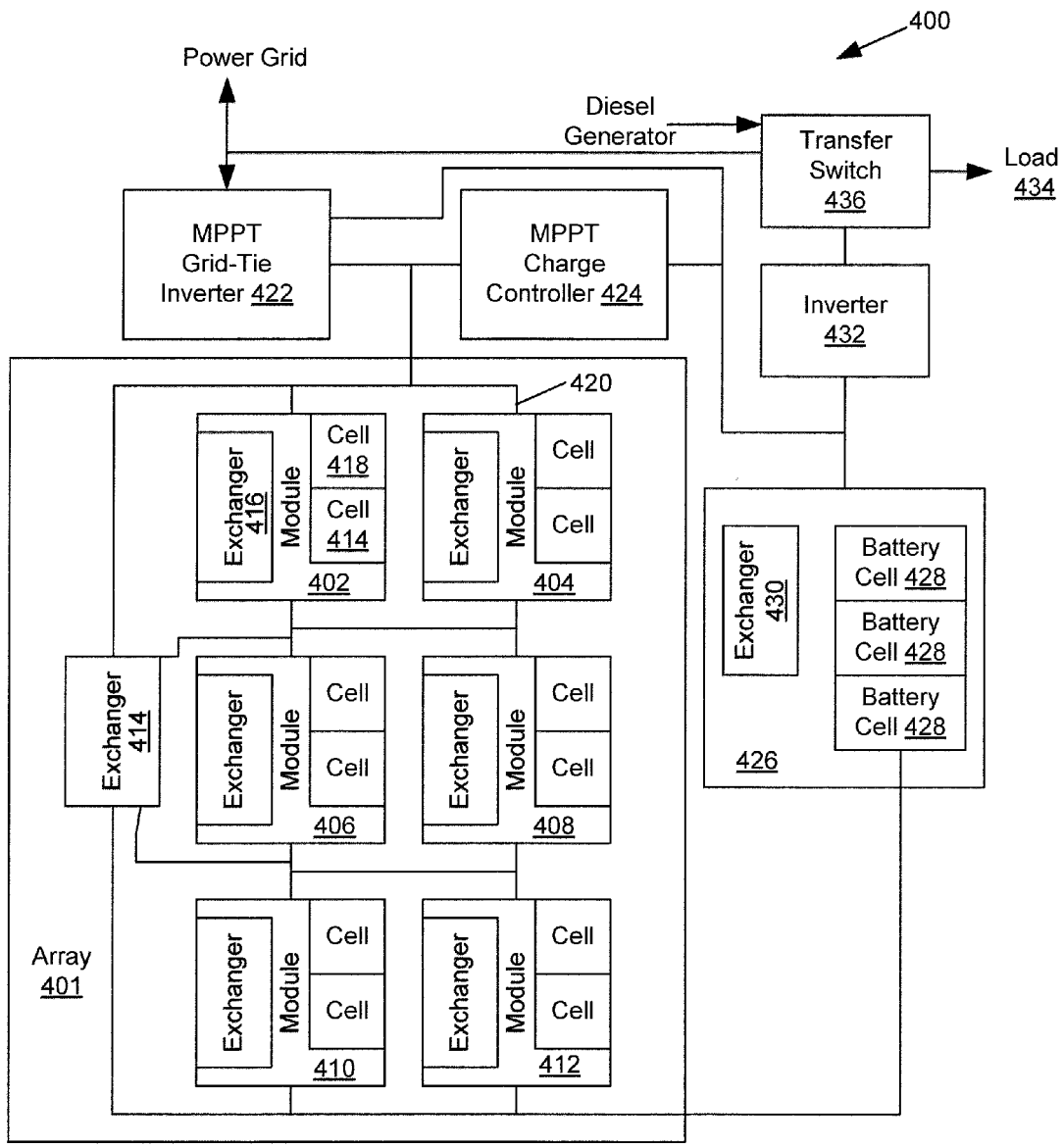
Fig. 13

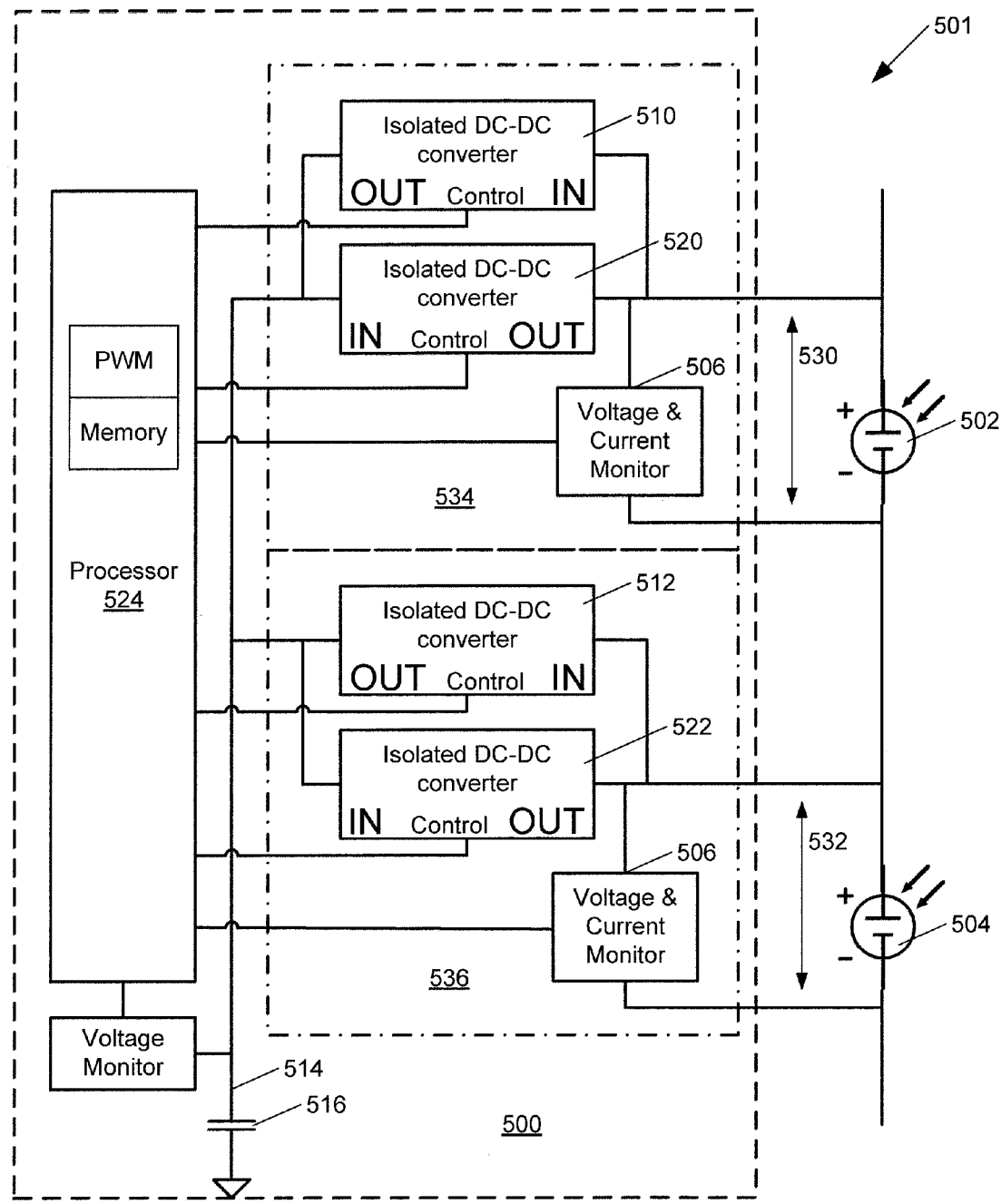
Fig. 14

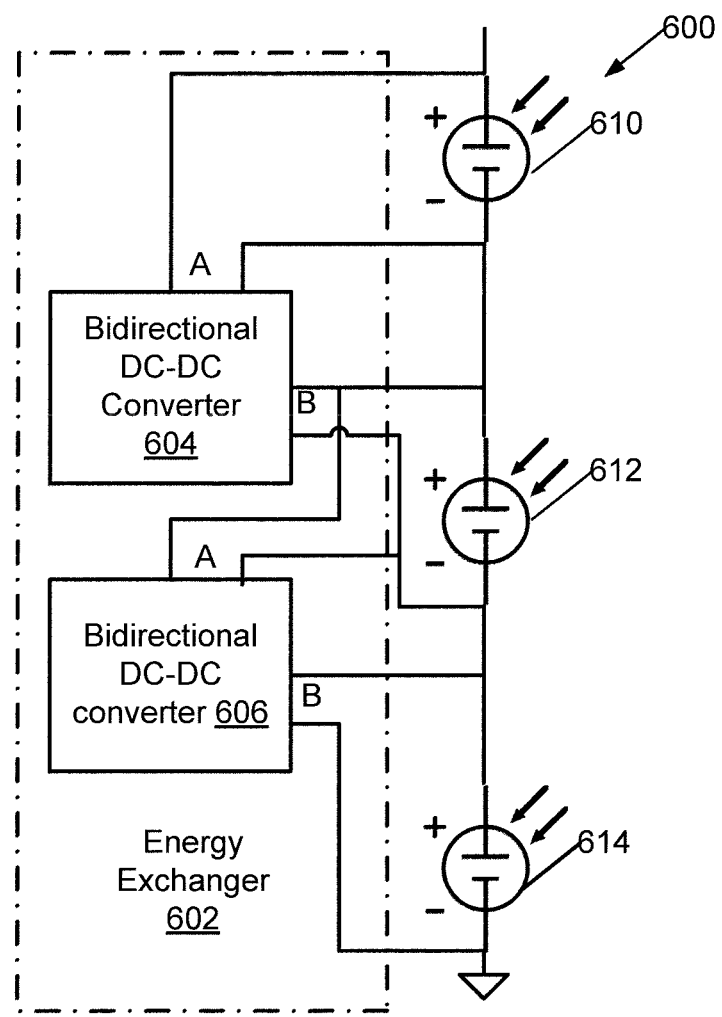
Fig. 15

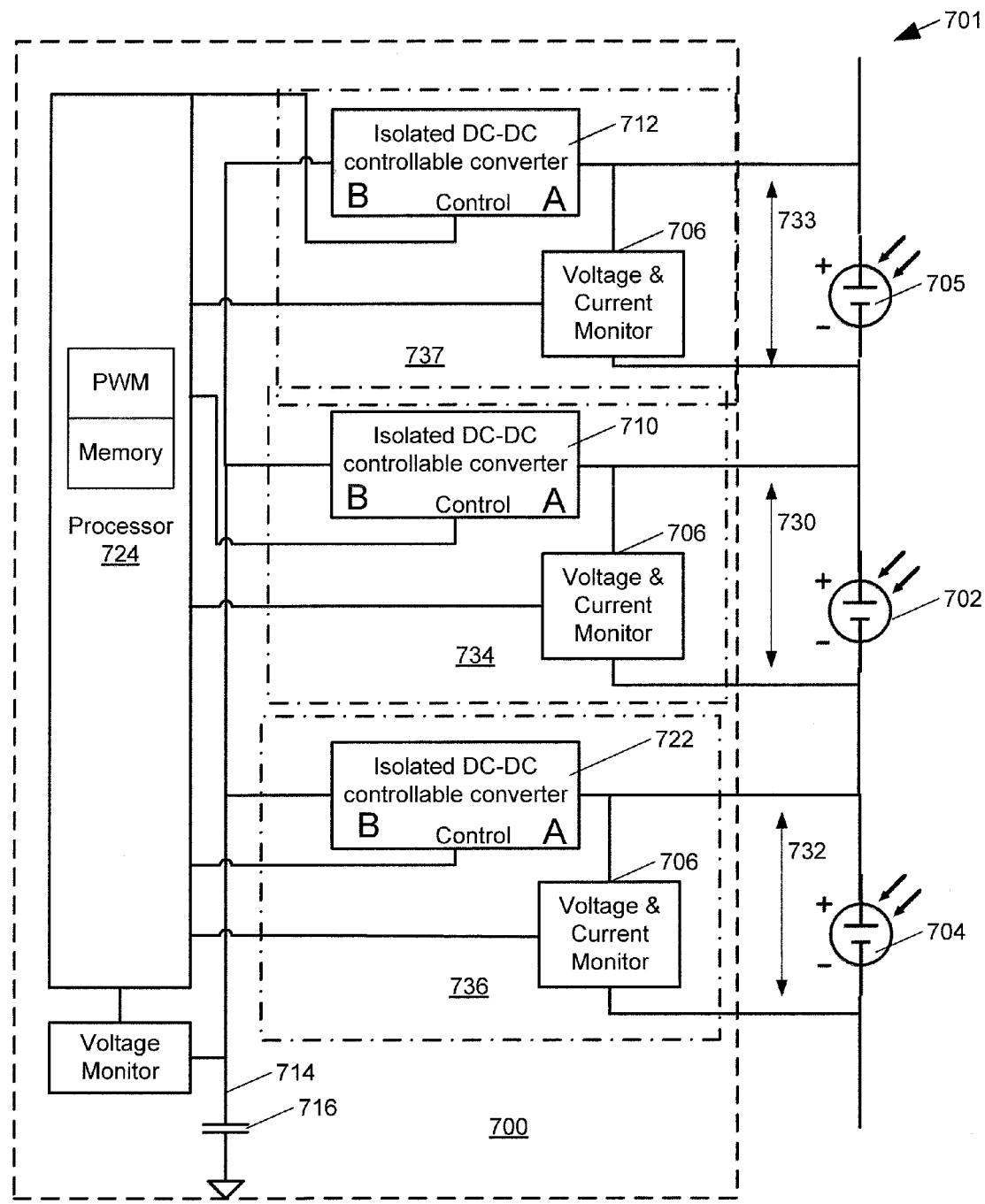
Fig. 16

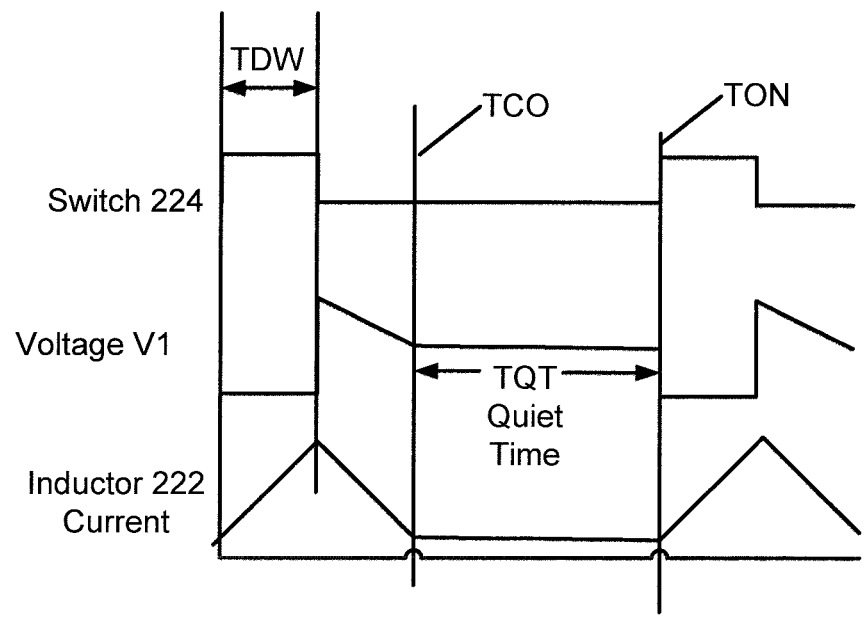
Fig. 17
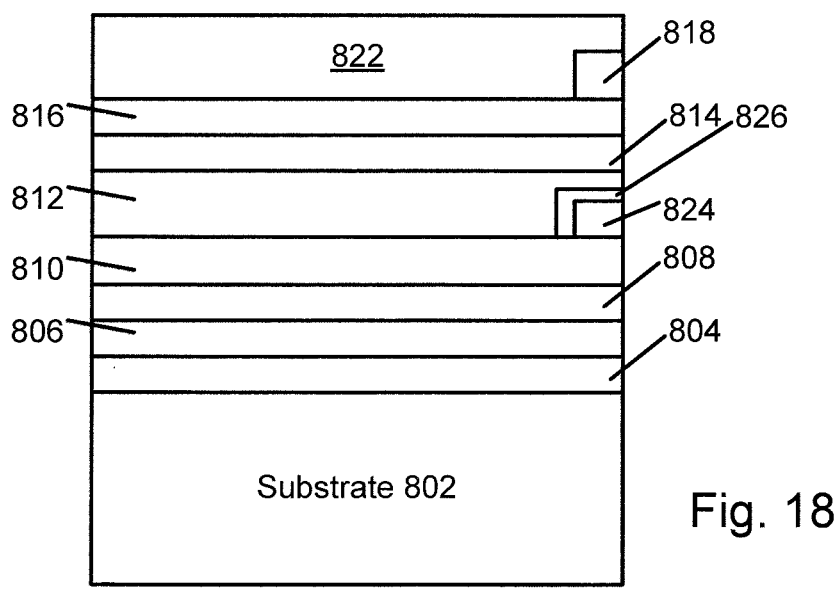
Fig. 18

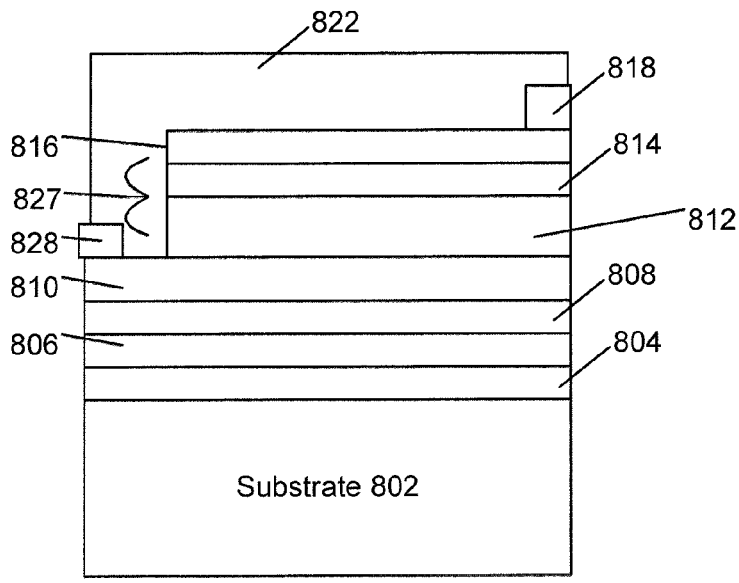
Fig. 18A
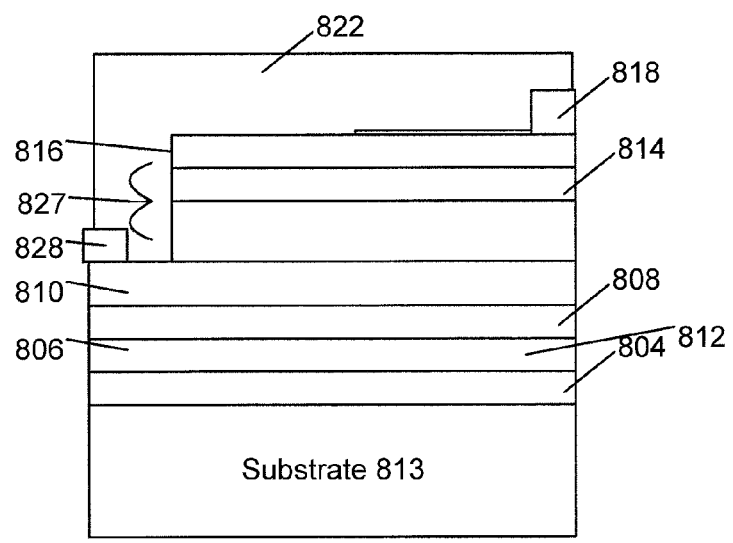
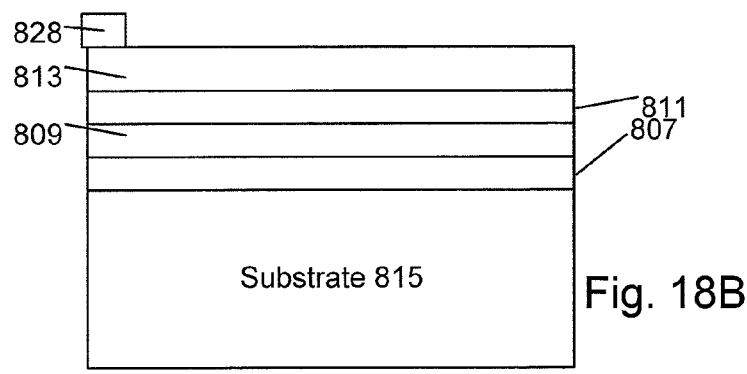
Fig. 18B

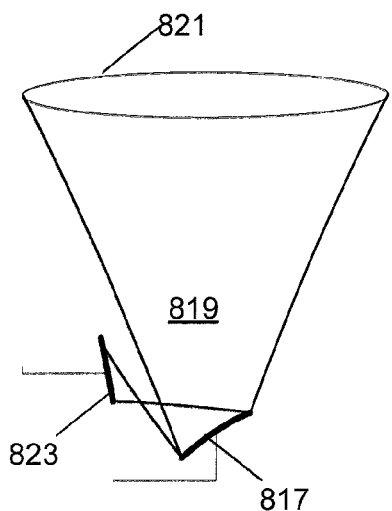
Fig. 18C
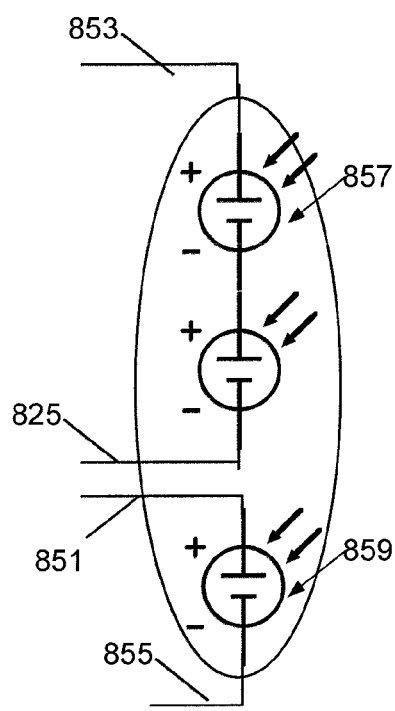
Fig. 18D
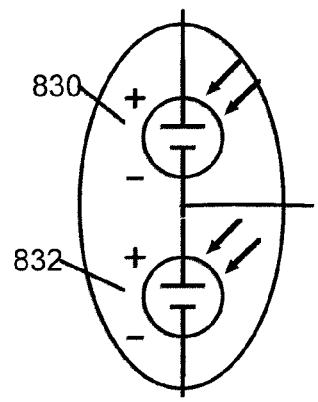
Fig. 19

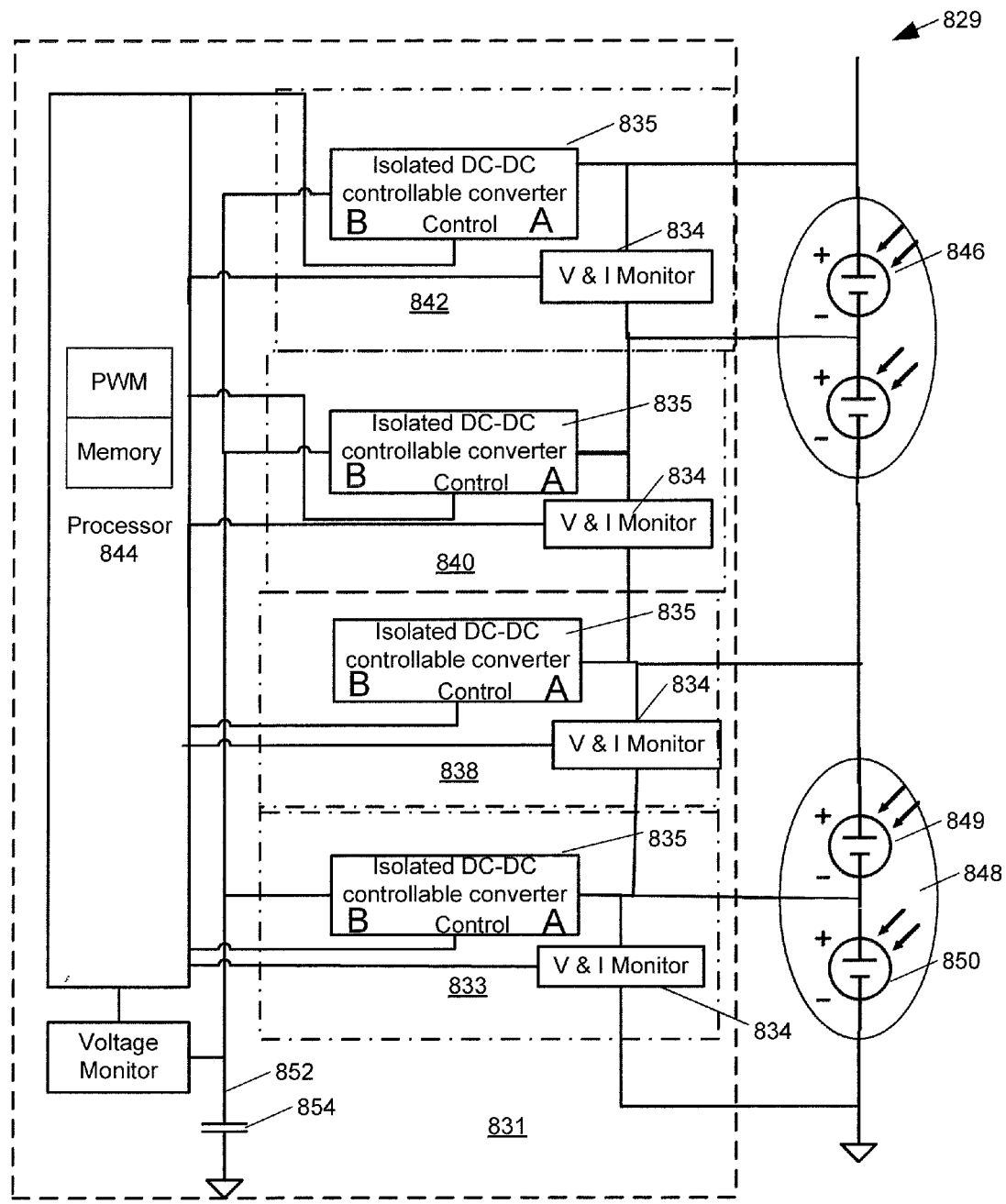
Fig. 20

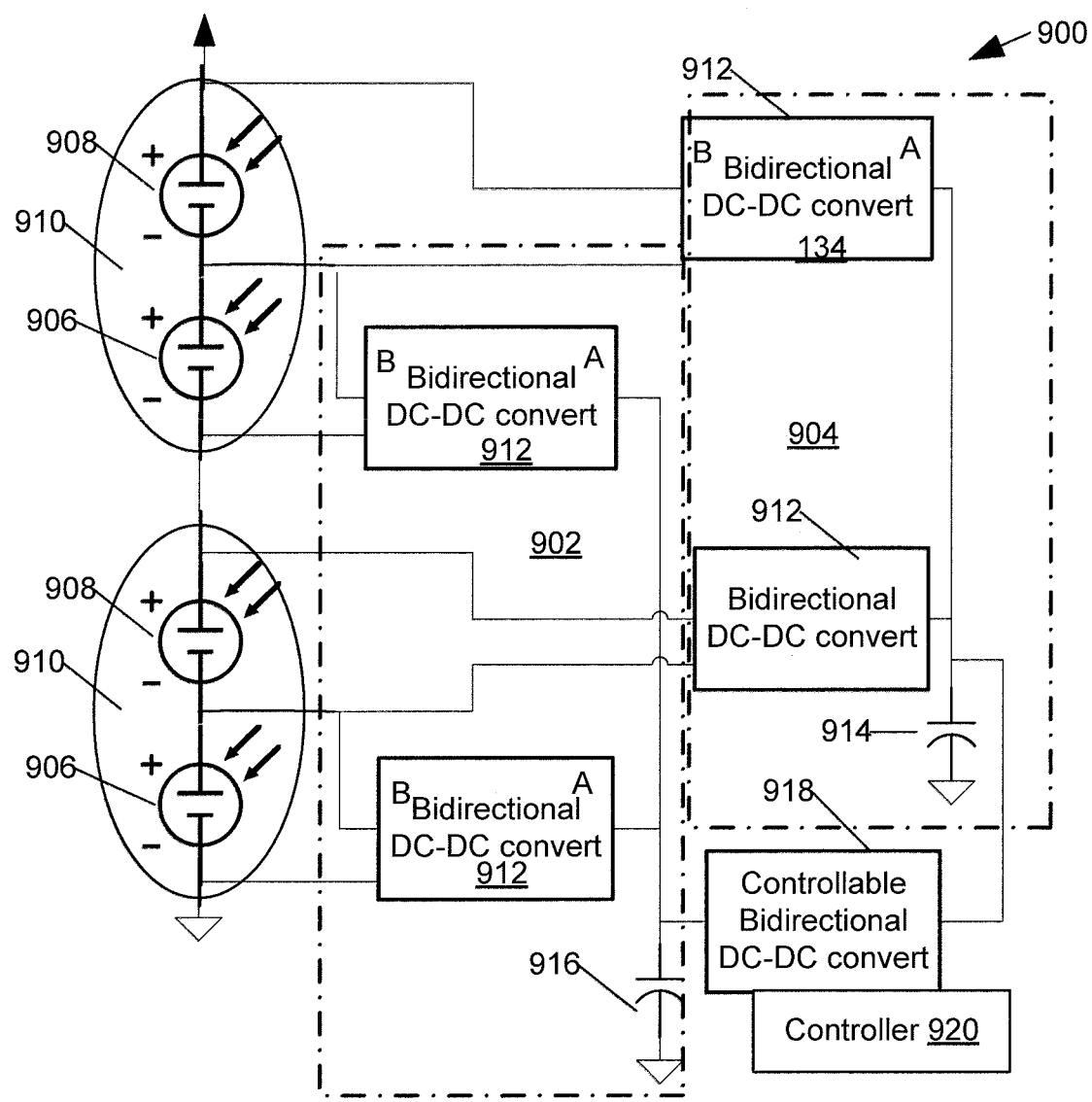
Fig. 21

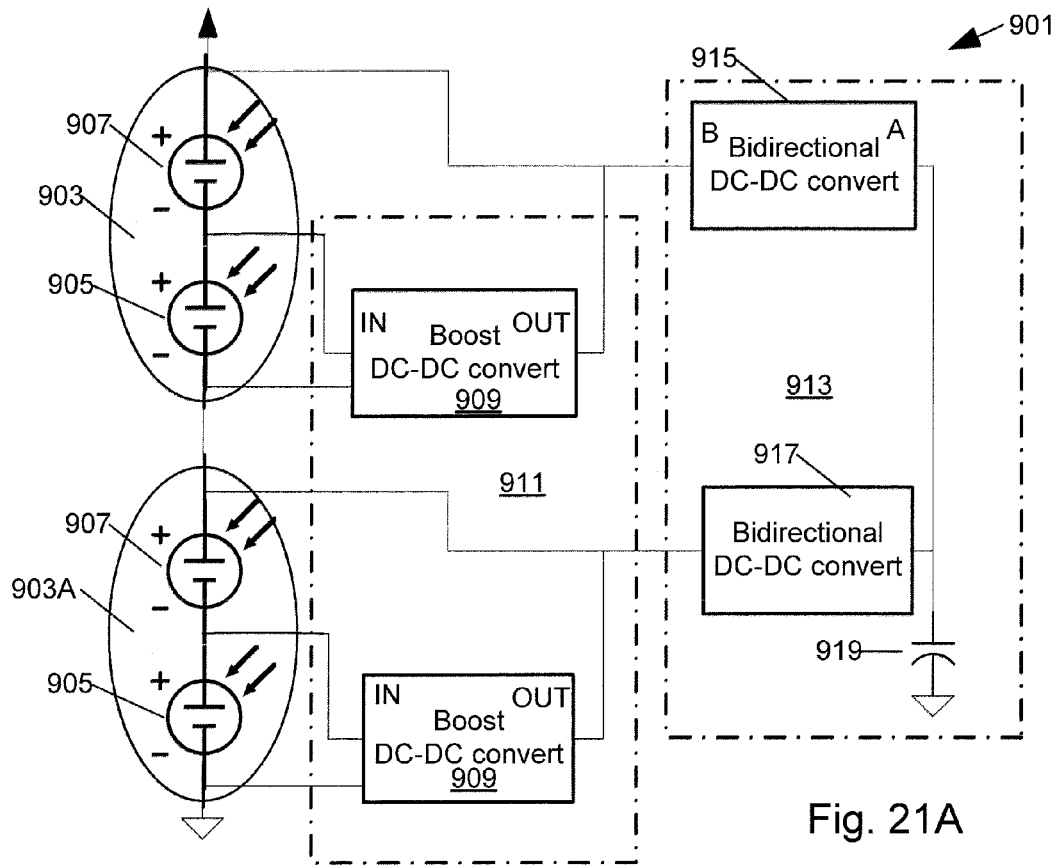
Fig. 21A
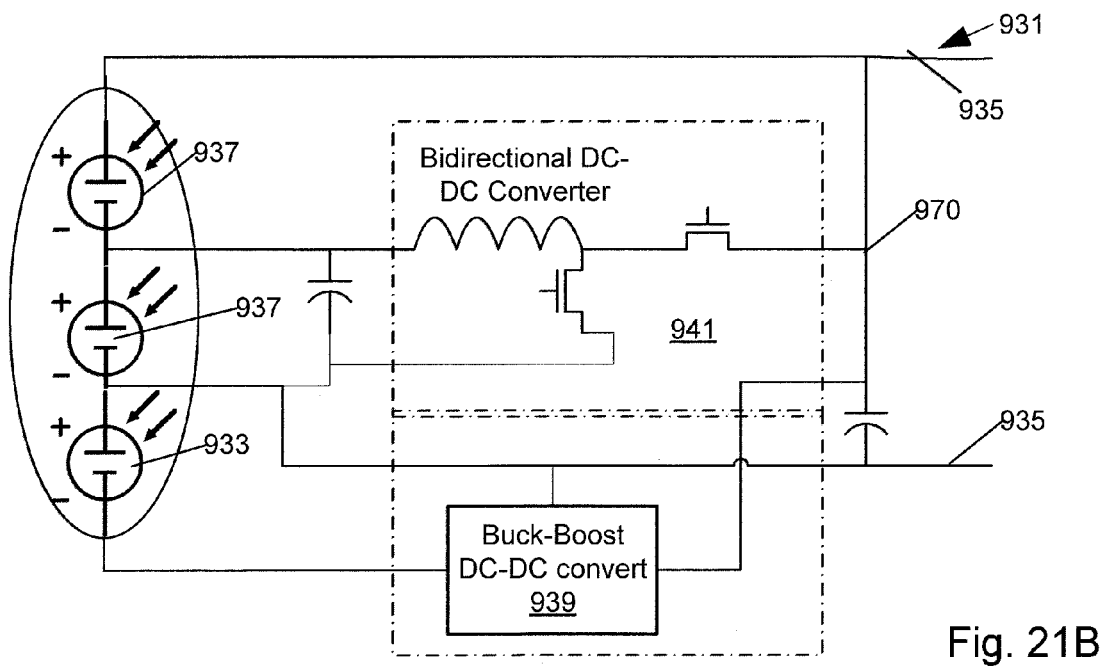
Fig. 21B

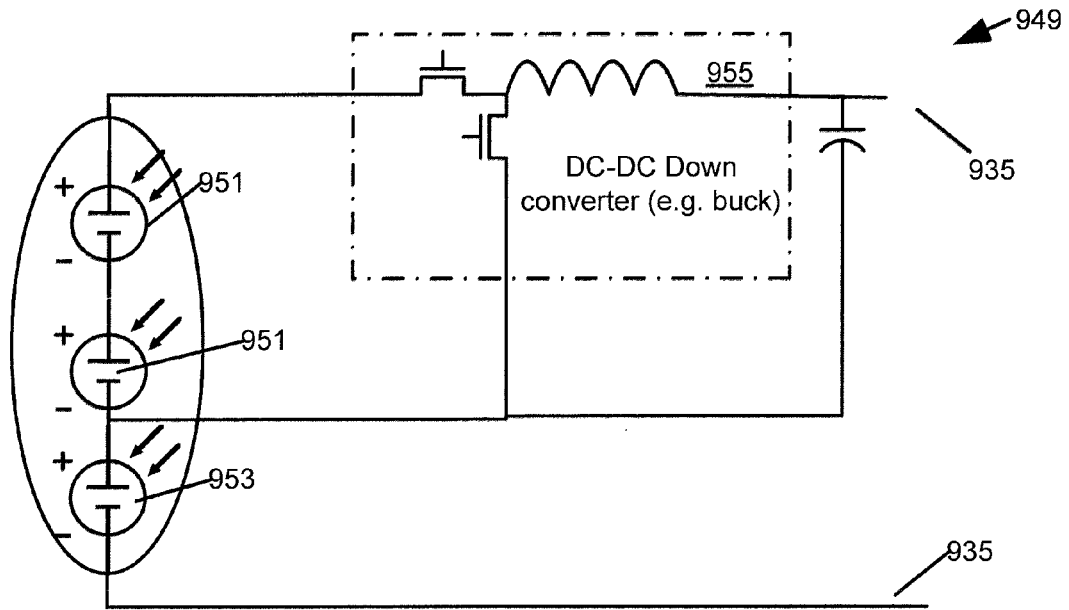
Fig. 21C
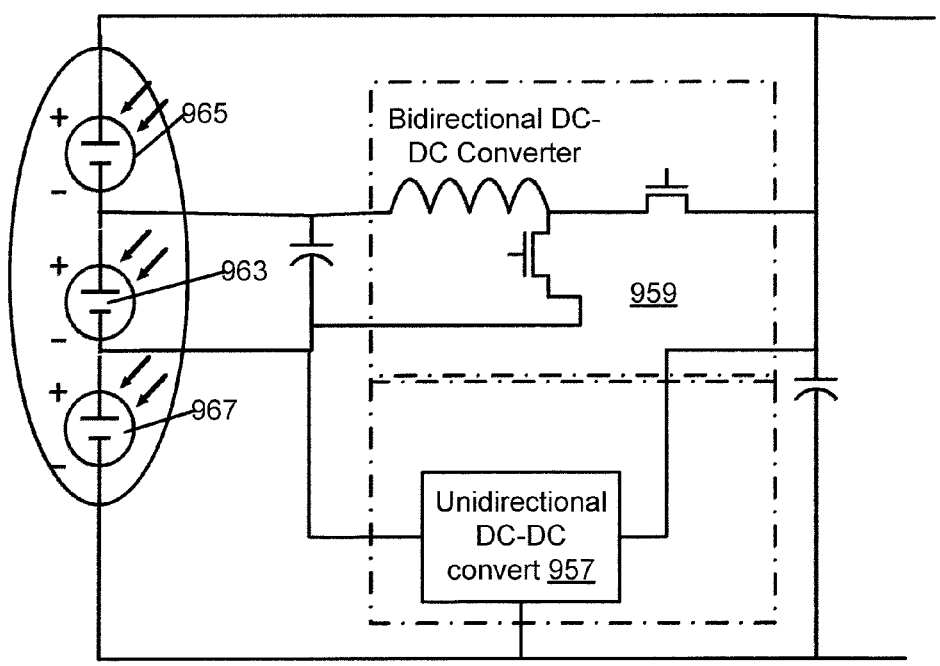
Fig. 21D

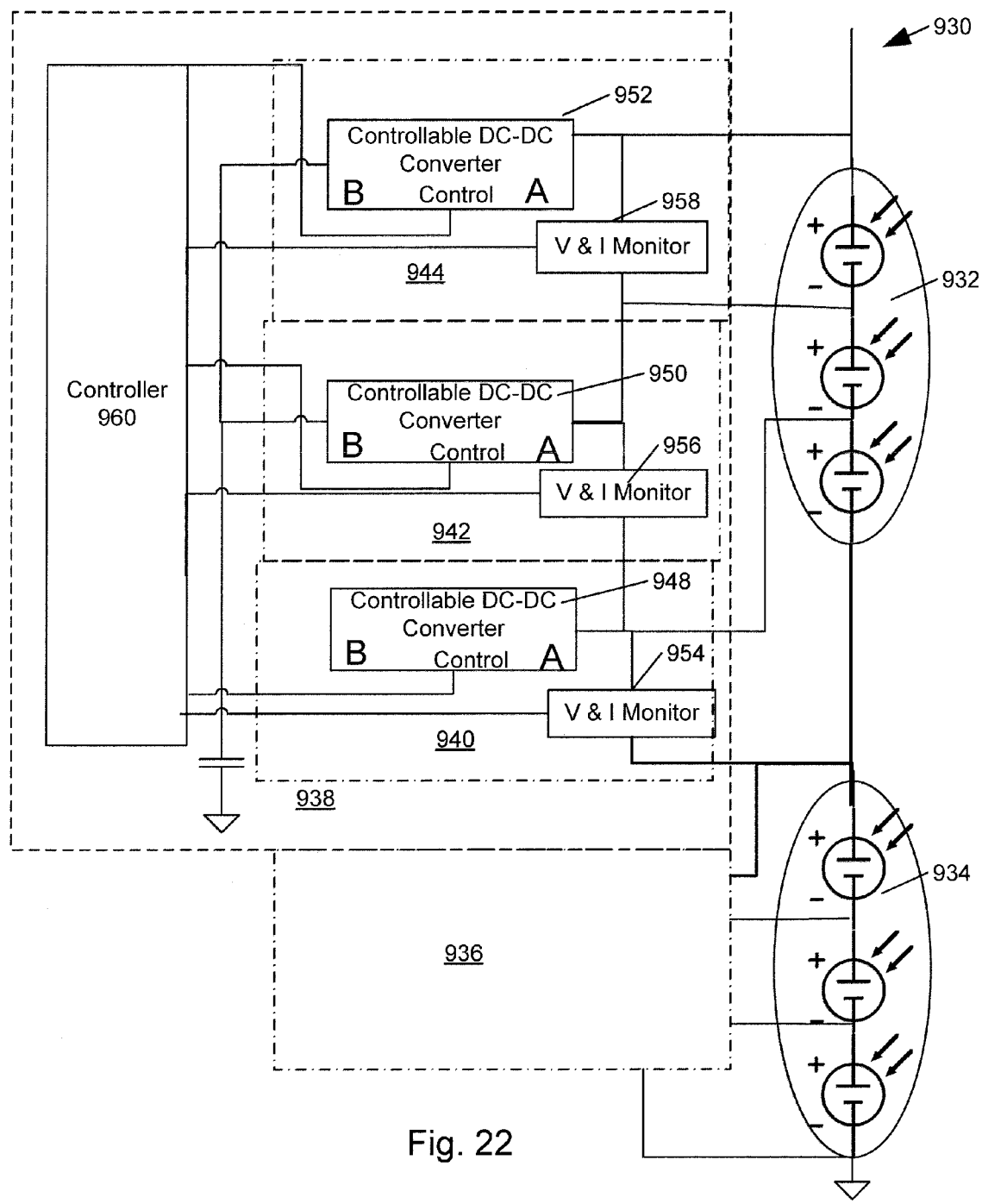
Fig. 22

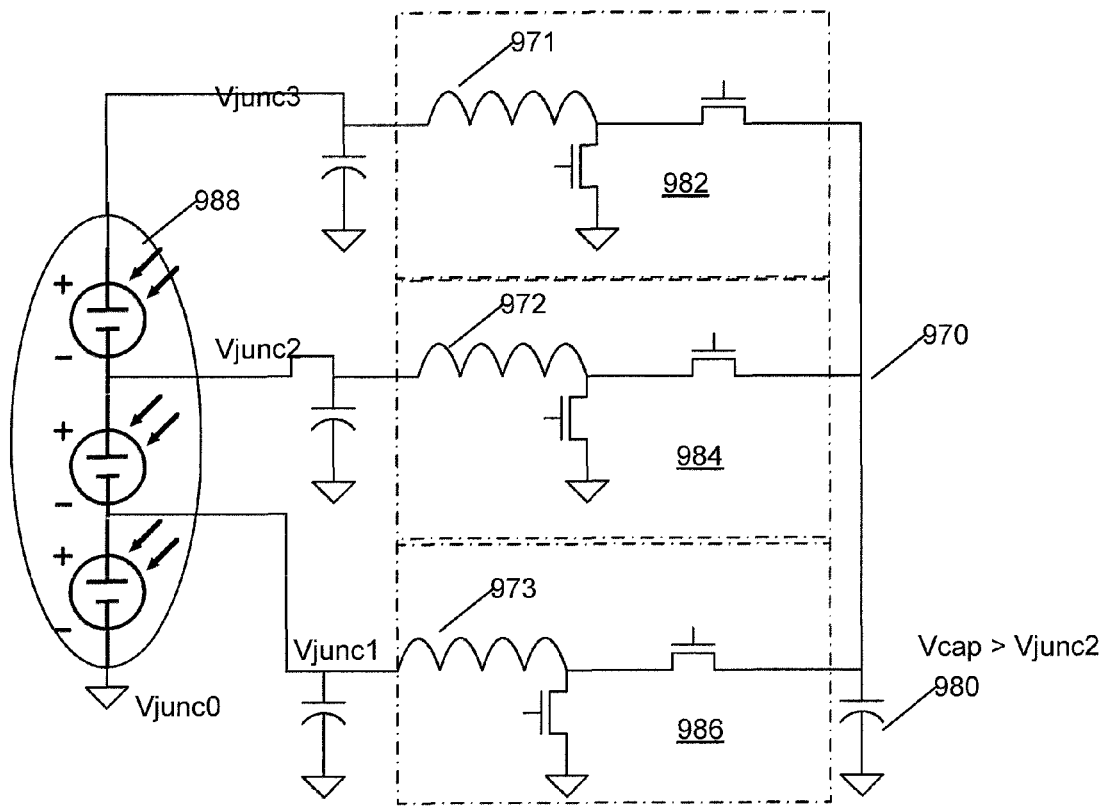
Fig. 23
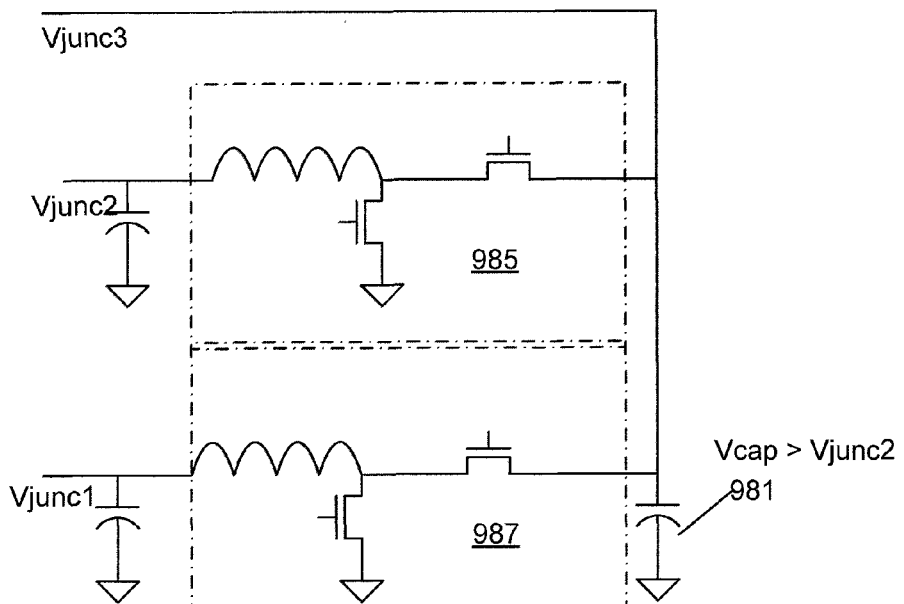
Fig. 24

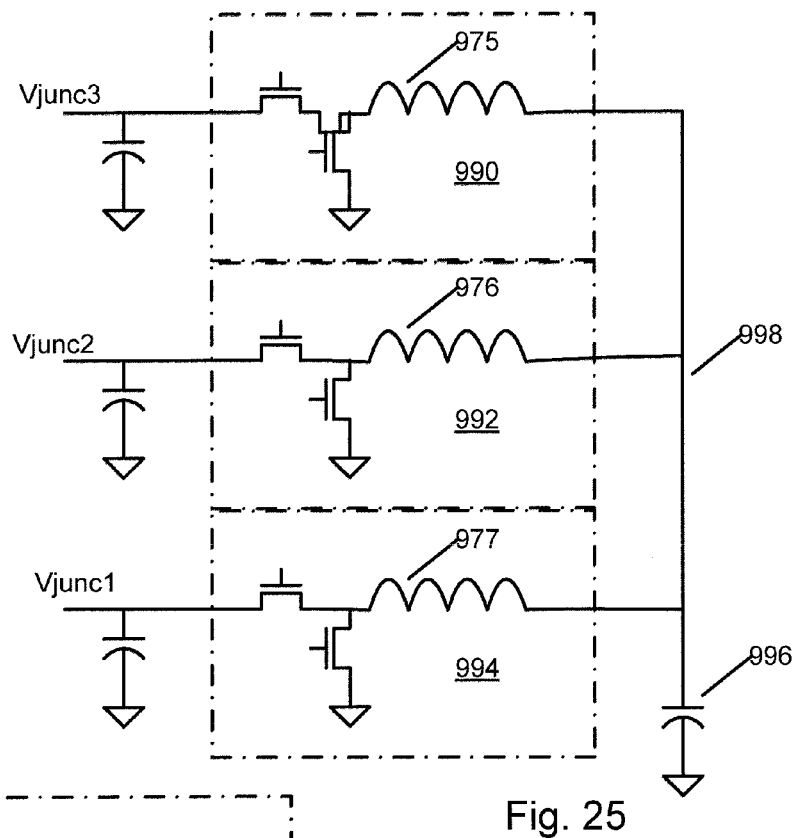
Fig. 25
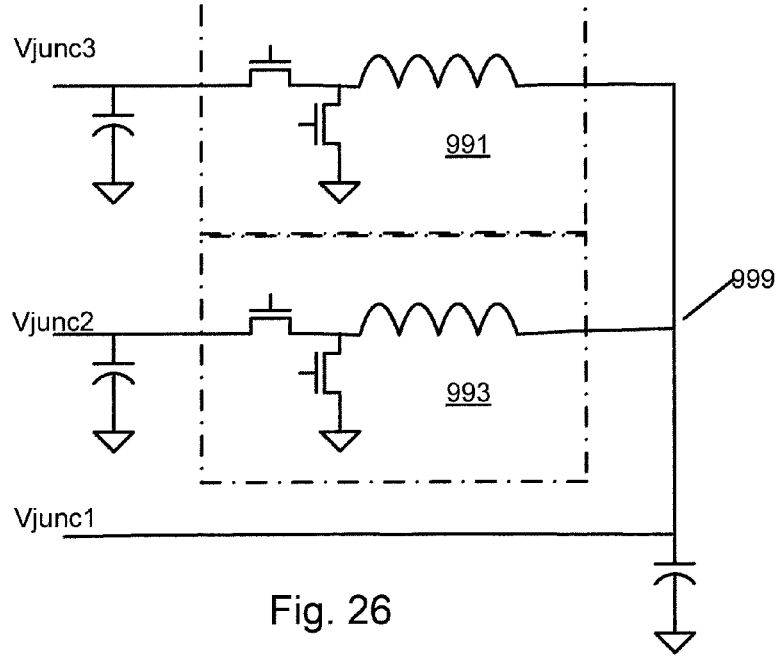
Fig. 26

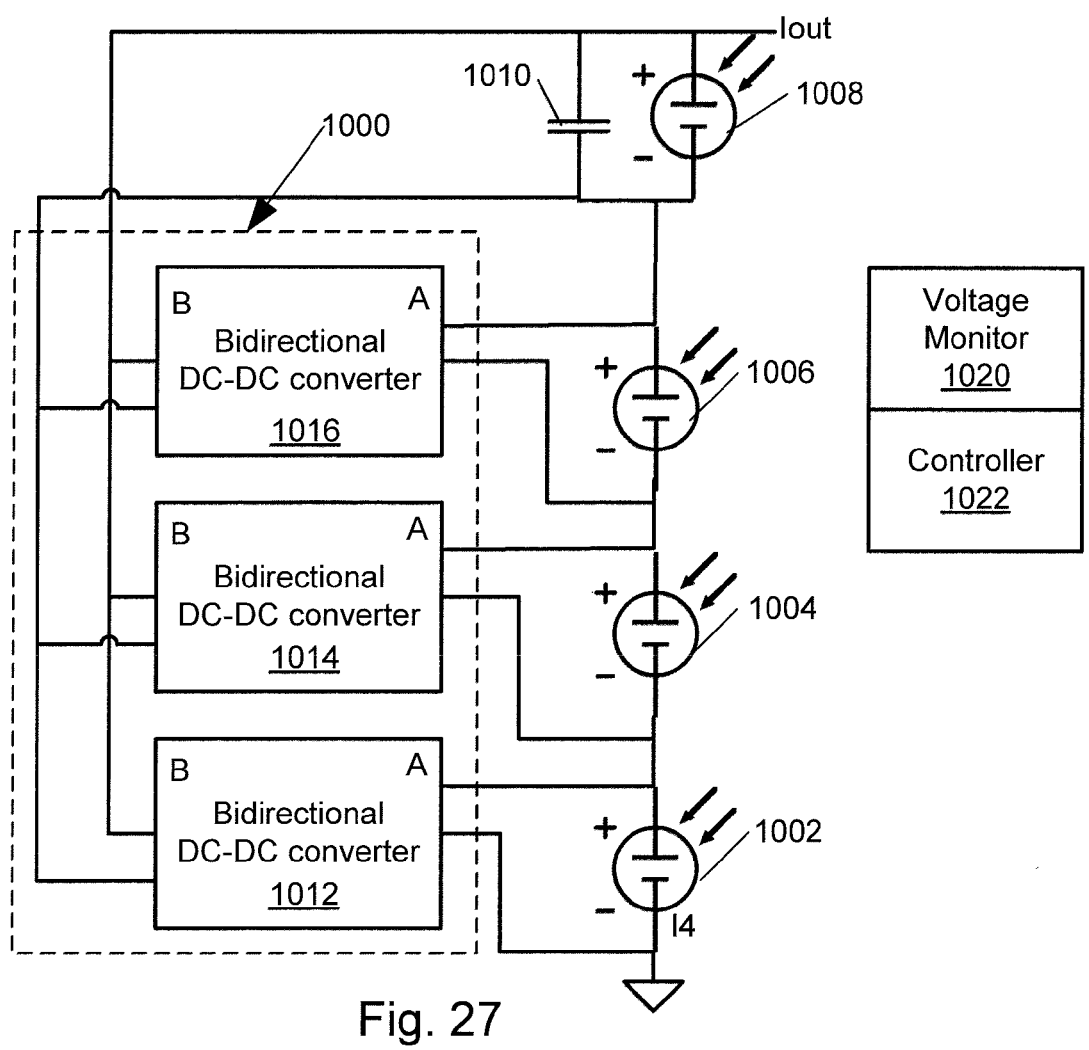
Fig. 27

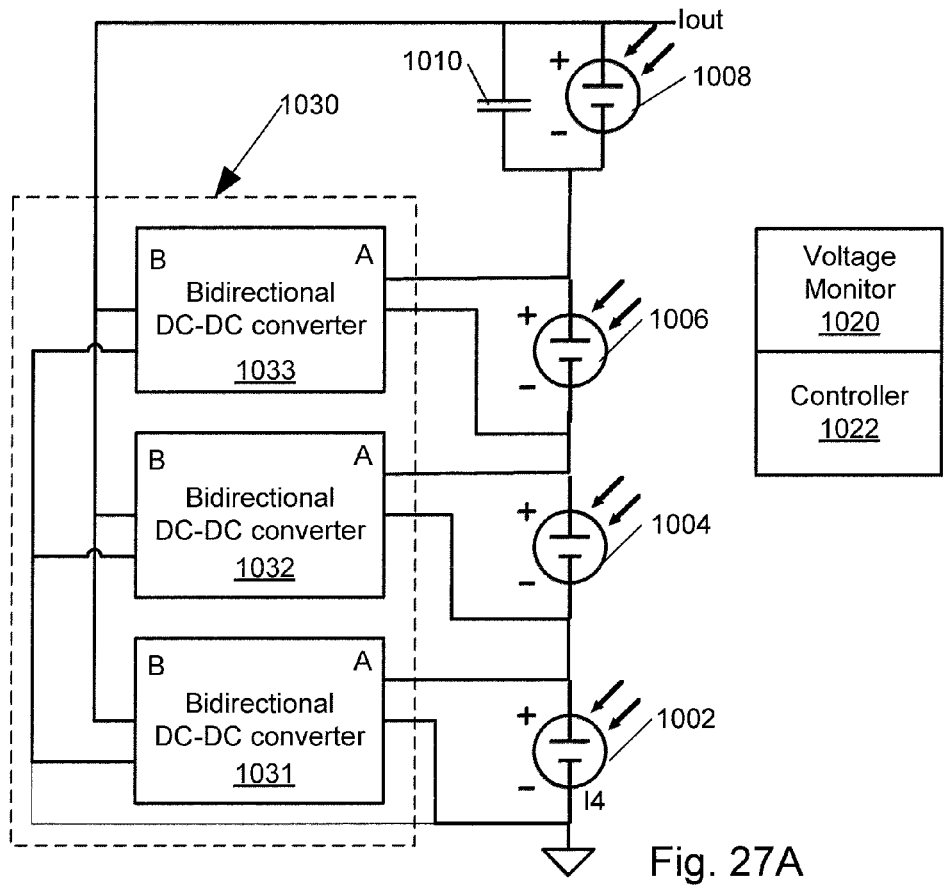
Fig. 27A
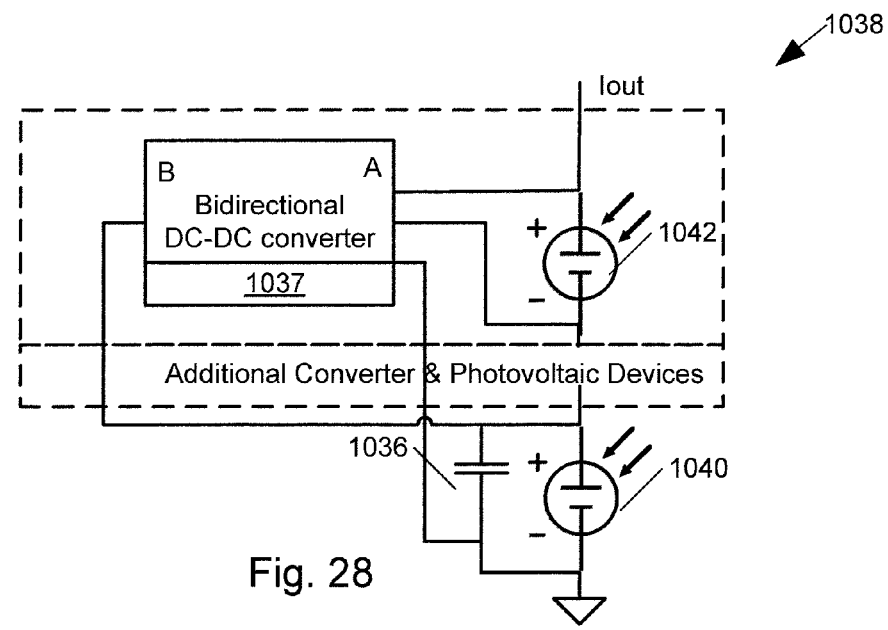
Fig. 28

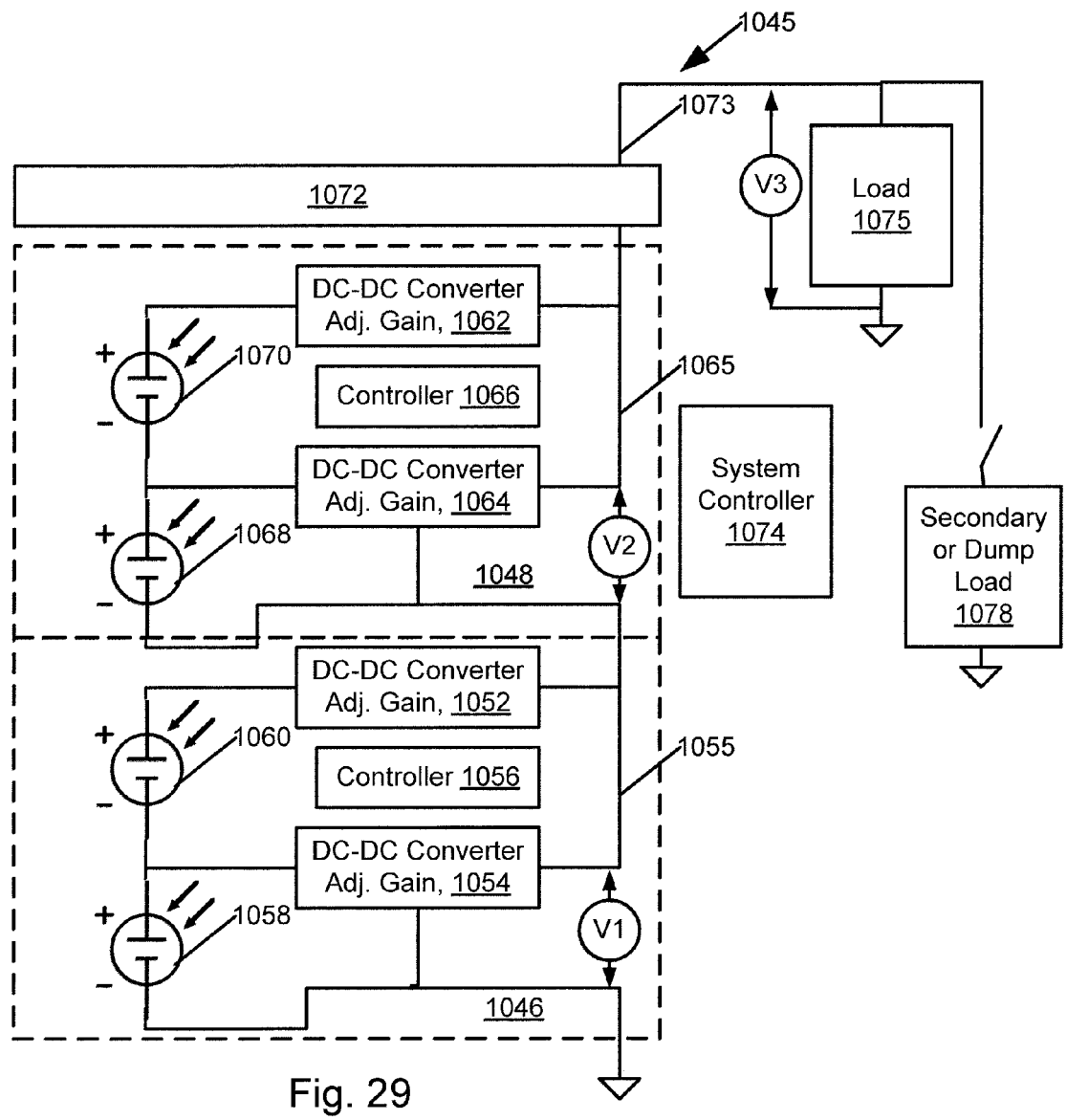
Fig. 29

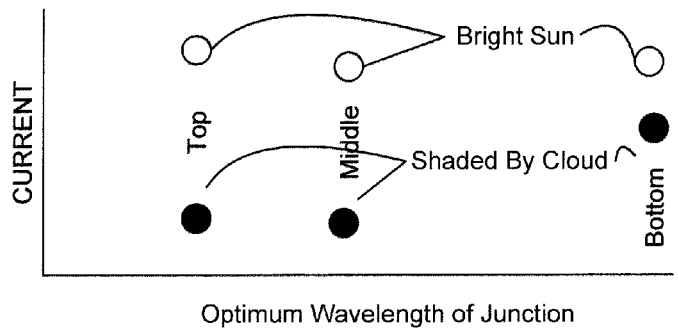
Fig. 30
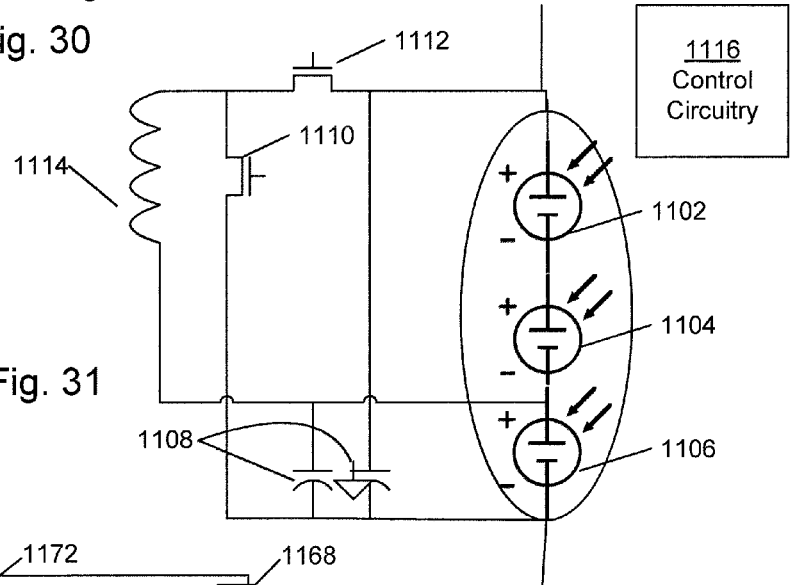
Fig. 31
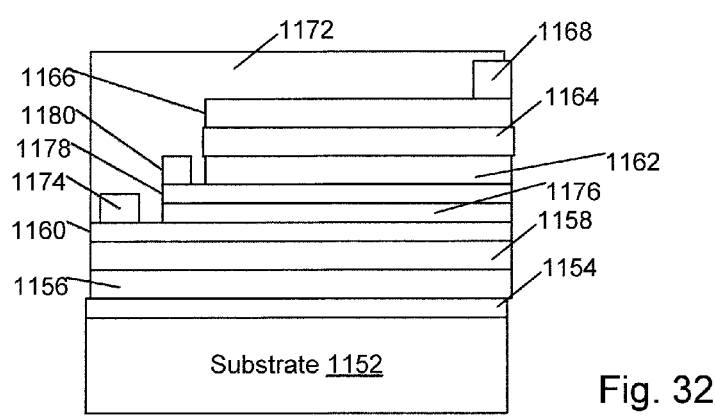
Fig. 32

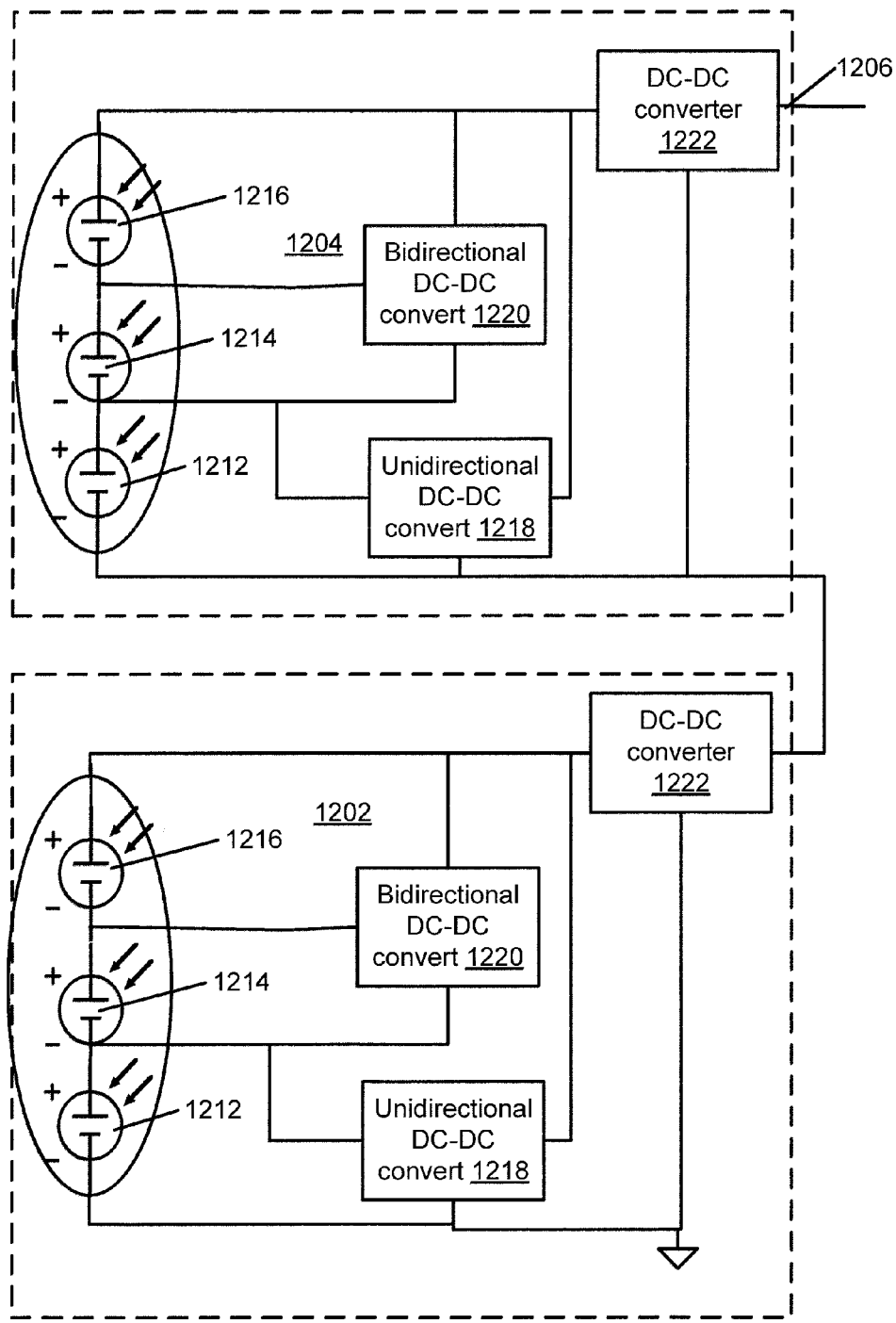
Fig. 33

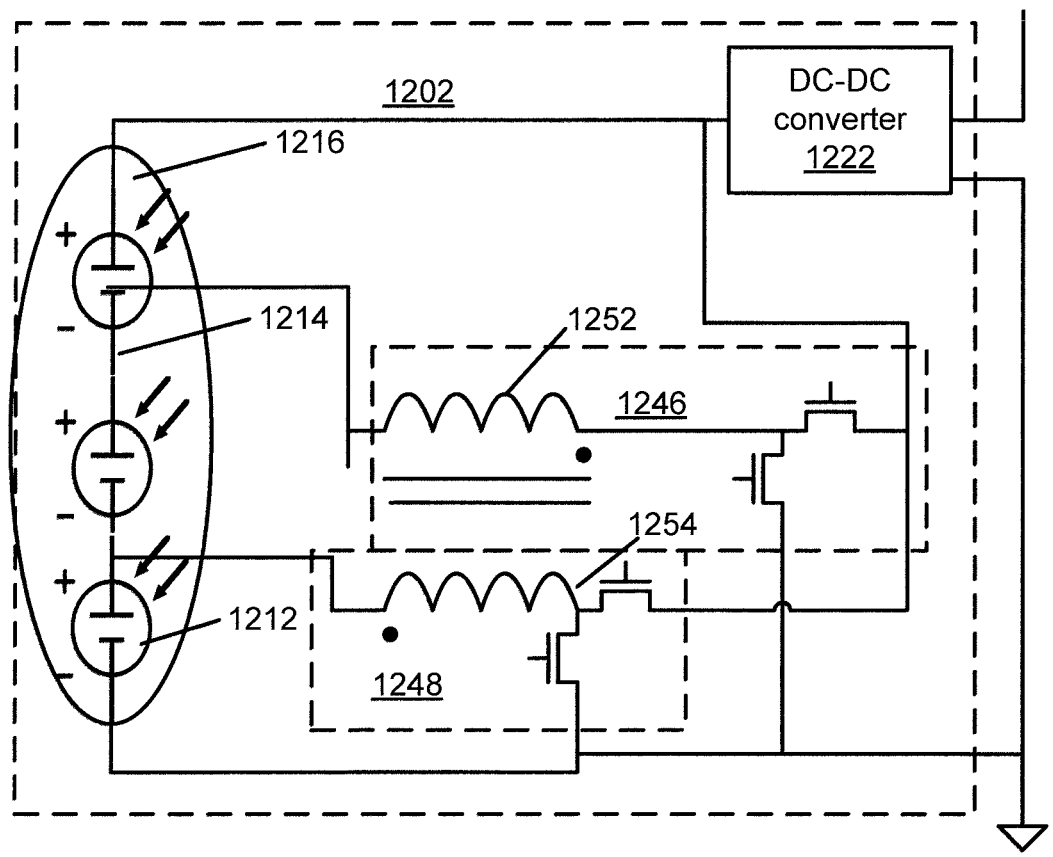
Fig. 34

SYSTEM, METHOD, MODULE, AND ENERGY EXCHANGER FOR OPTIMIZING OUTPUT OF SERIES-CONNECTED PHOTOVOLTAIC AND ELECTROCHEMICAL DEVICES

RELATED APPLICATIONS

The present document claims priority under 35 U.S.C. 119(e) from U.S. Provisional Patent Application No. 61/374,991 filed 18 Aug. 2010, which is incorporated herein by reference.

FIELD OF ART

The present document relates to the field of electronic devices for optimizing output from, and charge to, series-connected devices having mismatches in output capability. The disclosed device is of utility in equalizing output from series-connected photovoltaic devices such as solar cells and solar panels, and charge to and output from series-connected electrochemical devices such as cells in batteries.

BACKGROUND

Photovoltaics

Photovoltaic cells produce a voltage that varies with current, cell condition, cell physics, cell defects, and cell illumination. One mathematical model for a photovoltaic cell, as illustrated in FIG. 1, models output current as:

$$I = I_L - I_0 \left\{ \exp\left[\frac{q(V + IR_S)}{nkT}\right] - 1 \right\} - \frac{V + IR_S}{R_{SH}}. \quad \text{Eqn 1}$$

Where
$I_L$=photogenerated current
$R_S$=series resistance
$R_{SH}$=shunt resistance
$I_0$=reverse saturation current
n=diode ideality factor (1 for an ideal diode)
q=elementary charge
k=Boltzmann's constant
T=absolute temperature
I=output current at cell terminals
V=voltage at cell terminals
For silicon at 25° C., kT/q=0.0259 Volts.

Typical cell output voltages may be about one-half volt for Silicon (Si) cells, which is far below the voltage needed to charge batteries or drive most other loads. As a result, cells are typically connected together in series to form a module, or an array, having an output voltage much higher than that produced by a single cell. Cell voltages differ for other types of cells, for example, Germanium (Ge) cells typically have lower cell output voltage at maximum power point than do Si cells.

Real-world photovoltaic cells often have one or more microscopic defects, these cell defects may cause mismatches of series resistance $R_S$, shunt resistance $R_{SH}$, and photogenerated current $I_L$ from cell to cell in a module. Further, cell illumination may vary from cell to cell in a system, and may vary even from cell to cell in a module. Environmental effects that can cause variations in illumination from cell to cell include shadows cast by trees, debris including bird droppings or leaves shadowing portions of a cell or module, dust, dirt, and other effects. These mismatches in illumination may vary from day to day and with time of day—a shadow may shift across a module during a day.

From eqn. 1 and the model, output voltage is greatest at zero output current, and output voltage V falls off nonlinearly with increasing output current I. FIG. 2 illustrates the effect of increasing current drawn from a photovoltaic device at constant illumination. As current I is increased under constant illumination, voltage V falls off slowly, but as current I is increased to an output current near the photocurrent $I_L$, output voltage V falls off sharply. Similarly, cell power P, the product of current times voltage, increases as current I increases, until falling voltage V overcomes the effect of increasing current, whereupon further increases in current I drawn from the cell cause power P to decrease rapidly. For a given illumination, each cell, module, and array of cells and modules therefore has a maximum power point (MPP) representing the voltage and current combination at which output power from the device is maximized. The MPP of a cell, module, or array will change throughout a day as illumination, and hence photocurrent $I_L$, changes.

Maximum Power Point Tracking (MPPT) controllers are devices that determine an MPP voltage and current for a photovoltaic device connected to their input, and adjust current drawn from the device to maintain the photovoltaic device at the MPP.

Without added circuitry, all cells in a series string of cells, as illustrated in FIG. 3, must carry the same current.

Variations in photocurrent $I_L$, and variations in effective shunt resistance $R_{SH}$, between cells of a module or of an array described above may cause the maximum power point output current for one cell Cstrong in a string, to be at a current well above the maximum power point output current Iweak for another cell Cweak in the string (see FIG. 3). In some arrays under some conditions, if Cstrong is operating at its MPP current, Cweak is subjected to a current above its MPP current and may even reverse-bias, thereby consuming power or blocking current flow from better producing cells in the same string. The net effect is that power output from a panel or a series string of panels is limited by the performances of the poorer-producing cells in the series string.

Prior Photovoltaic Solutions

Some prior solar panels have bypass diodes D1, D2, D3 at the module level, at the cell level, or at the level of a group of cells within the module, as illustrated in FIG. 3. The bypass diodes prevent the weak cell Cweak from reverse-biasing and blocking current flow from better producing cells in the string, but, as the low producing cell and any other cells in the same group with the same bypass diode is bypassed, any power produced by Cweak and cells in its group is lost. As illustrated in FIG. 3, while some modules may provide bypass diodes such as D2 across individual cells, other modules or systems may provide diodes such as D1 across groups of cells, or even across entire modules, instead of across individual cells. Many modules on the market today provide bypass diodes across "6-volt" sections of approximately a dozen cells.

Illustrated in FIG. 4 are other systems that use distributed, per-panel, DC-DC converters 50 or DC-AC microinverters to drive a common power-summing high-voltage bus 52 as illustrated in FIG. 4. Each converter 50 receives power from a solar module 49, each module having several photovoltaic cells 48, at whatever voltage and current that module 49 is capable of generating and potentially at the MPP of that module, and converts and outputs the power onto the high-voltage power-summing bus 52. Since modules are no longer connected in series, low production by one module does not interfere with production by high-performing modules. Further, potential power production by low-performing modules is summed on the bus and not wasted.

An issue with distributed, per-panel voltage converters is that all power produced must pass through the converters, and some power is inevitably lost in circuitry of those converters. Such architectures also help to achieve MPP only at the panel level, but do not work at the individual cell level. For example, when even a single cell of a panel is cracked or partially shaded, the entire panel may not deliver the full potential power from the rest of the cells, particularly if bypass diodes are provided on a per-panel and not a per-cell basis. Cells may also be mismatched through manufacturing variations, differential soiling, and aging as well as damage and shade. Nonetheless, U.S. patent application publication numbers 2009/0020151 and 2005/0121067 propose variations on using local converters to drive DC or AC power-summing buses in parallel.

Yet another alternative is disclosed in U.S. patent application publication number 2008/0236648, in which power from groups of photovoltaic cells is fed into respective MPPT DC-DC converters to produce a current that is constant throughout all DC-DC converters of the array at a voltage at each converter that depends on power available from the attached photovoltaic device. The outputs of the DC-DC converters are connected in series. Once again, all power generated by an array passes through the DC-DC converters such that not only is all array power subject to converter losses, but failure of one or more converters may cause loss of all power from part or all of the array.

It has long been known that different types of photovoltaic cells absorb different wavelengths of light, and absorb wavelengths with different efficiencies. Typically, a photovoltaic cell type has a favored wavelength corresponding to photons of energy slightly greater than an energy gap of the cell. Photons of lower energy pass through the cell, while those of higher energy may be absorbed, but their extra energy provides heat without additional current. Some multijunction photovoltaic devices have been built with two, or in some cases three, junctions of different types stacked vertically. These typically have a top junction made of materials with large bandgap and thus having a relatively short favored wavelength and a maximum power point at relatively high voltage, and a bottom junction device having a lower bandgap and thus having a relatively long favored wavelength of operation and a maximum power point at relatively low voltage.

Cells of multijunction photovoltaic devices are often coupled electrically in series as they are formed, without bringing out a conductor from between the cells. While this construction simplifies connections to the cells, inefficiencies result for the same reasons that output of mismatched series-connected photovoltaic devices may be restricted; effective output current is determined by the lowest-current output of the stacked cells. This situation is aggravated by diurnal variations in color, or wavelength distribution, of received light, and by differences in types and efficiencies of the stacked cells.

Multiple junction photovoltaic devices have been studied, including those having stacked cells with a low-resistance electrical contact to a boundary between junctions, and those having junctions brought out separately. For example, see MacDonald, *Spectral Efficiency Scaling of Performance Ratio for Multijunction Cells*, 34 IEEE Photovoltaic Specialist Conference, 2009, pg. 1215-1220.

SUMMARY

An energy transfer device for solar power systems operates to draw power from high-producing photovoltaic devices and apply that power across low-producing photovoltaic devices. An embodiment is a self-regulating energy exchanger using bidirectional DC-DC converters that operates to maintain uniform voltage across each series-connected photovoltaic device. An alternative embodiment is an energy exchanger that is controlled to maintain each of several series-connected photovoltaic devices at a maximum power point by drawing power from high-performing devices and applying that power across low-performing devices to provide uniform current among series-connected photovoltaic devices.

In an aspect of the inventive concepts, an energy transfer device has a first port coupled to a first interface unit, the first interface unit is coupled to a capacitor. Coupled to the same capacitor is a second interface unit that is in turn coupled to a second port of the transfer device. The interface units are adapted to operation with the first port having a voltage offset from the second port, and to transfer energy between the first port and the capacitor, and to transfer energy between the second port and the capacitor. The interface units are configured to transfer energy from the first port to the capacitor and from the capacitor to the second port when energy available at the first port is greater than energy available at the second port.

In another aspect of the inventive concepts, a system has an energy transfer device, the energy transfer device including a capacitor and having N ports, each of the N ports being coupled to an energy transfer port of one of N interface units, where each interface unit is coupled to the capacitor and is capable of transferring energy bidirectionally between its energy port and the capacitor. In this aspect, each interface unit is adapted to operation with each of the N ports having a voltage offset relative to each of at least one other of the N ports; and the interface units are adapted or controlled to pass energy from a high energy port of the N ports to the capacitor and from the capacitor to a low energy port of the N ports.

In another aspect of the inventive concepts, a solar photovoltaic array has a first and a second series-connected photovoltaic device each having a positive and a negative terminal, the first photovoltaic device being capable of producing a first electric current at a first voltage when illuminated, and the second photovoltaic device being capable of producing a second electric current at a second voltage when illuminated; an energy transfer device coupled to the photovoltaic devices, and capable of receiving energy from across one of the photovoltaic devices and applying that energy across another of the photovoltaic devices.

In another aspect of the inventive concepts, a solar photovoltaic array has first and second photovoltaic devices, the first photovoltaic device capable of producing a first electric current at a first voltage when illuminated, and the second photovoltaic device capable of producing a second electric current at a second voltage when illuminated. The first and the second photovoltaic devices are coupled electrically together in series with a positive terminal of the first photovoltaic device coupled to a negative terminal of the second photovoltaic device. An energy transfer device has a first terminal coupled to a negative terminal of the first photovoltaic device, a second terminal coupled to a positive terminal of the first photovoltaic device and to the negative terminal of the second photovoltaic device, and a third terminal coupled to a positive terminal of the second photovoltaic device, the energy transfer device being capable of receiving energy from its first and second terminals and providing energy to its second and third terminals if a first parameter selected from the group consisting of the first current and the first voltage is greater than a second parameter selected from the group consisting of the second current and the second voltage, and of receiving energy from its second and third terminals and providing energy to its first and second terminals if the second parameter is greater than the first parameter.

In another aspect of the inventive concepts, a solar photovoltaic array has at least a first, a second, and a third photovoltaic device each having a power output port, the first photovoltaic device being capable of producing a first electric current at a first voltage when illuminated, the second photovoltaic device being capable of producing a second electric current at a second voltage when illuminated, and the third photovoltaic device being capable of producing a third electric current at a third voltage when illuminated. The power output ports of the first, second, and third photovoltaic devices are coupled electrically together in series. An energy transfer device has a first port coupled to the power output port of the first photovoltaic device, a second port coupled to the power output port of the second photovoltaic device, and a third port coupled to the power output port of the third photovoltaic device, the energy transfer device capable of receiving energy from its first port and providing energy to its second port if a first parameter selected from the group consisting of the first current and the first voltage is greater than a second parameter selected from the group consisting of the second current and the second voltage, and of receiving energy from its second port and providing energy to its first port if the second parameter is greater than the first parameter; and wherein the energy transfer device is capable of receiving energy from the first port and providing energy to its third port if the first parameter is greater than a third parameter selected from the group consisting of the third current and the third voltage, and of receiving energy from its third port and providing energy to its first port if the third parameter is greater than the first parameter.

In another aspect of the inventive concepts, a system has a first energy transfer device for transferring energy from a high-producing device to a low-producing device, the first energy transfer device having a first port for coupling to a first photovoltaic device, a second port for coupling to a second photovoltaic device, a controller for determining a port attached to a low current producing device and a port attached to a high producing device, at least a first inductor, and a first switching device coupled in series with the first inductor. The energy transfer device is operable with the first and the second ports coupled together in series to transfer energy between the ports. The energy transfer from the first port is performed by a method comprising alternately closing and opening the first switching device at a high frequency, and opening the first switching device disconnects at least one terminal of the inductor from the first port.

In another aspect of the inventive concepts, a system has a first energy transfer device for transferring energy from a high-current-producing junction of a first stacked multijunction photovoltaic device to across a low-current-producing junction of the photovoltaic device. The first energy transfer device has a first port for coupling to the high-producing junction of the photovoltaic device, a second port for coupling to the low-producing junction of the photovoltaic device, at least a first inductor coupled to at least one port selected from the group consisting of the first and second port, and a first switching device coupled in series with the first inductor; and a controller for monitoring voltages at the high-current-producing and low-current-producing junctions and for determining switching of the first switching device to maintain at least an approximate maximum power point for each junction of the multijunction photovoltaic device.

In yet another aspect of the inventive concepts, a subsystem has a multiple junction stacked photovoltaic device with a first DC-DC converter coupled to transfer energy from a high-current-producing junction of photovoltaic device to across a low-current-producing junction of the photovoltaic device. A controller monitors voltages at the high-current-producing and low-current-producing junctions and is configured to determine switching of at least one switching device of the at least one DC-DC converter to optimize power output from the multijunction photovoltaic device.

In another aspect of the inventive concepts, a subsystem has at least a first multiple-junction stacked photovoltaic device having a plurality of photovoltaic junctions coupled electrically in series and at least a first bidirectional DC-DC converter coupled to transfer energy between an output of the first stacked photovoltaic device and a specific junction of the at first stacked photovoltaic device. A controller monitors voltages at junctions of the first stacked photovoltaic device, the controller configured to determine switching of at least one switching device of the first DC-DC converter to optimize power output from the first multijunction photovoltaic device.

In another aspect of the inventive concepts, a subsystem has at least a first multiple junction stacked photovoltaic device having a plurality of photovoltaic junctions coupled electrically in series, at least a first bidirectional DC-DC converter coupled to transfer energy between an output of the first stacked photovoltaic device and a specific junction of the at least first stacked photovoltaic device, and a controller for monitoring voltages at junctions of the first stacked photovoltaic device, the controller configured to determine switching of at least one switching device of the first DC-DC converter to optimize power output from the first multijunction photovoltaic device.

BRIEF DESCRIPTION OF THE FIGURES

FIG. 1 illustrates a circuit model for a photovoltaic device, such as a photovoltaic cell or module.

FIG. 2 is a graph of power and voltage versus current illustrating the maximum power point concept.

FIG. 3 illustrates prior-art series-connected photovoltaic devices with bypass diodes.

FIG. 4 illustrates using prior-art local converters to drive a power-summing bus.

FIG. 5 is a block diagram of a solar system having an energy exchanger for balancing output current of multiple photovoltaic devices.

FIG. 6 is a block diagram of a solar system having an energy exchanger having bidirectional DC-DC converters for balancing output current of multiple photovoltaic devices.

FIG. 7 is a diagram of a transformer-isolated Cuk converter suitable for use in the energy exchanger of FIG. 6.

FIG. 8 is a diagram of a capacitively-isolated Cuk converter suitable for use in the energy exchanger of FIG. 6.

FIG. 9 is a diagram of a charge-pump converter suitable for use in the energy exchanger of FIG. 6.

FIG. 10 is a diagram of a SEPIC converter suitable for use in the energy exchanger of FIG. 6.

FIG. 11 is a block diagram of a photovoltaic array having two levels of energy exchanger, one at each module, and one at the array level.

FIG. 12 is a block diagram of a battery system having an energy exchanger operable both during balance charging and during discharge.

FIG. 13 is a block diagram of a power system adaptable for grid-tie, grid-independent, and standby power use.

FIG. 14 is a block diagram of an energy exchanger having local maximum power point tracking capability and suitable for use in complex systems.

FIG. 15 is a block diagram of an alternative energy exchanger having DC-DC converters operable between pairs of ports.

FIG. 16 is a block diagram of an alternative energy exchanger having local maximum power point tracking capability and suitable for use in complex systems.

FIG. 17 is a timing diagram illustrating how energy consumption due to switching transients may be reduced at individual converters of the energy exchanger when those converters need not handle large currents.

FIG. 18 is a cross-sectional diagram illustrating a multijunction photovoltaic device having low resistance connection to the junctional boundary.

FIG. 18A is a cross sectional diagram of an alternative embodiment of a multijunction photovoltaic device having low resistance connection to the junctional boundary.

FIG. 18B illustrates an alternative form of split-spectrum photovoltaic device.

FIG. 18C illustrates another form of split-spectrum device in a concentrator.

FIG. 18D illustrates a symbol for a split-spectrum device.

FIG. 19 is a cross sectional diagram of a portion of a multijunction photovoltaic device having a low resistance connection to a boundary between an upper and a lower cell of the device.

FIG. 20 is a block diagram of an alternative embodiment of the energy exchanger for use with multijunction photovoltaic devices using controllable bidirectional converters.

FIG. 21 is a block diagram of an alternative embodiment of the energy exchanger for use with multijunction photovoltaic devices, using multiple uncontrolled converters in groups, and small numbers of controllable bidirectional converters.

FIG. 21A is a diagram of an alternative embodiment for use with multijunction photovoltaic devices where one junction predictably is capable of providing more current than another junction.

FIG. 21B is a diagram of an alternative embodiment for use with multijunction photovoltaic devices.

FIG. 21C is a diagram of another alternative embodiment for use with multijunction photovoltaic devices.

FIG. 21D is a diagram of another alternative embodiment for use with series-strung multijunction and split-spectrum devices.

FIG. 22 is a block diagram of an alternative embodiment of the energy exchanger for use with multijunction photovoltaic devices, having an integrated exchanger for each multijunction device.

FIG. 23 is a summary schematic diagram of an integrated exchanger of the embodiment of FIG. 22 embodying boost converters.

FIG. 24 is an example of an integrated exchanger derived from that of FIG. 23 but having N−1 DC-DC converters for N junctions in an associated photovoltaic device.

FIG. 25 is a summary schematic diagram of an integrated exchanger of the embodiment of FIG. 22 embodying buck converters.

FIG. 26 is an example of an integrated exchanger derived from that of FIG. 23 but having N−1 DC-DC converters for N junctions in an associated photovoltaic device.

FIG. 27 is an example of a series-type energy exchanger for boosting array output voltage to a voltage greater than a sum of MPPT voltages of series connected devices.

FIG. 28 is an illustration of a series-type energy exchanger for boosting array output voltage similar to that of FIG. 27, but having a low-voltage summing node.

FIG. 29 is an illustration of a series-parallel, full-power, system for maintaining multiple panels at maximum power point.

FIG. 30 is an illustration of the effect of cloud on current production of various junctions of a multijunction photovoltaic device.

FIG. 31 is an illustration of a thrifted energy exchanger for use with a multijunction photovoltaic device.

FIG. 32 is a cross-sectional illustration of a multijunction photovoltaic device having a dielectric layer isolating the bottom and middle junctions.

FIG. 33 is an illustration of multiple junction devices or split spectrum photovoltaic devices equipped with energy transfer devices, and coupled together in series with buck converters to maximize power production of a string.

FIG. 34 illustrates use of a coupled inductor for multiple DC-DC converters associated with a multiple junction device in a string.

DETAILED DESCRIPTION OF THE EMBODIMENTS

A solar system, as illustrated in FIG. 5, has photovoltaic devices 102, 104, 106, that are coupled together in series to obtain a suitable voltage for a load. In an embodiment, photovoltaic devices 102, 104, 106 are individual photovoltaic cells. In an alternative embodiment, photovoltaic devices 102, 104, 106 are modules having multiple photovoltaic cells. Similarly, photovoltaic devices 102, 104, 106 may each be a group of two or more series, parallel, or series-parallel coupled cells within a module. An energy transfer device or energy exchanger 108 is operable to transfer power from terminals of higher-producing devices of photovoltaic devices 102, 104, 106 to terminals of lower-producing devices of photovoltaic devices 102, 104, 106 to supplement current output of the lower-producing devices to maintain output voltages at the lower-producing devices that are sufficient to allow for power production by the lower-producing devices. In certain embodiments, energy exchanger 108 equalizes voltages across photovoltaic devices 102, 104, 106.

With reference to FIG. 6 as well as FIG. 5, the current through photovoltaic device 102 is I4, the current through photovoltaic device 104 is I5, and the current through photovoltaic device 106 is I6. The energy exchanger takes in or provides a current of I1 at the point between photovoltaic devices 102 and 104, the energy exchanger takes in or provides a current of I2 at the point between photovoltaic devices 104 and 106, and the energy exchanger takes in or provides a current of I3 at the top end of photovoltaic device 106. Since the sum of currents to each node must be zero, by circuit theory:

$$I1+I4=I5+I2$$

$$I2+I5=I6+I3$$

$$I3+I6=Iout.$$

Next, I9 (current on B side of converter 134)+I8 (current on B side of converter 132)+I7 (current on B side of converter 130)=0 since there is no other charge source connected to energy transfer bus 136.

$$I9+I8+I7=0$$

Each of the B sides of bidirectional DC-DC level-shifting converter 134, 132, 130 are connected together in parallel, so:

$$V(B \text{ side of } 134)=V(B \text{ side of } 132)=V(B \text{ side of } 130)$$

The voltage on the A side of each bidirectional DC-DC level-shifting converter 134, 132, 130 can be expressed as the voltage on the B side of the converter multiplied by the voltage gain G of the converter as follows:

$$V(A \text{ side of } 134) = V(B \text{ side of } 134) * G134$$

$$V(A \text{ side of } 132) = V(B \text{ side of } 132) * G132$$

$$V(A \text{ side of } 130) = V(B \text{ side of } 130) * G130$$

It is assumed that voltage gain G is the same for each bidirectional DC-DC level-shifting converter 134, 132, 130 such that:

$$G134 = G132 = G130 = G$$

By substitution:

$$V(A \text{ side of } 134) = V(A \text{ side of } 132) = V(A \text{ side of } 130)$$

Therefore, if each bidirectional DC-DC level-shifting converter 134, 132, 130 operates with the same voltage gain G (e.g., if each converter has the same topology and operates with the same duty cycle), the energy exchanger forces the respective voltage across each of photovoltaic devices 102, 104, 106 to be the same.

Assuming that each bidirectional DC-DC level-shifting converter 134, 132, 130 is perfectly efficient, then their respective input and output powers are equal:

$$V(B \text{ side of } 134) * I9 = V(A \text{ side of } 134) * I3$$

$$V(B \text{ side of } 132) * I8 = V(A \text{ side of } 132) * I2$$

$$V(B \text{ side of } 130) * I7 = V(A \text{ side of } 130) * I1$$

Using the relations between the voltages on the A and B sides of DC-DC level-shifting converters 134, 132, 130 and voltage gain G, the following relationships can be established:

$$I9 = I3 * G$$

$$I8 = I2 * G$$

$$I7 = I1 * G$$

And by substitution and elimination of G in I9+I8+I7=0:

$$I1 + I2 + I3 = 0.$$

Now, given that each cell and parallel A port of the related converter are all connected in series with the other combinations of cells with related converters, the same current Iout must flow in the each series branch, $$Iout = I3 + I6 = I2 + I5 = I1 + I4.$$

Summing yields:

$$I6 + I3 + I5 + I2 + I4 + I1 = 3 * Iout$$

Substituting I1+I2+I3=0 in the above, and dividing by 3 on both sides:

$$(I6 + I5 + I4)/3 = Iout$$

Making the same assumptions of 100% efficiency and equal voltage, for M photovoltaic devices:

$$Iout = \frac{\sum_{N=1}^{M} Ipanel(N)}{M} \text{ or for the case in figure 6: } Iout = (I4 + I5 + I6)/3$$

Thus, as illustrated by the above equations, certain embodiments of the energy exchanger having equal converter voltage gains and negligible losses causes photovoltaic array 100 output current to be the mathematical average of all photovoltaic device 102, 104, 106 currents. In particular, for each photovoltaic device 102, 104, 106, the energy exchanger adds or subtracts current from the photovoltaic device as required to make the sum of the added or subtracted current and the photovoltaic device current equal the mathematical average of all photovoltaic device 102, 104, 106 currents. Such characteristic shows that the energy exchanger typically processes only a fraction of the array output power, thereby helping to minimize processing of output power and associated power dissipation.

Assuming that photovoltaic device 104 is a high producing module capable of providing at its MPP 12 volts at I5=10 amperes (120 watts) or 13 volts at 8 amperes, that device 102 is a low-producing module capable of providing 12 volts at I4=8 amperes, and that device 106 is a mid-producing module capable of providing 12 volts at I6=9 amperes or 12.5 volts at 8 amperes. Without an energy exchanger, the system's best output will be about 37.5 volts at Iout=8 amperes because the low $I_L$ of device 102 causes a rapid voltage drop as current rises above 8 amperes. In other words, series connection of photovoltaic devices enforces identical current through a single current path, and this current equals the current produced by the weakest device in the chain.

With these device capacities, energy exchanger 108 draws I2=one ampere at 12 volts, approximately 12 watts, from across high-producing device 104, and supplements current provided by low-producing device 102 by applying I1 one ampere at 12 volts. Device 106 continues to produce 9 amperes, so I3=0, and the 10 amperes produced by device 104 is effectively divided into one ampere for the energy exchanger and 9 amperes for the series connected stack. This results in a transfer of energy from across high-producing device 104 to across low-producing device 102, as indicated by the arrow in FIG. 5. The resultant output of the array will be approximately 36 volts at Iout=9 amperes, resulting in a net increase in power output of about 24 watts over the same system operated without energy exchanger 108.

In a more dramatic illustration of a benefit of energy exchanger 108, consider an example where energy exchanger 108 is not used and low-producing device 102 is dirty or damaged and therefore can produce only 1 ampere of current. High-producing device 104 and mid-producing device 106 will also be constrained to 1 ampere of current due to their series connection with low-producing device 102. Assuming devices 102, 104, 106 each have an output voltage of 14 volts at 1 ampere, total system output power is approximately 42 watts. However, if energy exchanger 108 is used, high-producing device 104 and mid-producing device 106 can respectively deliver 10 amperes and 9 amperes, as discussed in the previous example, while device 102 delivers 1 ampere. Accordingly, system output current will be approximately 6.7 amperes, where energy exchanger 108 subtracts approximately 3.3 amperes from high-producing device 104, subtracts approximately 2.3 amperes from mid-producing device 106, and adds approximately 5.7 amperes to low-producing device 102. Assuming the MPP output voltage of each device 102, 104, 106 under such conditions is near 12 volts, the total system power is approximately 240 watts, instead of 42 watts when energy exchanger 108 is not used, less losses due to inefficiencies in exchanger 108.

Energy exchanger 108 can be modified for use with other energy producing devices, such as fuel cells, and energy exchanger 108 is not limited to use with energy producing devices having particular voltage and current characteristics. For example, each of devices 102, 104, 106 of FIG. 5 could be replaced with one or more fuel cells such that energy exchanger 108 transfers current among individual fuel cells or groups of fuel cells to help maximize system output power. The energy exchanger operation is similar with power supplied to or from battery cells. The energy exchanger equalizes voltage across all cells being charged or discharged, subtracting or adding current to cells with small or large capacity, or with different states of charge. It is also possible to adjust the individual cell voltages for more complex objectives by adjusting the voltage gain of individual converters in the energy exchanger.

Unlike the DC-DC converter or DC-AC inverter with common summing-rail solutions of 2009/0020151 and 2005/0121067, where the full power generated by all of the photovoltaic devices passes through the converters, in the device of FIG. 5 only the difference in power between high and low performing devices passes through energy exchanger 108. This enables potentially lower ratings for the power circuits, making them smaller and cheaper. It also minimizes power losses, as losses generally increase with increasing processed power. Further, at least a reduced power output is available from the array 100 even if the energy exchanger 108 fails. In fact, if energy exchanger 108 fails or is disconnected, the system may continue to function but in a manner similar to that of FIG. 3. Certain embodiments of energy exchanger 108 may be installed with a new system, or retrofitted to an existing system, with few changes to existing practices. For example, certain embodiments of energy exchanger 108 do not affect, or may improve by eliminating false peak power points, the voltage-current characteristics of an existing photovoltaic system and may therefore be installed in the existing system without changes to the system's existing charge controller or inverter, whether MPPT or conventional.

An embodiment of energy exchanger 108 is illustrated in more detail in FIG. 6. In this embodiment, the energy exchanger has interface units having the form of bidirectional DC-DC converters 130, 132, 134, each allowing for bidirectional power transfer between a respective first port A and a respective second port B. Each first port A is coupled across a respective photovoltaic device 102, 104, and 106. Each first port A has a respective first and second terminal 140, 142. Interface units or bidirectional DC-DC converters 130, 132, 134 are adapted to operate with each first terminal 140 having a voltage offset from each other first terminal 140 and each second terminal 142 having a voltage offset from each other second terminal 142. Each second port B is coupled to a common energy-transfer bus 136. Energy transfer bus 136 has a filtering and energy storage capacitor 138 for smoothing voltages on energy transfer bus 136. Although energy storage capacitor 138 is shown connected to the common ground with device 102, capacitor 138 could alternately be referenced to another common return node, such as the top node of device 106.

In an embodiment, interface units or DC-DC converters 130, 132, 134 of the energy exchanger 108 are transformer-isolated Cuk converters 150 as illustrated in FIG. 7. Each transformer-isolated Cuk converter has an A port 152 and a B port 154. Each port is coupled to an inductor 156, 158 for coupling power into the converter, a switching device 160, 162 driven by converter control and driving circuitry that is not shown for simplicity, a blocking capacitor 164, 166, and a transformer winding 168, 170. The transformer windings 168, 170 are magnetically coupled to transmit power between the ports, and may also be magnetically coupled to the inductors 156, 158. The transformer windings 168, 170 may have a turns ratio other than 1:1.

In an embodiment of energy exchanger 108 using the Cuk converter of FIG. 7, all switching devices 160, 162 of all interface units or DC-DC converters 130, 132, 134 may be driven simultaneously during times that the array is illuminated and generating power. At times when the array is not illuminated, all switching devices 160, 162 of all interface units or DC-DC converters 130, 132, 134 may be turned off. In this embodiment, assuming the highest producing photovoltaic device 104 is producing the highest device voltage in the string of photovoltaic devices, interface unit or bidirectional DC-DC converter 132, which is coupled to highest producing photovoltaic device 104, will tend to transfer power from photovoltaic device 104 to transfer bus 136. Since the resulting voltage on transfer bus 136 is higher than the voltage interface unit or bidirectional DC-DC converter 130, which is coupled to lowest-producing photovoltaic device 102, would be able to apply to energy transfer bus 136, converter 130 tends to draw power from energy transfer bus 136 and apply that energy in parallel with low producing photovoltaic device 102. The net result is a self-regulating energy transfer from one or more high producing devices to supplement output current of one or more low producing devices.

In some embodiments, DC-DC converters 130, 132, 134 (which may include capacitive charge pumps as well as bidirectional converters like CUK converters) operate with a constant duty cycle, or a duty cycle that is dependent on a slowly varying parameter such as array illumination, to reduce control complexity and cost while still enabling acceptable system performance. These embodiments do not include a feedback loop, which eliminates feedback loop problems such as feedback loop instability and/or slow feedback loop response. Energy exchangers operating with bidirectional converters at constant duty cycle act to equalize voltage across all cells or modules. An energy exchanger operated in this manner will often provide better performance than a module or array lacking such an exchanger, although some cells or modules may operate near but not precisely at their MPP because MPP voltage may differ slightly between cells of an array. MPP voltages may differ slightly between even identical cells or modules because of temperature differences or differences in obscuring dust across the array.

Duty cycle and/or general operation of DC-DC converters 130, 132, 134 can optionally be statically or dynamically modified to achieve additional benefits, such as to adjust for different voltages at energy exchanger ports, to implement true MPP calculation and tracking, and/or to help isolate possible faults. Some embodiments of DC-DC converters 130, 132, 134 having inductors, such as those based upon the architectures of FIGS. 7, 8, and 10, and as discussed herein with reference to FIGS. 14 and 16, have switching devices within each converter that are pulse-width controlled to produce an appropriate voltage gain across each converter to ensure more precise tracking of the MPP of each cell or module. In these embodiments, the processor 524, 724 may use voltage and current monitor 506, 706 to determine a present operating power point of each cell or module by measuring voltage at, and current produced by, that cell or module. Processor 524, 724 may then adjust operating pulse-widths or duty cycles at each converter to alter the power points of individual cells or modules and repeat voltage and current measurements according to a predetermined search and track algorithm embedded in firmware memory of processor 524, 724. Processor 524, 724 then determines best maximum power points for each of the cells or modules and adjusts converter pulse widths and/or duty cycles to best maintain that power point during operation.

In an alternative embodiment, gain of the of DC-DC converters 130, 132, 134 is chosen so that voltage on energy exchanger ports B (effectively on the common bus 136) is higher than voltages on the ports A (voltages across cells 102, 104, 106). This respectively decreases currents in the bus 136, allowing for thinner and cheaper and lower-cost wires, while capacitance of the capacitor 138 can be decreased at expense of higher voltage rating.

In an alternative embodiment, interface units or DC-DC converters 130, 132, 134 of energy exchanger 108 are capacitively-isolated Cuk converters 180, such as shown in FIG. 8. Each capacitively-isolated Cuk converter 180 has an A port 182 and a B port 184. Each port is coupled to an inductor 186, 188 for coupling power into the converter, and a switching device 190, 192 driven by converter control and driving circuitry that is not shown for simplicity. Inductors 186, 188 may, but need not, be magnetically coupled by winding on a common core. The converter also has two blocking capacitors 194, 196 for transferring power between ports 182 and 184 while providing isolation. The voltage at B port 184 is of opposite polarity as compared to the voltage at A port 182, which makes no difference for energy exchanger operation, as long as all bidirectional DC-DC converters of an energy exchanger according to FIG. 6 are implemented in the same way. Other embodiments may have non-inverting energy exchangers.

Another bidirectional DC-DC converter 200 that may be used as an elementary DC-DC converter for interface units or DC-DC converters 130, 132, 134, 332 (see FIG. 11 for converter 332 and energy exchangers 302, 306, 330 which will be described in detail below) of energy exchanger 108, 302, 306, 330 is a capacitively-isolated charge-pump converter as illustrated in FIG. 9. In this device, electronic switching devices 202 and 204 close as a pair and are open when electronic switching devices 206, 208 close as a pair. The circuitry enforces a break-before-make to insure that devices of paired switching devices 202, 204 never conduct simultaneously with devices of paired switching devices 206, 208. Charge is stored in capacitors 210, 212. The charge-pump converter inverts voltage while transferring energy from the port having the higher absolute value of voltage to the port having the lower absolute value of voltage.

A capacitor equipped with an electronic commutator device may also be used as an energy transfer device. Each interface unit of such a commutator device comprises a pair of switching devices, when closed the switches place the capacitor across the port, when open the switches disconnect the capacitor from the port, and another interface device may close its switches. In such an embodiment, the commutator alternately couples a capacitor across a first port of the energy exchanger, then across a second port of the energy exchanger; energy tends to flow from a port at high voltage to a port at low voltage. With either a charge-pump converter such as that of FIG. 9, or a capacitor with commutator devices, the switching devices of the energy exchanger may operate at a constant duty cycle whenever sufficient power is being generated that energy exchanger operation is desirable; energy flow will be dictated by voltage differences across the energy exchanger ports.

Yet another bidirectional isolated DC-DC converter that may be used as an elementary DC-DC converter for interface units or DC-DC converters 130, 132, 134, 332 of energy exchanger 108, 302, 306, 330 is a SEPIC converter with isolation. A transformer-isolated SEPIC converter 220 (FIG. 10) has an inductor 222 coupled to a first, or A port, and a switching device 224 for coupling current through inductor 222 and returning current to the first port. As switching device 224 operates, an alternating voltage is generated and coupled by capacitor 226 to a first winding 228 of a transformer, and first winding 228 magnetically couples to a second winding 230 of the transformer. Second winding 230 is coupled through a second switching device 232 to a second or B port that acts interchangeably as a chopper or as a rectifier depending on a direction of power flow in the converter. Switching device 224 also operates interchangeably as a rectifier or as a chopper depending on a direction of power flow in the converter.

It is anticipated that several other forms of bidirectional, isolated, DC-DC converters may be used as elementary DC-DC converters for interface units or DC-DC converters 130, 132, 134, 332 of the energy exchanger. In the interest of brevity, only representative converter types are illustrated in detail here.

With all bidirectional isolated DC-DC converters 220, 200, 180, 150, useful as elementary DC-DC converters for interface units or DC-DC converters 130, 132, 134, 332 of the energy exchanger 108, 302, 306, 330, filtering capacitors may be present at one or both ports of each converter. In alternative embodiments capable of handling increased mismatch currents between cells and modules, two or more phases of such converters may be provided for each elementary DC-DC converter and operated on alternating phases.

Two levels of energy exchanger may be used in a photovoltaic array 300 as illustrated in FIG. 11. In the embodiment of FIG. 11, one level of energy exchanger 302, 306 is used at the module 304, 308 level for exchanging energy across the multiple photovoltaic cells within each module 304, 308. For example, energy exchanger 302 is capable of exchanging energy from high producing to low producing cells across photovoltaic cells 310, 312, 314 but, since its energy transfer bus 316 is local to module 304, it is incapable of transferring energy to or from cells 320, 322, 324 of module 308. An array-level energy exchanger 330, however, acts to transfer energy from high to low producing modules 304, 308, such that current is balanced, and energy production optimized, throughout the array 300. In the embodiment illustrated in FIG. 11, energy exchangers having bidirectional DC-DC converters 332 discussed with reference to FIGS. 5 and 6 may be used. However in an alternative embodiment, the MPPT tracking energy exchanger of FIG. 14 may also be used at either module 302, 306 level, array level 330, or at both levels.

In an alternative embodiment lacking array-level energy exchanger 330, energy transfer bus 316 of energy exchanger 302 of module 304 may be tied to energy transfer bus 334 of energy exchanger 306 of module 308 to provide an expanded single energy exchanger allowing for energy exchange between high and low producing cells across module boundaries.

Photovoltaic systems intended for producing standby power, or for producing power in a stand-alone, off-grid environment, typically require energy storage systems such as batteries to provide load leveling and to provide energy for times when adequate illumination is not available.

Batteries 348 (FIG. 12) may initially have, or may develop, weak cells 354 having a reduced capacity relative to other cells of the battery such as battery cell 352. Batteries 348 may also develop charge imbalances where some battery cells 356 are in a lesser state of charge than others in the same battery. A further energy exchanger 350, as illustrated in FIG. 12, may operate during battery charging to transfer charging current from higher-voltage, more fully charged, cells to provide extra charging current to lower-voltage, less fully charged, cells and thereby act as a balancing charger. Energy exchanger 350 of FIG. 12 may also operate when the battery is under load to transfer energy from higher-voltage cells of greater capacity or charge state to supplement lower-voltage cells of lesser capacity or charge state, thereby serving as a load balancer. Both charger balancing and load balancer operation modes act together to permit more efficient use of battery capacity than may be available with standard battery systems. Basic energy exchanger operation is achieved with a constant duty cycle or constant voltage gain in bidirectional DC-DC converters 360, 362 and 364 in FIG. 12, regardless of charging or loading mode of operation for the battery cells, however more complex control strategies may be also be used to optimize function. In an alternative embodiment, battery cells 428 are replaced with alternative energy sources such as fuel cells, the energy exchanger operable to equalize voltages at cells of the system to make up for weak cells when the system is operated under load.

Energy exchanger 350 has bidirectional DC-DC converters 360, 362, 364, as do the exchangers of FIGS. 6 and 11, and an energy transfer bus 358. All DC-DC converters 360, 362, 364 of energy exchanger 350 may be turned off to reduce battery drain when the battery is neither being charged nor being drained by a significant load.

A solar power system 400 is illustrated in FIG. 13. In this system, there is a photovoltaic array 401 within which are modules 402, 404, 406, 408, 410, 412 coupled together in series-parallel configuration. Modules 402, 404 are, for example, coupled together in parallel, and in series with the parallel connection of modules 406 and 408. An energy exchanger 414 is provided to equalize outputs at the module level. In an embodiment, each module, such as module 402, may also have an energy exchanger, such as energy exchanger 416, to provide for equalization of output currents and voltages at the level of photovoltaic cells, such as cells 414, 418, of module 402 and as illustrated in FIG. 6. Array 401 provides an output 420 for connection to other elements of the system.

In a grid-tie embodiment of system 400, array output 420 is coupled to an MPPT grid-tie inverter 422 as known in the art for feeding power from the array into a commercial power grid. In an embodiment for use in stand-alone off-grid systems, grid-tie inverter 422 may be absent. In stand-alone off-grid systems, systems having energy storage for providing power to a commercial power grid at times of high power cost, and systems for providing standby power to a load, array output 420 is coupled to an MPPT charge controller 424 as known in the art for charging a battery system 426. In the embodiment of FIG. 13, array performance with the energy exchangers in each module 402, 404 has sufficiently linear characteristics that standard MPPT charge controllers will work with the system. Battery system 426 has multiple battery cells 428 and has, for example, an energy exchanger 430 approximately as illustrated in the battery system of FIG. 12.

In stand-alone off-grid systems, battery system 426 is, for example, coupled to power an inverter 432 for providing alternating current to a load 434. In many systems, inverter 432 is coupled to load 434 through a transfer switch 436 such as may be used to allow powering load 434 from a standby diesel generator during times of extraordinary load demand or times of severe weather when battery system 426 has become depleted. In standby systems that are configured to allow power sales to the commercial power grid at high-cost power times, battery system 426 may also be coupled to grid tie inverter 422.

In an embodiment, the energy exchangers of FIG. 13 operate as previously discussed with reference to FIG. 6 to allow all cells of all modules to operate efficiently in a balanced manner.

In alternative embodiments, the bidirectional DC-DC converters or interface devices of the energy exchangers of FIGS. 6, 11, 12, 13, and 15 are implemented as a pair of unidirectional DC-DC converters, one carrying power in each direction between the two ports of the converter. In these embodiments, voltages on each port may differ since step-up converters, such as boost and flyback converters, may be used in one direction and step-down converters, such as buck converters, may be used in the other direction; such implementations permit use of higher voltages and thinner wires for the energy transfer bus than practical with equal-voltage embodiments. Further, each unidirectional converter in each interface unit may be separately controlled by a microcontroller, such that power transfers in the energy exchanger may be controlled with considerable precision.

While some types of bidirectional DC-DC converters, such as the bidirectional charge-pump DC-DC converter of FIG. 9, do not provide for voltage step-up or step-down between the ports of the converter, other types of DC-DC converters can provide voltage transformation. For example, the Cuk converters of FIGS. 7 and 8 can be operated with asymmetrical control waveforms to switching devices 160, 162 to provide a step-up or step-down of voltage between port 154 coupled to the transfer bus and the port 152 coupled to the photovoltaic device.

The above-described self-regulating energy exchangers using bidirectional DC-DC converters operate to maintain uniform voltage across each series-connected photovoltaic device. While this will provide operation close to the maximum power point for many devices in many systems, it does not actually detect and operate at a maximum power point for each device.

In some systems having photovoltaic devices of different types, including systems having multiple junction stacked or split spectrum devices where some junctions may predictably have maximum power point voltages differing from those of other junctions in the system, voltage gains of the bidirectional DC-DC converters may be adjusted to provide a predetermined voltage ratio between junctions, cells, or devices of a first type and junctions, cells, or devices of a second type. The voltage ratio is determined such that both the first and second types operate near their maximum power points.

There may be some photovoltaic devices in a system that will produce power with slightly greater efficiency if operated at a true maximum power point. MPPT tracking of individual devices also allows the use of cells of different types and electrical characteristics in the same array while achieving individual MPPT of each cell. For these reasons, an energy exchanger having local MPPT capability may be provided for use in a solar module or array in FIG. 6, FIG. 11 or FIG. 13, while individual gain adjustments can be used for different types or capacities of battery cells in FIG. 12.

An alternative embodiment of an energy exchanger 500 having local MPPT capability, that may be used in systems such as those illustrated in FIGS. 11 and 13, is illustrated in FIG. 14. In energy exchanger 500, each port, such as port 530, 532, for connection to a photovoltaic device 502, 504 couples through an interface device 534, 536, to an energy transfer bus 514. Each interface device 534, 536 is provided with voltage and current monitors 506 for monitoring at least a voltage across, and in some cases a current through, photovoltaic device 502, 504. There may be two, three, or more ports 530, 532 for connection to photovoltaic devices and corresponding interface devices 534, 536. Only two ports are illustrated in FIG. 14 for simplicity.

Each port 530, 532 connects to an interface device 534, 536, for bidirectionally coupling energy between the port and an energy transfer bus, such as bus 514. Each interface device 534, 536 has a DC-DC converter 510, 512 of a type that is controllable by pulse-width modulation or pulse-rate modulation of a control signal for transferring power from each port 530, 532 to a transfer bus 514 and a smoothing capacitor 516. Each interface device 534, 536 also has a second DC-DC converter 520, 522 of a type that is controllable by pulse-width modulation or pulse-rate modulation of a control signal for transferring power to each port 530, 532 from the transfer bus 514.

A processor 524 is provided for receiving current and voltage measurements from voltage and current monitors 506 and for determining a maximum power point under current conditions for each photovoltaic device 502, 504. The processor 524 is equipped with pulse width modulators as known in the art, and frequently available on commercially available control-oriented processors, for controlling DC-DC converters 510, 512, 520, 522. Processor 524 has firmware for providing appropriate pulse sequences to DC-DC converters 510, 512, 520, 522 to draw an appropriate amount of power from a presently high-producing photovoltaic device and for applying that power across a presently low-producing photovoltaic device.

In an embodiment, processor 524 is equipped with a communication port for communicating with other energy exchangers of a system, and for communicating diagnostic information—such as identification of particularly low-producing modules—to a laptop computer for display to system repair technicians.

While local microprocessor control is an inexpensive way of implementing central control of an energy exchanger, other control strategies are possible. In other embodiments, alternative control apparatus, such by way of example a field-programmable gate array, is fitted in place of processor 524. In an alternative embodiment resembling that of FIG. 11, a field programmable gate array is implemented in each intra-module energy exchanger 302, 306, while a microprocessor is used within an inter-module energy exchanger 330. In this embodiment inter-module energy exchanger 330 may control the intra-module energy exchangers 302, 306 through a communications link.

Since Cuk converters as discussed with reference to FIGS. 7 and 8, as well as some other types of bidirectional DC-DC converters having inductors, are capable of a controllable voltage transformation between ports, bidirectional DC-DC converters may also be used in an energy exchanging system for use in a solar module or array 701 that tracks a maximum power point for each photovoltaic device as illustrated in FIG. 16.

An alternative embodiment of an energy exchanger 700 having local MPPT capability, that may be used in systems such as those illustrated in FIGS. 11 and 13, is illustrated in FIG. 16. The alternative energy exchanger 700 may also be operable with different firmware as a battery balancer. In energy exchanger 700, each port, such as port 730, 732, 733 for connection to a photovoltaic device 702, 704, 705 couples through an interface device 734, 736, 737 to an energy transfer bus 714. Each interface device 734, 736, 737 is provided with voltage and current monitors 706 for monitoring at least a voltage across, and in some cases a current through, photovoltaic device 702, 704, 705. There may be filtering capacitors across each photovoltaic device 702, 704, 705. There may be two, three, or more ports 730, 732, 733 for connection to photovoltaic devices and corresponding interface devices 734, 736, 737. Only three ports are illustrated in FIG. 16 for simplicity.

Each port 730, 732, 733 connects to an interface device 734, 736, 737 for bidirectionally coupling energy between the port and an energy transfer bus, such as bus 714. Each interface device 734, 736, 737 has a DC-DC converter 710, 722, 712 of a type that is controllable by pulse-width modulation or pulse-rate modulation of control signals for transferring power between each port 730, 732, 733 and a transfer bus 714 and a smoothing capacitor 716.

A processor 724 is provided for receiving current and voltage measurements from voltage and current monitors 706 and for determining a maximum power point under current conditions for each photovoltaic device 702, 704, 705. The processor 724 is equipped with pulse width modulators as known in the art, and frequently available on-chip on commercially available control-oriented processors such as those in the Motorola 68HC11® (trademark of Freescale Semiconductor, Inc.) family, for controlling DC-DC converters 710, 712, 722.

Processor 724 has firmware for using the voltage and current monitor 706 of each interface device 734, 736, 737 to measure performance of the photovoltaic devices 702, 704, 705 attached to the interface device, and from those measurements to periodically determine a maximum power point MPP for each device 702, 704, 705. Processor 724 has firmware for dynamically determining an appropriate amount of power to draw from across each device 702, 704, 705 to maintain the determined MPP. Processor 724 has firmware for providing appropriate pulse sequences to DC-DC converters 710, 712, 722 to draw an appropriate amount of power from any presently high-producing photovoltaic device of devices 702, 704, 705 and for applying that power across a presently low-producing photovoltaic device of device 702, 704, 705 to maintain each photovoltaic device near its maximum power point MPP.

The Cuk converters of FIGS. 7 and 8 may be used in the embodiment of FIG. 16 as bidirectional DC-DC converters 710, 712, 722. When these converters are used, processor 724 may control pulses to each switching device 190, 192, 160, 162 of the converters independently to provide appropriate voltage transformation between the photovoltaic devices and the power transfer bus 714 and for an appropriate current draw from, or current provided to, each photovoltaic device. For example, processor 724 may control pulse widths to switching devices 190, 192, 160, 162 to obtain a desired voltage transformation, and pulse rates to the same devices to control current draw.

In an embodiment, processor 724 is equipped with a communication port for communicating with other energy exchangers of a system, and for communicating diagnostic information—such as identification of particularly low-producing modules—to a laptop computer for display to system repair technicians. In alternate embodiments, processor 724 is replaced with or supplemented by another control device, such as an analog control system. In an alternative embodiment, processor 724 is omitted and exchanger 700 is controlled by an external control system.

In an alternative embodiment of a solar module or solar array 600 embodying an energy exchanger or energy transfer device 602, bidirectional DC-DC converters 604, 606 are operable between port pairs as illustrated in FIG. 15. In this embodiment, bidirectional DC-DC converter 604 has a first or A port attached to a first photovoltaic device 610 and a second or B port attached to a second photovoltaic device 612. Bidirectional DC-DC converters 604, 606 may, but need not, be a fully isolated converter as previously discussed. Converter 604 may be an inverting converter such as a charge pump device similar to that of FIG. 9 or inverting Cuk converter similar to that illustrated in FIG. 8, with reversed polarity connection of either port A or port B to deliver a non-inverted voltage.

In this embodiment, DC-DC converter 604 serves to equalize voltage across photovoltaic devices 610 and 612 by transferring any extra current from the stronger of the devices 610, 612 to the weaker. Second DC-DC converter 606 serves to equalize voltages across photovoltaic devices 612 and 614 by transferring any extra current from the stronger of the devices 612, 614 to the weaker. Since the converters 604, 606 are daisy-chained in energy exchanger 602, the composite energy exchanger will also act to transfer excess energy between the pairs 610, 612 and 612, 614—passing energy from device 610 to device 614 will occur albeit subject to circuit losses in both converters 604, and 606. It should be noted that DC-DC converters 604, 606 individually contain at least one capacitor, and may include an inductor.

Where electronic switching devices are shown as field-effect transistors in the schematic diagrams of various DC-DC converters illustrated for use in the energy exchangers, it is expected that other types of electronic switching devices will also function in many of these converters with appropriate driving electronics. For example, bipolar transistors may be used in some versions of the energy exchanger.

It should be noted that the energy exchanger herein described need not handle the full output current or power of the array or module within which the exchanger resides. In typical applications, the exchanger handles only the differences between currents produced by the various cells or modules in an array. In an embodiment such as that of FIG. 11, the power handling capacity of each module-level energy exchanger 302, 306 may be substantially less than the output power rating of the module 304, 308 within which they reside, and the power handling capacity of the array-level exchanger 330 is substantially less than that of the series string of photovoltaic modules 304, 308 it serves.

In some embodiments, the energy exchanger disclosed herein may serve to transfer sufficient power across a shaded or broken cell or module, so that bypass diodes may not be required. It is also anticipated that in some embodiments, auxiliary circuitry may draw power from an energy exchanger bus, such as bus 316 in exchanger 302 of FIG. 11. Such auxiliary circuitry may include timing and control circuitry including oscillators and other circuitry that drive switching devices of DC-DC converters, voltage and/or current monitors 506, 706, processors 724, 524, communication circuits for coordinating operation of multiple energy exchangers, and other circuitry that does not directly handle the output power produced by the system.

In photovoltaic arrays, bypass diodes across cells or modules that are coupled to ports of an operating energy exchanger of the type herein disclosed are unnecessary because the energy exchanger will support output of a weak or shaded cell or module sufficiently that the cell or module should never have an output voltage that drops to zero or becomes reverse biased. Bypass diodes may nevertheless be provided to permit operation and prevent reverse-bias of cells and modules should the energy exchanger be disabled, or should power handling capacity of the energy exchanger be exceeded.

In certain embodiments, MPPT is provided on a per-cell basis, such as by using an energy exchanger having microcontroller control similar to those of FIG. 14 or 16, or by using another type of MPPT device, optionally in conjunction with one or more energy exchangers.

The amount of power processed by each of the energy exchanger's bidirectional DC-DC converters may vary widely depending on performance of the devices (e.g., photovoltaic devices) connected to the energy exchanger. Thus, at times, one or more of the bidirectional DC-DC converters may process little or no power, and under such conditions, converter power losses may outweigh system efficiency improvements associated with converter operation. To promote high efficiency during such lower power operating conditions, certain embodiments of the energy exchanger include bidirectional DC-DC converters that operate in one or more power saving modes, or shut down, when processing little or no power. In such embodiments, a relative or absolute amount of power processed by each bidirectional DC-DC converter is estimated, for example, from the magnitude of current transferred by the DC-DC converter, and the converter's operating mode is controlled accordingly. The operating mode of each bidirectional DC-DC converter in such embodiments is, for example, individually controlled to promote maximum system efficiency, as the magnitude of processed power can vary widely among the energy exchanger's DC-DC converters.

For example, in certain embodiments, each bidirectional DC-DC converter has a topology including an inductor (e.g., each converter is a SEPIC converter or a Cuk converter) and includes a constant frequency pulse width modulation (PWM) mode and a pulse frequency modulation (PFM) mode. As known in the art, PWM operation allows for efficient operation at large current loads, and PFM operation is typically more efficient than PWM operation under light current loads. In such embodiments, each converter, for example, operates in its PWM mode when transferring a current with a magnitude greater than or equal to a threshold value, and each converter operates in its PFM mode when transferring a current with a magnitude less than the threshold value. The threshold value may be dynamically adjusted to provide hysteresis between the PWM and PFM operating modes.

As another example, in certain embodiments, each bidirectional DC-DC converter has a topology including an inductor (e.g., each converter is a SEPIC converter or a Cuk converter) and includes a continuous conduction mode (CCM) and a discontinuous conduction mode (DCM). As known in the art, DCM is typically more efficient than CCM under light current load conditions. In such embodiments, each converter, for example, operates in CCM when transferring a current with a magnitude greater than or equal to a threshold value, and each converter operates in DCM when transferring a current with a magnitude less than the threshold value. The threshold value may be dynamically adjusted to provide hysteresis between CCM and DCM.

The hybrid mode PFM-DCM may provide more efficient DC-DC converter operation than the hybrid mode PWM-DCM under light load conditions. However, current transferred by a DC-DC converter tends to be more constant when operating in PWM-DCM than when operating in PFM-DCM mode. Thus, PWM-DCM may be preferable to PFM-DCM in applications when the energy exchanger is connected to photovoltaic devices, as photovoltaic devices typically operate most efficiently when providing a constant current.

As another example, in certain embodiments, each bidirectional DC-DC converter operates in a "hiccup" mode when the magnitude of its transferred current drops below a threshold value. In the hiccup mode, each bidirectional DC-DC converter is shut down but occasionally restarts to determine the magnitude of its transferred current. If the magnitude of its transferred current is above a threshold value, the converter remains operational. Otherwise, the converter shuts down again. The threshold value may be dynamically adjusted to provide hysteresis. In some embodiments, the bidirectional DC-DC converters include a PFM-DCM mode or a PWM-DCM in addition to a hiccup mode such that they operate in their hiccup mode at very light current magnitudes, in their PFM-DCM mode or PWM-DCM at moderate current magnitudes, and in their PWM-CCM mode at large current magnitudes.

As yet another example, consider the class of embodiments illustrated in FIGS. 14, 16 of the energy exchanger having controllable bidirectional DC-DC converters 710, 712, 722 with inductors in each converter. Such embodiments may incorporate the converters of FIGS. 7, 8, and 10. Consider also the class of embodiments having paired unidirectional converters 510, 520 where each of the unidirectional converters has inductors. Consider further that class of embodiments having current monitors 506, 706, and a controller such as processor 524, 724 for controlling operation of the energy exchanger. Certain embodiments of these classes of embodiments have controllers with the ability to switch operation of some or all of their converters between a low-current-capacity DCM and a high-current-capacity CCM as needed to handle currents in the exchanger.

There is generally a small energy cost whenever a switching device, such as switching device 224 or 232 of the SEPIC converter illustrated in FIG. 10, is switched. This energy cost occurs in part because the gate capacitance of each switching transistor must be charged and discharged each time the transistor is switched.

In these embodiments, processor 524, 724 monitors voltages at each photovoltaic device, and currents through each DC-DC converter of the energy exchanger. While doing so, processor 524, 724 computes a desired current through each DC-DC converter and compares this current to a threshold current between low-current operation and high-current operation. This computation is made individually for each converter in the exchanger, and updated regularly.

When processor 524, 724 determines that a particular converter of the energy exchanger need transfer only low currents, those converters are switched to the power-conserving, low-current-capacity, DCM mode. For example, the SEPIC converter of FIG. 10 may be operated in DCM, as illustrated in FIG. 17 for low power transfer from A port to B port. In this mode, a quiet time TQT is introduced between a time TCO when inductor 222 current reaches zero and rectifying switching device 232 shuts off and a time TON when switching device 224 next turns on. This reduces the power required to switch switching device 224 because fewer transitions of its gate occur per unit time than in normal, continuous conduction mode (CCM). Should system parameters change and current-carrying capability be greater than the converter can handle in DCM mode, as indicated when current exceeds the low vs. high current threshold, the controller switches those converters to CCM operation. In CCM the quiet time TQT is reduced to zero such that switching device 224 turns on at TCO.

Since current transferred by converters in the energy exchanger may vary widely across the exchanger because current produced by photovoltaic cells of the array may vary, each converter may be placed in CCM or DCM independently of other converters in the exchanger.

It should be noted that the energy exchanger's architecture may facilitate simple implementation of power saving modes. For example, absolute or relative power processed by each bidirectional DC-DC converter can be estimated from the magnitude of current transferred by the DC-DC converter, and each DC-DC converter's operating mode can be individually controlled based on the magnitude of its transferred current. In contrast, some prior art power maximizing devices do not lend themselves to simple implementation of power saving modes. For example, in the system disclosed in 2008/0236648, a constant current flows through all DC-DC converters, which prohibits operation of the converters in power saving modes such as pulse frequency modulation or discontinuous conduction modes, and also prohibits estimating processed power from transferred current.

U.S. Pat. No. 5,403,404 to Arya, et al. describes a stacked multijunction photovoltaic device having different bandgaps in each absorber layer of the junctions of the cell. In his device the absorbers have different ratios of silicon and germanium. U.S. Pat. No. 6,340,788 to King, et al. describes a stacked multijunction photovoltaic device having a lower junction of silicon and an upper junction of gallium arsenide. Similarly, US Patent Application No. 20100096001 of Sivananthan et al. proposes stacked multijunction photovoltaic devices with as many as five junctions, with silicon, germanium, or silicon-germanium at the bottom of the stack and upper cells of one or more Group II-VI semiconductors include CdTe, CdSe, CdSeTe, CdZnTe, CdMgTe, and CdHgTe. Other multijunction photovoltaic devices have been proposed or manufactured, including some with cells comprising CdInGaSe semiconductor absorber layers.

Another proposal is to use a three junction layered structure having a Gallium Indium Phosphide top cell, which absorbs primarily blue through yellow visible light, stacked on top of a Gallium Arsenide middle cell, which absorbs leaking visible light, as well as red and near-infrared wavelengths, layered on top of a Germanium substrate cell, which absorbs infrared wavelengths. This structure provides utilization of wavelengths from 300 to 1800 nanometers and may reach efficiency levels of 50% or more that are unreachable with prior single junction technology.

An issue with multiple-layer, including three junction layered, photovoltaic devices is that the voltages produced by each junction are different because the band gaps are different. For example, bandgaps of materials Ge: 0.7 eV, Si 1.1 eV, GaAs: 1.4 eV, GaInP2: 1.8 eV; these may translate to maximum power point voltages of approximately Ge: 0.4V Si: 0.55V, GaAs: 1.0V GaInP2: 1.2V. It should be noted that maximum power point voltage of a real cell or panel is affected by actual illumination, electrical resistance of layers and metallization, temperature, and other factors in addition to bandgap differences.

Another issue with three-layered photovoltaic devices is that the current produced by each junction in a layered photovoltaic device is proportional to the number of photons absorbed in the absorber layer of that junction, the number of photons absorbed in, and the number of photons passed to lower layers by, each layer depends on wavelength distributions of photons reaching that layer. Current produced in a layer will therefore depend somewhat on a color—or wavelength distribution—of light received by a panel, a panel exposed to "redder" light may produce proportionally more current in lower than upper layers than will a panel receiving "bluer" light. Color of incident light may vary with time of day, foliage, season, and sky cover as well as aging of encapsulants.

In the interest of simplicity, energy exchangers for multiple junction cells will be illustrated herein with two junctions, however the system is applicable to cells with any number of stacked junctions, and for any number of cells.

A stacked, multiple-layer, photovoltaic device is illustrated in FIG. 18. The device has a substrate 802, a back contact conductor layer 804, bottom semiconductor absorber 806 and junction 808 layers, a first transparent conductor layer 810, an upper semiconductor absorber layer 812, an upper junction layer 814, an upper transparent conductor layer 816, a patterned metallic top conductor layer 818, and a passivation or transparent protection layer 822; these layers are fabricated essentially as known in the art of stacked multijunction photovoltaic devices. Additional layers, such as dichroic reflector layers, barrier layers, and antireflection layers, may be incorporated into the photovoltaic device but are not shown here for simplicity.

In order to achieve a low-resistance connection to the first transparent conductor layer 810, and thereby low resistance connection to the boundary between upper and lower junctions of the stacked device, an additional patterned metallic conductor layer 824 and a patterned dielectric layer 826 may be added to the multijunction stacked photovoltaic device during fabrication of that device. In an alternative embodiment, FIG. 18A, trenches 827 are etched through upper absorber layer 812, upper junction layer 814, and upper transparent contact layer 816, to expose first transparent conductor layer 810, and a grid of metallic conductors 828 in contact with transparent conductor layer 810 is provided. This grid of metallic conductors is interdigitated with but does not contact, and is fabricated on the same layer as metallic top conductor 818. The resulting multijunction stacked photovoltaic device is symbolically illustrated in FIG. 19, where the upper cell 830 typically generates different voltage and current than lower cell 832 because of the bandgap differences in their materials. Further mismatches in current between upper and lower cell may also arise from differences in effective illumination of the stacked cells.

Similarly, stacked devices may comprise three junctions with low-impedance connections brought out for one or both inter-cell conductive layers. For example, a stacked device suitable for use with the present energy exchanger may have a top junction having a first bandgap suitable for short wavelength light, a middle junction having a second bandgap suitable for medium wavelength light, and a bottom junction having a third bandgap suitable for long wavelength light. In such an embodiment, a top contact makes electrical contact to the top junction, an upper-middle contact brings out an electrical contact between the top and middle junctions, a bottom-middle contact brings out an electrical contact to the boundary between middle and lower junctions, and a back contact makes electrical contact to the backside of the lower junction. Similar devices with stacks of four or more junctions could be constructed, and currents equalized in similar ways.

Stacked multiple junction devices operate by absorbing part of the spectrum of incident light in an upper junction, while allowing light of other wavelengths to pass through into other junctions that provide additional photocurrent at a lower junction. Split-spectrum devices can be constructed by placing a first, upper, single or multiple junction cell fabricated on a first substrate 813 over a second, lower, single or multiple junction cell fabricated on a second substrate 815 as illustrated in FIG. 18B, in such an embodiment with a two junction upper cell the layers may be identical to those previously discussed with reference to FIG. 18A. In such an embodiment with a one-junction lower cell, the lower cell may have a back-contact layer 807, an absorber layer 809, a heterojunction partner layer 811, transparent contact layer 799, and metal interconnect layers 798, where at least the heterojunction partner layer and absorber layer are fabricated of different materials than the absorber and heterojunction partner layers of the upper cell fabricated on the first substrate 813. Such multiple-substrate embodiments offer the advantage that high temperature processing of the junctions on the first substrate 813 does not affect junctions on the lower substrate 815, and vice versa.

Split-spectrum photovoltaic devices for use in concentrator applications can also be constructed by placing a first cell 817, equivalent to a lower cell and fabricated on a first substrate, at an angle in concentrated light 819 beneath a concentrator lens 821 and forming a dichroic, or other wavelength-selective, mirror on the first cell 817 surface, the dichroic mirror being arranged to reflect short-wavelength light onto second cell 823, fabricated on a second substrate, that absorbs the short-wavelength light and serves a similar function as upper cell in a device according to FIG. 18B. Typically, concentrator lens 821 is a flat Fresnel lens, or equivalently may be a concentrating arrangement of mirrors. Other arrangements for splitting spectra are possible with similar effect.

Split-spectrum photovoltaic devices fabricated on two or more substrates of the types illustrated in FIG. 18B or C, may have both cells 857, 859 electrically brought out separately, having a symbol as illustrated in FIG. 18D, with outputs 825, 851 separated. In this event, the upper cells may be coupled together electrically in series into an upper string with energy exchangers as heretofore described, and the lower cells coupled together electrically in series into a lower string with energy exchangers as heretofore described. Outputs of the two strings may then be combined at module, panel, or array output by using an MPPT controller and DC-DC up-converter (boost or buck-boost) on the string expected to provide a lower voltage, or by using an MPPT controller and DC-DC down-converter (buck or buck-boost) on the string expected to provide a higher voltage.

Alternatively, split-spectrum photovoltaic devices may have fewer leads brought out, with cells coupled in series and outputs 821, 851 bonded together into a single output terminal, the device also having additional outputs 853, 855; in a variant, outputs 821, 851 are bonded external to the split-spectrum photovoltaic devices. In this event, the circuits described herein as applicable to multijunction stacked devices with low resistance connection to a conductive layer between cells apply to those split-spectrum devices.

It has proved difficult to match or balance current production in stacked, multiple-junction, or split-spectrum photovoltaic devices, and to maintain matched current production as incident light color changes with weather, time of day, and seasons. Layered devices optimized for high efficiency of each junction may have mismatches of 30% or more in current production between junctions.

An energy-exchanger of the present device may find use in optimizing power output of a split-spectrum device with cells coupled in series or of multiple-junction stacked photovoltaic devices with low-impedance access to intermediate conductors by transferring power from high-current-producing junctions to low-current-producing junctions in the same string or stack. In particular, the multiple junction layered device of FIG. 18A may perform well with the energy exchanger of FIG. 21, 21A, 21B, 21C, 22, 23, 24, 25 or 26. In an embodiment, each multiple junction layered photovoltaic device has an energy exchanger operable across the junctions of the photovoltaic device so that some or all of the junctions of the device may operate at or near their MPP, thereby optimizing current production by each junction of the device. In another embodiment, a second stage exchanger operates across several multi junction layered photovoltaic devices, or several split-spectrum devices, each of which has an energy exchanger operable across the junctions of the device, to equalize current at the device level and optimize current production by the devices.

Several of the multiple junction devices of FIG. 18D or FIG. 19 may be used with an energy exchanger 831 having multiple, controllable, DC-DC converters as illustrated in FIG. 20. This exchanger 831 has some similarities to that of FIG. 16. In the embodiment 829 of FIG. 20, exchanger interface cells 833, 838, 840, 842 are provided for each junction of each multijunction stacked photovoltaic device. Each exchanger interface cell has a bidirectional, controllable, DC- DC converter 835 and a voltage, and in some embodiments a current, monitoring device 834 such as a voltage-measuring analog-to-digital converter or a channel of a common analog-to-digital converter associated with processor 844. Processor 844 receives information from monitoring devices 834 and provides control pulses to each of the controllable DC-DC converters 835. The DC-DC converters 835 pass power from across high-current-producing junctions, such as junctions 849, 850, of multijunction photovoltaic devices 846, 848 and a local power bus 852 filtered by storage capacitor 854 as previously discussed above, to extract power from highly productive junctions or cells, and add power across low producing junctions or cells, to maintain as many junctions in the module or array as possible at or near the maximum power points.

In order to perform similar equalization of output of multiple junction photovoltaic devices with simpler circuitry, an alternative embodiment 900 in FIG. 21 uses a separate energy exchanger 902, 904 for each junction type, such as lower junctions 906 or upper junctions 908 in the multijunction photovoltaic devices 910. These energy exchangers 902, 904 may be of the type previously discussed with reference to FIGS. 5 and 6, and may use DC-DC converters 912 of the type discussed with reference to FIGS. 7, 8, 9, 10, or may use commutated capacitors as DC-DC converters. These energy exchangers may run at a predetermined frequency, or may have their switching rate adjusted as discussed with reference to DCM and CCM modes above. Each energy exchanger 902, 904 serves to equalize cell voltage among the junctions 906, 908 of the same type and therefore serves to compensate for poor productivity by any one junction; for example exchanger 902 serves to equalize cell voltage among all lower junctions 906. Each exchanger has an associated energy storage capacitor 914, 916.

Since lower junctions 906 operate with longer wavelengths than upper junctions 908, voltages and currents developed by upper and lower junctions are typically different. A controllable, voltage-shifting, bidirectional, DC-DC converter 918, similar to those previously discussed with reference to 510, 512, 710, 712, 722, and which may comprise a separate buck converter for one direction and a boost converter for the other direction, or which may embody a true bidirectional level-shifting converter, is provided for transferring power between the energy storage capacitors 914, 916. In an embodiment, DC-DC converter 918 is similar to that previously discussed with reference to FIG. 7. Another embodiment uses a DC-DC converter 918 of the coupled-inductor Cuk type illustrated in FIG. 8, or the transformer-coupled type illustrated in FIG. 10. In an alternative embodiment, where current produced by a particular junction type, such as a lower junction, typically exceeds current produced by a different junction type, such as an upper junction, in the same stack or device, DC-DC converter 918 is a unidirectional converter such as a buck or boost converter, the converter operable to transfer energy from the junction types producing high current to the junction types producing lower current. In these embodiments, the DC-DC converter adapts for voltage differences between the junctions.

The embodiment of FIG. 21 has a controller 920 suitable for monitoring voltages at the energy storage capacitors 914, 916 and adjusting bidirectional converter 918 to transfer energy from whichever capacitor 914, 916 is associated with high-current-production to whichever capacitor is associated with low current production in order to maintain all junctions in order to prevent reverse-biasing any junctions and to maintain all junctions in a power producing mode near their maximum power point. Controller 920 may also communicate with additional maximum-power-point tracking battery charge controllers and other hardware of the system.

Energy storage capacitors 916 and 914 can be combined and converter 918 can be eliminated, if appropriate different voltage gains are set for the converters in 902 and 904 groups to compensate for the voltage differences at the associated junctions.

The embodiment of FIG. 21 may be adapted to photovoltaic devices of three heterogeneous junction types quite readily by providing an energy exchanger similar to those of 902, 904 for the third junction, and an additional controllable, voltage shifting, bidirectional, DC-DC converter, like that of 918, for power transfer between the energy storage capacitor of the additional energy exchanger and one of the energy storage capacitors 914, 916. The embodiment of FIG. 21 may be adapted to greater numbers of junction types by replacing bidirectional DC-DC converter 918 with a controllable energy exchanger of the type previously discussed with reference to FIG. 16.

As an alternative to the exchanger for each junction type of FIG. 21, and global energy exchanger of FIG. 20, an energy exchanger may be provided for each multiple junction stacked or split-spectrum device as illustrated in FIG. 22.

Where a panel 901 uses a stacked, multijunction, photovoltaic device 903 that has junctions that have maximum photocurrents that are predictably and significantly mismatched, thrifted energy transfer devices having unidirectional DC-DC converters may be provided in a first level of energy exchanger as illustrated in FIG. 21A, with bidirectional DC-DC converters reserved for a second level of energy exchanger. FIG. 21A illustrates two multijunction photovoltaic devices for simplicity, while it is anticipated that many embodiments will have more than two such devices. In this embodiment, the lower junction 905 of each device 903, 903A is of a type that typically produces significantly more current than does one or more upper junctions 907 of the same devices under most operating conditions. In a first stage 911 of energy transfer, a unidirectional DC-DC converter 909 is provided to draw power from the lower junction 905 of each device 903, 903A and to apply an output current across the upper junction 907 of that device. In some embodiments, unidirectional DC-DC converter 909 maintains a fixed voltage ratio between its input and its output, the ratio predetermined to position the junction attached to its input and the junction attached to its output at or near maximum power point voltages when the multijunction photovoltaic device operates under load; in some other embodiments, the unidirectional DC-DC converter 909 has a controller capable of sensing voltage and current flow, and of maintaining junction 905 at maximum power point. A second level of energy transfer, in the form of energy exchanger 913 having bidirectional DC-DC converters 915, 917, provides for any mismatches in current production that may exist between devices 903, 903A by operating to transfer current from whichever device 903, 903A is higher producing to whichever device is lower producing within a module or panel. Energy exchanger 913 has bidirectional DC-DC converters 915, 917 as previously described. In an embodiment, energy storage capacitor 919 is provided. An additional level of energy transfer may be provided to transfer energy from high producing panels of a system to across low producing panels of the system to equalize current production across a series string of panels or modules in an array. In an embodiment, converters 909 are boost converters. In an embodiment, each converter 909 operates to maintain a maximum power point (MPPT) voltage across the lower cell.

In an alternative embodiment, upper cells 907 have two or more stacked photovoltaic junctions, and in a variation a stage of energy exchanger as herein described is provided to equalize current output between stacked junctions of upper cells 907.

Another embodiment 931 of a photovoltaic subunit for use with multijunction photovoltaic devices is illustrated in FIG. 21B; it is anticipated that each of these subunits replaces one photovoltaic device 907 and associated boost converter 909 in the series string with associated energy exchanger illustrated in FIG. 21A. In this embodiment, one junction 933 is not in series with output terminals 935, while remaining junction(s) 937 are coupled in series with output terminals 935. In this embodiment, current provided by the isolated junction 933 powers a buck-boost converter 939 coupled to provide current across output terminals 935. In embodiments where there is more than one remaining junction 937, an additional bidirectional (or unidirectional if remaining junctions 937 are predictably mismatched) DC-DC converter 941 is provided to equalize current production in remaining junctions 937. The output terminals 935 of multiple subunits 931 may then be electrically coupled in series, with additional stages of energy exchanger as described herein, to complete a panel, array, or system. In some embodiments, unidirectional buck-boost DC-DC converter 939 maintains a fixed voltage ratio between its input and its output, the ratio predetermined to position the junction attached to its input and the junction attached to its output at or near maximum power point voltages when the multijunction photovoltaic device operates under load; in some other embodiments, DC-DC converter 939 has a controller capable of sensing voltage and current flow, and of maintaining junction 933 at maximum power point. In some embodiments bidirectional DC-DC converter 941 has a voltage gain predetermined according to junction types such that it will maintain a ratio of voltages between junctions 937 that will keep both junctions operating near their maximum power point, in some other embodiments, DC-DC converter 941 has a controller capable of sensing voltage and current flow, and of maintaining both junctions 937 at maximum power point.

The embodiments of FIG. 21A and FIG. 21B act to transfer power from a high current bottom cell 905, 933 to boost available current from series-connected upper cell or cells 907, 937. In an alternative embodiment of a photovoltaic subunit 949, illustrated in FIG. 21C, a DC-DC converter 955 can also be used to boost current from upper cells 951, at the expense of upper cell voltage, to match current produced by lower cells 953, thereby permitting optimum power transfer in a system having multiple-junction photovoltaic devices. In the embodiment illustrated in FIG. 21C, DC-DC converter 955 is a buck-type down-converter.

Another repeatable photovoltaic subunit for an alternative embodiment with multijunction stacked or split-spectrum devices, as illustrated in FIG. 21D, has a unidirectional step-up, typically a boost, converter 957 to transfer energy from a high current producing bottom junction 967 to across lower-current-producing upper junctions 963, 965, and a bidirectional DC-DC converter 959 for equalizing current produced by upper junctions 963, 965. In an embodiment, the repeatable subunit of FIG. 21D have outputs strung in series with an energy exchanger across the subunits to equalize current production by the subunits.

The circuits shown with one and two upper cells, with one lower cell, in FIG. 21, and FIG. 21A-D may also be built with other photovoltaic cell designs, including four junction designs having three top cells and one bottom cell. Similarly, the circuits shown are applicable to split-spectrum photovoltaic devices that have one or more junctions in a multiple junction stack forming a circuit equivalent of an upper cell that absorbs some wavelengths of light, and a physically separated cell having one or more other junctions that absorb remaining wavelengths of light. Devices having such physically separated cells may also maintain separate upper and lower strings with separate energy exchangers for each string, with a buck converter to reduce voltage of the higher-voltage string, or a boost converter to boost voltage of the lower-voltage string, at a panel output point where the two strings are tied together.

In an exemplary system the energy exchangers of FIG. 20, 21 21A, or 21B are embedded within each photovoltaic module assembly of an array.

FIG. 22 illustrates an alternative embodiment of the energy exchanger 930 for use with multijunction photovoltaic devices 932, 934, having an integrated exchanger 938 for each multijunction device. This embodiment has an advantage that the maximum voltage differences handled by each exchanger are small, allowing integration of the exchanger into an integrated circuit. Each integrated exchanger 938 of exchanger 930 embodiment has an exchanger subunit 940, 942, 944; where each subunit has a controllable, bidirectional, DC-DC converter 948, 950, 952, and a voltage (and optionally current) monitor device 954, 956, 958, and each subunit is coupled to receive power from one junction of the multijunction photovoltaic device 932 associated with the integrated exchanger 938. Each integrated exchanger has a controller 960 to ensure that the converters 948, 950, 952 are operated in a way that maximizes power extracted from the photovoltaic device 932.

In an alternative embodiment, controller 960 operates to maintain a predetermined ratio of voltages between junctions, the ratio predetermined to provide near-optimum power transfer from each of the junctions of the multijunction photovoltaic devices. Such an embodiment, which maintains an approximate maximum power point, has advantage in that monitoring of voltage ratios is simpler to implement than monitoring current to find an actual maximum power point.

In yet another alternative embodiment, controller 960 may operate energy exchangers 940, 942 and 944 at different predetermined constant duty cycles, to accommodate different voltages for each junction inside the cell 932, simplifying the circuit and making it less expensive to build. While this arrangement may not deliver MPP in all conditions, it can be sufficiently beneficial to consider for simplicity and low cost.

In this embodiment, each additional multifunction photovoltaic device 934 is associated with a separate integrated exchanger, such as integrated exchanger 936; and balance between devices is obtained by matching devices. In an alternative embodiment, a second level of exchanger is used across the devices within a module, and a third level between modules of an array.

In an embodiment, the DC-DC converters of integrated exchanger 938 do not have to be isolated, although they could be, rather they have circuitry as illustrated in FIG. 23. The integrated exchanger of FIG. 23 has three junction connections Vjunc1, Vjunc2, Vjunc3 each coupled to a junction terminal of an associated stacked multijunction photovoltaic device 988, with Vjunc1 connected to the lowest voltage terminal, Vjunc2 the middle, and Vjunc3 the highest voltage junction terminal of the device, and each connection operates through a reversible boost converter to drive storage capacitor 980 to a voltage equal to, or higher than, the highest voltage of the junction connections. The local ground, Vjunc0, may in embodiments be coupled in series with Vjunc3 of another photovoltaic device, and serves as a local return for the converters. The bi-directional boost converter operates as a buck converter when operated to transfer power from storage capacitor 980 to a junction terminal Vjunc1, Vjunc2, or Vjunc3. Local exchanger ground is coupled to the negative terminal Vjunc0 of the stacked photovoltaic device. Each bi-directional boost converter 982, 984, 986 has at least one inductor and at least two switching devices as illustrated, as well as additional circuitry including a controller (not shown for simplicity) for such functions as driving the switching devices and controlling the converters to optimize power extraction from the stacked photovoltaic device. The controller may operate in manner similar to that described with reference to controller 960 of FIG. 22. In some embodiments, boost converter switching control signals (e.g., PWM switching control signals) are phase shifted from one reversible boost converter 982, 984, 986 to another to promote small ripple current magnitude on node 970 and to reduce the likelihood of switching current induced electromagnetic interference. Additionally, one or more of energy storage inductors 971, 972, 973 of reversible boost converters 982, 984, 986 may be magnetically coupled to promote low ripple current magnitude in inductor windings, printed circuit board conductors, and boost converter switching devices, thereby promoting high efficiency and low current stress.

In an alternative embodiment illustrated in FIG. 24, since converter subunit 982 from FIG. 23 can be designed to have a voltage gain of one, and converters 984 and 986 a voltage gain near the ratio of a normal voltage at Vjunc3 to a voltage at Vjunc2 or Vjunc1 respectively, converter subunit 982 is replaced with a wire. The junction terminals Vjunc3, Vjunc2, and Vjunc1, couple to a stacked photovoltaic device in a manner similar to that of FIG. 23. The remaining converter subunits 985, 987, operate as boost converters in the forward direction conveying power to the capacitor 981, or as buck converters in the reverse direction as described with reference to FIG. 23. In this way, a functional energy exchanger for three junctions can be constructed with only two DC-DC converters, while for N junctions only N−1 DC-DC converters are required, where N is greater than or equal to two. Actual power transfers between the junction terminals are determined by switching patterns of the switching transistors as determined by control circuitry, not shown in FIG. 24 for simplicity. Typically, the control circuitry operates by monitoring voltages at each of the junction terminals and adjusts switching patterns of the switching transistors to maintain a ratio between voltages at each junction that has been determined to optimize power output from the photovoltaic device. Each converter in FIGS. 23-26 has a switching device in series with an inductor as shown.

An integrated energy exchanger for use with stacked multijunction devices can also be constructed from buck-type converters as illustrated in FIG. 25 instead of the boost configuration of FIG. 23. The integrated exchanger of FIG. 25 has three junction connections Vjunc1, Vjunc2, Vjunc3 each coupled to a junction terminal of an associated stacked multijunction photovoltaic device (not shown for simplicity) in manner similar to FIG. 23. Each junction connection Vjunc1, Vjunc2, Vjunc3 couples through a buck-configured converter 990, 992, 994 to transfer power to a capacitor 996; the converters 990, 992, 994 are reversible and therefore capable of operation as boost-configured converters to transfer power from the capacitor 996 to one or more of the junction connections Vjunc1, Vjunc2, Vjunc3.

By setting voltage gain of the lower converter 994 of the integrated exchanger of FIG. 25 to one, and controlling the voltage gain of the other converters appropriately, a functional energy exchanger for three junctions can be constructed with only two DC-DC converters, while for N junctions only N−1 DC-DC converters are required, where N is greater than or equal to two, as illustrated in FIG. 26, where converter 991 corresponds to converter 990 of FIG. 25, and converter 993 corresponds to converter 992 of FIG. 25.

In certain embodiments of the energy exchangers of FIGS. 25 and 26, buck converter switching signals are phase shifted among buck converters 990, 992, 994 and among buck converters 991, 993 to promote low ripple current magnitude on nodes 998 and 999, thereby promoting low ripple current magnitude through the energy storage capacitor and possible corresponding photovoltaic device junctions electrically coupled to these nodes. Low ripple current magnitude through photovoltaic device junctions promotes maximum power transfer from the junctions. In some embodiments of the energy exchangers of FIGS. 25 and 26, two or more buck inductors (e.g., buck inductors 975, 976, 977) are magnetically coupled, in addition to being phase shifted, to promote low ripple current magnitude in inductor windings, printed circuit board conductors, and buck converter switching devices, thereby promoting high efficiency and low current stress.

A module may be assembled by attaching an integrated exchanger of the type illustrated in FIGS. 23 through 26 to each of several multijunction photovoltaic devices as illustrated in FIG. 23, with the integrated exchangers isolated from each other. The multijunction photovoltaic devices are then stacked in series as illustrated in FIG. 22. An additional energy exchanger may be provided at module level, where each converter of the module-level exchanger couples to the top junction of each multijunction device. An array may be assembled from several such modules connected in series, and an array-level exchanger may be provided as illustrated in FIG. 13.

A thrifted energy exchanger 1000 is illustrated in FIG. 27, having isolated DC-DC converters or commutated capacitor DC-DC converters, and derived from that of FIG. 6 by effectively placing capacitor 138 in parallel with a photovoltaic device 1008 to obtain a capacitor 1010. This energy exchanger therefore has N−1 DC-DC converters, for N photovoltaic devices 1002, 1004, 1006, 1008. The DC-DC converters 1012, 1014, 1016 of the thrifted energy exchanger 1000 may be free-running converters having a fixed voltage gain of one, or may alternatively be controllable converters. If the converters 1012, 1014, 1016 are controllable converters, the converters 1012, 1014, 1016 operate under control of controller 1022 having analog-to-digital voltage monitoring apparatus 1020 for monitoring voltages across each photovoltaic device 1002, 1004, 1006, 1008. In principle, the thrifted energy exchanger 1000 is applicable to any number N photovoltaic devices in a module, or in a panel. For relatively low voltage applications, non-isolated converters can be used. In the embodiment of FIG. 27, the converters 1012, 1014, 1016 essentially cooperate to regulate the voltage at the capacitor 1010.

Occasionally, it may be found that the sum of maximum power point voltages for series-connected photovoltaic devices in an array is less than a desired array output voltage or system battery voltage, requiring a voltage boost to optimally drive the load. In this case, a voltage-boosting, or series-connected, energy exchanger 1000 resembling that of FIG. 27 may be used, in a configuration where one photovoltaic device, typically top photovoltaic device 1008, is omitted. This embodiment may use DC-DC converters 1012, 1014, 1016 operating under control of a controller 1022 and voltage monitor 1020. In an alternative embodiment, voltage monitor 1020 also has current monitoring capability, the output current port Iout from the exchanger is coupled directly to a battery pack in a photovoltaic power system, and controller 1022 has firmware adapted to locate and maintain photovoltaic devices 1002, 1004, 1006 at their maximum power points. In an embodiment, controller 1022 has a configuration switch to set a battery voltage, and to thereby configure a voltage gain for the DC-DC converters. In this manner, for example, an energy exchanger having two DC-DC converters and coupled to two, series-connected, photovoltaic panels each having an open-circuit output voltage of 18 volts and maximum power point of 13 volts may be used to charge either a 36-volt or a 48-volt battery. It should be noted that the higher the DC-DC converter 1012, 1014, 1016 voltage gain from photovoltaic device 1002, 1004, 1006 to capacitor 1010, the greater percentage of system power flows through the converters 1012, 1014, 1016, and the greater potential for power loss in the system.

Omitting photovoltaic device 1008 from the FIG. 27 system may advantageously allow achieving maximum power extraction in applications where a number of energy exchangers 1000 with corresponding cells 1002, 1004, 1006 and capacitors 1010 are electrically coupled in series. In particular, voltage across each capacitor 1010 in these circuits connected in series can be regulated, and the voltage across capacitor 1010 typically can have a wide range of values without affecting maximum power extracted from photovoltaic devices 1002, 1004, 1006. Thus, total output voltage, and therefore total output current Iout, can be adjusted by varying voltage across capacitor 1010 without affecting power generated by photovoltaic devices 1002, 1004, 1006. However, when multiple instances of energy exchanger 1000 are electrically coupled in series, output current Iout must be the same for all energy exchanger 1000 instances. In such applications, the ability to adjust voltage across capacitor 1010 allows for each instance of energy exchanger 1000 to maximize power extracted from its respective photovoltaic devices 1002, 1004, 1006 even though output current Iout magnitude cannot be varied due to the series connection. Similarly, if a number of instances of energy exchanger 1000 are connected in parallel, each instance must have the same output voltage, which will be achieved by independently varying the voltage across capacitor 1010 in the exchangers. Then each individual output current of parallel connected energy exchangers Io magnitude can be set to maximize power extracted from photovoltaic devices 1002, 1004, 1006 that are coupled to different energy exchangers connected in parallel.

In certain embodiments, the magnitude and/or polarity of voltage across capacitor 1010 is regulated. Such feature permits arbitrary selection of total system output voltage from FIG. 27, thereby enabling energy exchanger 1000 to operate in applications that constrain either output current Iout or total output voltage. For example, such embodiments may maximize power extracted from photovoltaic devices in applications where energy exchanger 1000 is electrically coupled either in series with an external system that constrains Io or in parallel with an external system that constrains total output voltage.

For some applications, including some low voltage applications, non-isolated step-up converters can be used instead of the isolated converters illustrated in FIG. 27. An alternative embodiment of the energy exchanger 1030 using non-isolated boost converters 1031, 1032, 1033 is illustrated in FIG. 27A with return wire of each connected to the negative pin of cell 1031 instead of the negative pin of the capacitor 1034. Similarly, an alternative to the embodiment of FIG. 28 has non-isolated step down converters, such as buck converters. Semiconductor devices for such non-isolated converters can be integrated on a single chip, which may also include driver and control functions.

It is understood also that alternative embodiment 1038 (FIG. 28) of the energy exchanger previously described with reference to FIG. 27, with or without one photovoltaic device 1008 omitted, may be constructed such that polarities are reversed, such that capacitor 1010 is relocated to be a capacitor 1036 at the negative end of a string of photovoltaic devices 1040, 1042; such an exchanger has multiple DC-DC converters 1037 and operates in manner previously described with reference to FIG. 27.

In alternate embodiments of the systems of FIGS. 27 and 28, an energy exchanger capacitor is electrically coupled between photovoltaic devices in a series string of photovoltaic devices. A respective photovoltaic device may or may not be electrically coupled in parallel with the capacitor.

In the embodiments 1000, 1038, of FIGS. 27, 28, it is not necessary for all power generated by the photovoltaic devices 1002, 1004, 1006, 1008, 1040, 1042, to pass through the DC-DC converters 1016, 1014, 1012, 1037 because some current can flow directly from photovoltaic device 1002 into series connected photovoltaic device 1004. For purposes of this document, configurations where only part of system power flows through DC-DC converters because at least some current flows directly from one photovoltaic device, or battery cell, to another, are known as partial-power energy exchangers; those with a photovoltaic device, or battery cell, that produces at least some photocurrent at each step of the series-connected chain of photovoltaic devices or battery cells are further also known as partial-current energy exchangers. Similarly, configurations such as those voltage-boosting embodiments described with reference to FIG. 27 or 28 with a photovoltaic device removed, where only part of system power flows through DC-DC converters because at least some current flows directly from one photovoltaic device, or battery cell, to another, but where the full output current of the system is provided by DC-DC converters, are known as partial-power, full-current energy exchangers.

Embodiments where the full current and full power of all photovoltaic devices in the array pass through DC-DC converters are known herein as full-power, full-current, exchangers. In the full-power exchanger embodiment 1045 of FIG. 29, in block 1046, for example, all power produced by photovoltaic devices 1058, 1060, passes through DC-DC converters and all load current passes through DC-DC converters. In the embodiment 1045 of FIG. 29, most power produced by photovoltaic devices 1058, 1060 passes through converter 1052, and most power produced by photovoltaic device 1068, 1070 passes through converter 1062. Bidirectional upconverters 1054, 1064 are provided to optimize power production by series devices 1058, 1060, and 1068, 1070. In this embodiments 1045, local controller 1056 independently adjusts power transfer and voltage gain of each converter 1054, 1056, to maintain each device 1058, 1060 at their separately-determined maximum power points while developing a block output voltage V1 on a local summing bus 1055.

Block 1048 operates similarly to block 1046, although at a different voltage level. Local controller 1066 independently adjusts power transfer and voltage gain of each converter 1062, 1064 independently to maintain each device 1068, 1070 at their separately-determined maximum power points, while developing a block output voltage V2 on a local summing bus 1065. Any additional blocks in the string, such as block 1072, operate similarly.

Similar to the FIG. 27 system, certain embodiments of the FIG. 29 system can operate to maximize power extracted from their respective photovoltaic devices in applications that constrain either total output voltage or output current. However, in the FIG. 29 embodiment, block output voltages (e.g., V1, V2) are directly regulated by the blocks' DC-DC converters (e.g., 1052, 1054, 1062, 1064). Thus, an arbitrary positive total output voltage can be obtained, constrained by the voltage gain characteristics of DC-DC converters, even with DC-DC converters (e.g., 1052, 1054, 1062, 1064) that are not capable of providing a negative output voltage.

Unlike prior systems, such as that of FIG. 4, having a single block of parallel controllers passing power from photovoltaic devices onto a typically fixed-voltage summing bus, multiple blocks are placed in series to provide an output sum voltage at an array output node 1073 to drive a load 1075; and the voltage gain of each block is independently controlled by a system controller 1074. Load 1075 may, for example, be a battery in a battery-charging photovoltaic system, or a grid-tie inverter in a gird-connected photovoltaic system.

In an alternative embodiment, operable without a system controller 1074, each block controller 1056, 1066, operates to maintain photovoltaic devices of that block at maximum power point while maintaining an output voltage, such as voltage V1 or V2, at the highest voltage level possible given output current drawn by the load, while maintaining output voltage at less than a predetermined block-maximum output voltage level. Such operation will tend to apportion output voltages in a string according to power available in each block but may result in overcharging a battery load unless a battery charge controller is also provided.

In embodiments having system controller 1074, system controller 1074 monitors load voltage V3 and determines whether and how much power is absorbable by the load 1075. When power is absorbable by the load 1075, system controller 1074 also apportions load voltage V3 among individual block voltages, such as block 1046 voltage V1, and block 1048 voltage V2, such that all blocks operate at or close to the maximum power points of the photovoltaic devices 1058, 1060, 1068, 1070 within them while providing appropriate current and voltage to the load, and instructs the individual block controllers 1056, 1066 accordingly. When power is not absorbable by the load, such as when the load is a fully charged battery, system controller 1074 may instruct controllers 1056, 1066 to operate with one or more converters 1052, 1054 shut down, to operate with photovoltaic devices at other than their maximum power points, or alternatively may enable a secondary or dump load 1078.

For example, in a system for operation remote from a power grid load 1075 may be a storage battery and inverter system as known in the art for driving off-grid electrical loads, and secondary load 1078 may be an electric auxiliary heating system. Similarly, in a system having a primary load of storage batteries for operation of critical systems or for mobile operations, and a grid connection, system controller 1074 may enable a grid-connected inverter as secondary load 1078 when primary load 1075 batteries are fully charged. Such systems may be of use with a motor home or yacht having roof-mounted photovoltaic devices 1058, 1060, but which spends part of each year in storage. When the motor home or yacht is in storage, system controller 1074 may enable a grid-connected inverter as secondary load 1078 to dump excess power produced by the photovoltaic devices into the national power grid through an appropriate metering device. When the motor home or yacht is in mobile operation, primary load 1075 may include charging storage batteries used to operate such typical mobile electric loads as water pumps, refrigerators, electronic communications, navigation and entertainment devices, automatic sail-trimming and steering devices, and electric lights.

Short wavelength, such as blue, light is absorbed preferentially by cloud, while longer wavelength, such as infrared, light passes through cloud with much less attenuation. This results in the cloud-shaded (solid circles) and unshaded (open circles) currents produced by a typical three junction stacked cell as illustrated in FIG. 30. It is also apparent that the shorter-wavelength top and middle junctions produce current that somewhat tracks each other when shaded by cloud, while the bottom, longer-wavelength, junction produces current that, although reduced somewhat, becomes relatively much stronger than current produced by the top and middle junctions.

In order to take advantage of the tracking of top 1102 and middle junction 1104 current in shaded conditions, while using all power available from the bottom junction 1106, a thrifted energy-exchanger circuit like that of FIG. 31 may be used. In this embodiment, filtering capacitors 1108 provide filtering of voltage transients induced by switching currents. Switching transistors 1110 and 1112, and inductor 1114, form the active elements of a DC-DC converter operating under control of control circuitry 1116.

In the embodiment of FIG. 31, in a boost mode operable when bottom junction 1106 is shaded by cloud and produces significantly greater current than that produced by top 1102 and middle 1104 junctions, has inductor 1114 build current when switching transistor 1110 conducts, and switching transistor 1112 acts as a diode; in this mode energy is transferred from bottom junction 1106 to top 1102 and middle 1104 junctions. In a buck mode operable when bottom junction 1106 is in full sun and produces less current than that produced by top 1102 and middle 1104 junctions, inductor 1114 builds current when switching transistor 1112 conducts, and switching transistor 1110 acts as a diode; in this mode energy is transferred from top 1102 and middle 1104 junctions to bottom junction 1106.

The circuit in FIG. 31 can also be used with split-spectrum cells, where junction 1106 is a separate junction 859 as shown in FIG. 18D.

In an alternative embodiment having cross section as illustrated in FIG. 32 a bottom junction top contact and upper junction bottom contact are brought out separately. While FIG. 32 illustrates a two junction stack, the separate bottom junction top contact and upper junction bottom contact are applicable to stacks with other numbers of junctions. The device illustrated has a substrate 1152, a back contact conductor layer 1154, bottom semiconductor absorber 1156 and junction 1158 layers, a first transparent conductor layer 1160, an upper semiconductor absorber layer 1162, an upper junction layer 1164, an upper transparent conductor layer 1166, a patterned metallic top conductor layer 1168, and a passivation or transparent protection layer 1172; these layers are fabricated essentially as known in the art of stacked multijunction photovoltaic devices. Additional layers, such as dichroic reflector layers, barrier layers, and antireflection layers, may be incorporated into the photovoltaic device but are not shown here for simplicity.

In order to achieve a low-resistance connection to the first transparent conductor layer 1160, and thereby low resistance connection to the top of the lower junction of the stacked device, an additional patterned metallic conductor layer 1174 and a patterned dielectric layer 1176 may be added to the multijunction stacked photovoltaic device during fabrication of that device, the conductor 1174 serving to bring out current from the lower junction, and the dielectric layer 1176 serving to insulate the top of the lower junction from the bottom transparent contact 1178 layer of the upper junction. Similarly, a patterned metallic conductor layer 1180 is provided to provide low resistance connectivity to the bottom transparent contact 1178 layer of the upper junction.

In some embodiments, inductors illustrated in the schematics are formed of the parasitic inductance of long interconnect wires. In other embodiments, physical inductors are used to implement these circuits.

A module may be divided into sections 1202, 1204 (FIG. 33). In an embodiment each section has series strings of one or more multiple photovoltaic devices, multiple junction photovoltaic devices, or split spectrum devices, equipped with energy exchangers as described herein to maintain maximum power point operation within each section. These sections may in turn be coupled such that each section provides power through a separate section DC-DC converter with the section DC-DC converters coupled in series, as illustrated in FIG. 33, to provide a module or panel output 1206. In the embodiment of FIG. 33, multiple junction or split-spectrum photovoltaic devices 1208, 1210 have high-current-producing junctions 1212 and lower current producing junctions 1214, 1216. A simple energy exchanger, here having one bidirectional DC-DC converter 1220, is provided to transfer energy from the higher-current-producing junction to the lower-current-producing junction of junctions 1214, 1216, while a unidirectional energy transfer device, here a unidirectional step-up DC-DC converter 1218, transfers energy from high-current-producing junction 1212 and applies it across the low-current-producing junctions 1214, 1216. Power from all three junctions is applied to a section converter 1222 to provide section output. Several section outputs are strung in series to provide module or panel output 1206. In the embodiment of FIG. 33, converter 1220, 1218 and 1222 of each section cooperate to maintain maximum power production of junctions 1212, 1214 and 1216. In an alternate embodiment of FIG. 33, converters 1220, 1218 and 1222 of each section cooperate to maintain maximum output power production of each section.

In embodiments like that of FIG. 33, it is anticipated that in some embodiments the DC-DC converters of each section, including converters for transferring energy from higher-current-producing photovoltaic devices to lower-current-producing photovoltaic devices produced by the multiple junction or split-spectrum devices such as converters 1218, 1222, and the section converter 1222, have their controllers and active devices located within a single integrated circuit. Further, in some embodiments, the integrated circuits bearing the active devices of each converter, together with associated passive components such as inductors, are embedded into a module or panel along with the associate photovoltaic devices 1208, 1210. Similarly, it is expected that active devices associated with the converters associated with each block 1046, including converters 1052, 1054, and their controller 1056 are located within a single integrated circuit for each block, the integrated circuit being embedded into a module or panel along with associated photovoltaic devices.

In an alternative embodiment resembling that of FIG. 33, converters 1218 and 1220 operate with a fixed, predetermined, voltage gain from input to output, the gain predetermined to place all junctions of the devices approximately at their maximum power points when the devices operate under load.

In embodiments having more than one DC-DC converter, including the embodiments discussed with reference to FIG. 33, it may be desirable to operate the multiple DC-DC converters with transitions on each converter having timing offset, or phased, within a converter cycle from each other. Such phased designs offer benefits of noise reduction by at least partially cancelling ripple currents at their outputs and potentially permit coupled-inductor designs.

In embodiments having more than one DC-DC converter associated with a multiple junction device such as that illustrated in FIG. 33, advantage may result from both properly phasing the converters 1246, 1248 and magnetically coupling inductors 1252, 1254 of the DC-DC converters 1246, 1248 by winding inductors 1246, 1248 on a common core. It may also be desirable to magnetically couple inductor windings of two or more of the DC-DC converters 1222 provided at section outputs, to extend ripple cancellation to the inductor windings, printed circuit board conductors, and switching devices, thereby promoting higher efficiency and lower current stress.

Various embodiments are designated and have features as follows.

In an embodiment designated by A, an energy transfer device, comprising:
a first port coupled to a first interface unit, the first interface unit being coupled to a capacitor; a second port coupled to a second interface unit, the second interface unit being coupled to the capacitor; wherein the interface units are adapted to operate with the first port having a voltage offset from the second port; wherein the first interface unit is adapted to transfer energy between the first port and the capacitor, and the second interface unit is adapted to transfer energy between the second port and the capacitor; and wherein the first and second interface units are adapted to transfer energy from the first port to the capacitor and from the capacitor to the second port when energy available at the first port is greater than energy available at the second port, and wherein a terminal of the capacitor is coupled to a common return node.

In an embodiment designated by B, a system comprises an energy transfer device, the energy transfer device including: an energy exchange bus; N ports, N being an integer greater than one, each of the N ports being coupled to an energy port of one of N interface units, where each interface unit is coupled to an energy transfer bus and is capable of transferring energy bidirectionally between the energy port and the energy exchange bus; wherein the N interface units are adapted to operate with each of the N ports having a voltage offset relative to each of at least one other of the N ports; and wherein the interface units are adapted to pass energy from a high energy port of the N ports to the energy exchange bus and from the energy exchange bus to a low energy port of the N ports.

In an embodiment designated by C, the energy transfer device designated A or the system designated B, wherein the first and second interface units are adapted to transfer energy from the second port to the capacitor (or energy transfer bus if the parent is designated by B) and from the capacitor or bus to the first port when energy available at the second port is greater than energy available at the first port.

In an embodiment designated by D, the energy transfer device of the embodiment designated by C further comprising a third port coupled to a third interface unit, the third interface unit being coupled to the capacitor (or bus); wherein the third interface unit is adapted to operate with the third port having a voltage offset from the first port and from the second port; and wherein the interface units are adapted to transfer energy from a first selected port having a highest energy provided to the port, the first selected port selected from the group consisting of the first, second, and third ports, the energy being transferred to the capacitor (or bus), at least a portion of the energy being transferred from the capacitor (or bus) to a second selected port having a lowest energy provided to the port.

In an embodiment designated by E, the energy transfer device of the embodiment designated by D, the third interface unit comprises a bidirectional DC-DC converter including an inductor, the DC-DC converter adapted to operate in a continuous current conduction mode if a magnitude of current transferred by the DC-DC converter is greater than or equal to a threshold value, the DC-DC converter adapted to operate in a discontinuous conduction operating mode if the magnitude of current transferred by the DC-DC converter is less than the threshold value.

In an embodiment designated by F, the energy transfer device of the embodiment designated by C, wherein the energy transfer device further comprises auxiliary circuitry powered by energy drawn from the energy transfer bus.

In an embodiment designated by G, the energy transfer device of the embodiment designated by C, wherein each of the first and second interface units is a bidirectional charge pump converter.

In an embodiment designated by H, the energy transfer device of the embodiment designated by C wherein each of the first and second interface units is a bidirectional Cuk converter.

In an embodiment designated by I, the energy transfer device of the embodiment designated by C, wherein each of the first and second interface units is a bidirectional SEPIC converter.

In an embodiment designated by J, the energy transfer device of the embodiment designated by C, further comprising N energy sources, where each energy source is coupled to a separate port of the N ports of the energy transfer device, and wherein the energy sources are coupled in series.

In an embodiment designated by K, the energy transfer device of the embodiment designated by J, wherein switching devices of at least two interface units operate at constant frequency and duty cycle, and wherein energy flow acts to equalize voltages at ports of the energy transfer device.

In an embodiment designated by L, the energy transfer device of the embodiment designated by C, wherein the energy sources are battery cells and the energy transfer device operates to equalize voltages across the battery cells while the battery cells are charging.

In an embodiment designated by M, the energy transfer device of the embodiment designated by C, wherein the energy transfer device operates to equalize voltages across the energy sources while the energy sources are providing power to an output of the system.

The embodiment designated by M, wherein the energy sources are battery cells.

The embodiment designated by M, wherein the energy sources are fuel cells.

An embodiment designated by N, wherein the embodiment designated by M has N energy sources that are photovoltaic devices of a solar power system.

An embodiment designated by O, wherein the embodiment designated by N further has at least one of the photovoltaic devices further comprising: M photovoltaic cells, the M photovoltaic cells being coupled electrically in series; and a second energy transfer device, including: a second energy exchange bus; M ports, M being an integer greater than one, each of the M ports being coupled to an energy port of one of M interface units, where each interface unit is coupled to a second energy exchange bus and is capable of transferring energy bidirectionally between its energy port and the second energy exchange bus; wherein the M interface units are adapted to pass energy from a high energy port of the M ports to the second energy exchange bus and from the second energy exchange bus to a low energy port of the M ports; wherein each of the M ports of the second energy transfer device is coupled to a separate photovoltaic cell of the M photovoltaic cells.

In an embodiment designated by P, wherein the system of the embodiment designated by O has energy sources that are photovoltaic devices, and wherein the energy transfer device further comprises a controller configured and arranged to adjust a voltage gain of each interface unit based at least partially on a maximum power point of a respective photovoltaic device coupled to the interface unit.

In an embodiment designated by Q, wherein the system of the embodiment designated by P, further comprises an additional photovoltaic device coupled in parallel with one of the N photovoltaic devices.

In an embodiment designated by R, a solar photovoltaic array comprises: a first and a second photovoltaic device each having a positive and a negative terminal, the first photovoltaic device being capable of producing a first electric current at a first voltage when illuminated, and the second photovoltaic device being capable of producing a second electric current at a second voltage when illuminated; wherein the first and the second photovoltaic devices are coupled electrically together in series with the positive terminal of the first photovoltaic device coupled to the negative terminal of the second photovoltaic device; and an energy transfer device having a first terminal coupled to the negative terminal of the first photovoltaic device, a second terminal coupled to the positive terminal of the first photovoltaic device and to the negative terminal of the second photovoltaic device, and a third terminal coupled to the positive terminal of the second photovoltaic device, the energy transfer device being capable of receiving energy from its first and second terminals and providing energy to its second and third terminals if a first parameter selected from the group consisting of the first current and the first voltage is greater than a second parameter selected from the group consisting of the second current and the second voltage, and of receiving energy from its second and third terminals and providing energy to its first and second terminals if the second parameter is greater than the first parameter.

The embodiment designated by R, wherein the energy transfer device comprises at least a first capacitor, and wherein receiving energy from its first and second terminals and providing energy to its second and third terminals is performed by alternately coupling the first capacitor across the first and second terminals, and across the second and third terminals.

The embodiment designated by R, wherein the energy transfer device comprises at least a first inductor, and wherein receiving energy from its first and second terminals is performed by alternately closing and opening a first switching device, the first switching device coupling the first inductor across the first and second terminals.

An embodiment designated by S, wherein the embodiment designated by R, has an energy transfer device that comprises at least a first inductor, and wherein receiving energy from its first and second terminals is performed by alternately closing and opening a first switching device, the first switching device coupling the first inductor across the first and second terminals, and wherein the energy transfer device comprises a bidirectional Cuk converter.

The embodiment designated by S, wherein the Cuk converter is a transformer isolated Cuk converter.

The embodiment designated by R, wherein the energy transfer device comprises at least a first inductor, and wherein receiving energy from its first and second terminals is performed by alternately closing and opening a first switching device, the first switching device coupling the first inductor across the first and second terminals, and wherein the energy transfer device comprises a bidirectional capacitively-isolated Cuk converter.

The embodiment designated by R, wherein the energy transfer device comprises at least a first converter stage having an inductor having a first terminal coupled to a first terminal of the stage, and a second terminal coupled through a first switching device to a second terminal of the stage, and a first capacitor having a first terminal coupled to the second terminal of the inductor and to a first terminal of a second inductor, a second switching device coupled from the first terminal of the second inductor to a third terminal of the stage; and wherein the first and second terminals of the first stage are coupled to terminals of the energy transfer device.

The embodiment designated by R, further comprising a third photovoltaic device having a negative terminal coupled to the positive terminal of the second photovoltaic device, the third photovoltaic device being capable of producing a third current at a third voltage when illuminated; wherein the energy transfer device has a fourth terminal coupled to a positive terminal of the third photovoltaic device, and wherein the energy transfer device is capable of receiving energy from its first and second terminal and providing energy to its third and fourth terminals if the first current is greater than the third current.

The embodiment designated by R, wherein the first and second photovoltaic devices are factory-assembled modules comprising multiple photovoltaic cells and adapted for field assembly into a multiple-module photovoltaic array.

The embodiment designated by R, wherein the photovoltaic array is a factory-assembled module adapted for field assembly into a multiple-module photovoltaic array, and wherein the first and second photovoltaic devices are photovoltaic cells within the module.

An embodiment designated by T, wherein the embodiment designated by R further has the first photovoltaic device comprising at least a first and second photocell electrically connected in series with the second photovoltaic device, and a second energy transfer device is coupled to transfer energy from terminals of a high producing photocell selected from the group consisting of the first photocell and the second photocell of the first photovoltaic device, and to transfer the energy to terminals of a low producing photocell selected from the group consisting of the first photocell and the second photocell of the first photovoltaic device.

In an embodiment designated by U, the embodiment designated by T, wherein the first photovoltaic device is a factory-assembled module incorporating the second energy transfer device and adapted for field assembly into a photovoltaic array.

The embodiment designated by U, further comprising a third photovoltaic device coupled in parallel with the first photovoltaic device.

In an embodiment designated by V, the embodiment designated by T, further comprising a charge controller and a battery.

The embodiment designated by V, further comprising an energy transfer device coupled to balance charge in the battery by transferring energy from a high voltage cell of the battery to a low voltage cell of the battery.

The embodiment designated by T, further comprising a grid-tie inverter, energy from the photovoltaic devices being coupled to power the grid-tie inverter, the grid-tie inverter capable of synchronously feeding energy into an alternating-current power distribution system.

In the embodiment designated by R, wherein the energy transfer device is a transformer-coupled bidirectional converter.

In the embodiment designated by R, wherein the photovoltaic array is capable under standard conditions of producing power substantially in excess of a power rating of the energy transfer device.

An embodiment of a solar photovoltaic array designated by W and comprising: a first, a second, and a third photovoltaic device each having a power output port having positive and negative terminals, the first photovoltaic device being capable of producing a first electric current at a first voltage when illuminated, the second photovoltaic device being capable of producing a second electric current at a second voltage when illuminated, and the third photovoltaic device being capable of producing a third electric current at a third voltage when illuminated; wherein the power output ports of the first, the second, and the third photovoltaic devices are coupled electrically together in series; an energy transfer device having a first port coupled to the power output port of the first photovoltaic device, a second port coupled to the power output port of the second photovoltaic device, and a third port coupled to the power output port of the third photovoltaic device, the energy transfer device being capable of receiving energy from its first port and providing energy to its second port if a first parameter selected from the group consisting of the first current and the first voltage is greater than a second parameter selected from the group consisting of the second current and the second voltage, and of receiving energy from its second port and providing energy to its first port if the second parameter is greater than the first parameter; and wherein the energy transfer device is capable of receiving energy from the first port and providing energy to its third port if the first parameter is greater than a third parameter selected from the group consisting of the third current and the third voltage, and of receiving energy from its third port and providing energy to its first port if the third parameter is greater than the first parameter.

The photovoltaic array designated by W, wherein the energy transfer device comprises at least a first and a second converter stage, where each converter stage comprises: an inductor having a first terminal coupled to a first terminal of a first port of the converter stage; a switching device for coupling a second terminal of the inductor to a second terminal of the first port of the converter stage; an isolation capacitor having a first terminal coupled to the second terminal of the inductor and a second terminal coupled to transfer power between the first port of the converter stage and a second port of the converter stage; wherein the first port of the first converter stage is coupled to the first port of the energy transfer device; the first port of the second converter stage is coupled to the second port of the energy transfer device; and the second port of the first and second converter stages are coupled together and to a common energy storage device.

An embodiment of a system designated by X comprising a first energy transfer device for transferring energy from a high-producing device to a low-producing device, the first energy transfer device, comprising: a first port for coupling to a first photovoltaic device; a second port for coupling to a second photovoltaic device; a controller for determining a port attached to a low producing device selected from the group consisting of the first port and the second port, and for determining a port attached to a high producing device selected from the group consisting of the first port and the second port; at least a first inductor, and a first switching device coupled in series with the first inductor, the first inductor being coupled to the first port; wherein the energy transfer device is operable with the first and the second ports coupled together in series; and wherein energy transfer from the first port is performed by a method comprising alternately closing and opening the first switching device at a high frequency, and wherein opening the first switching device disconnects at least one terminal of the inductor from the first port.

The system designated by X, wherein the energy transfer device is incorporated into a module for assembly into a photovoltaic array, the module further comprising at least a first photovoltaic device coupled to the first port and a second photovoltaic device coupled to the second port, wherein each of the first and the second photovoltaic devices comprises a photovoltaic cell.

An embodiment designated by Y of the system designated by X, further comprising at least one photovoltaic module coupled to the first port of the first energy transfer device and at least one photovoltaic module coupled to the second port of the first energy transfer device, wherein each photovoltaic module comprises at least a plurality of series-connected photovoltaic cells assembled to a common module substrate.

An embodiment designated by Z of the embodiment of the system designated by Y wherein at least one photovoltaic module further comprises a second energy transfer device capable of transferring energy from at least one high-producing photovoltaic cell of the module to a lower-producing photovoltaic cell of the module.

The embodiment designated by Z, wherein at least one port of the first energy transfer device is coupled to at least two photovoltaic modules coupled together in parallel.

The embodiment designated by X, wherein the first inductor is part of a CUK converter.

A system designated by AA and comprising a first energy transfer device for transferring energy from a high-current-producing junction of a first stacked multijunction photovoltaic device to a low-current-producing junction of the photovoltaic device, the first energy transfer device comprising: a first port for coupling to the high-producing junction of the photovoltaic device; a second port for coupling to the low-producing junction of the photovoltaic device; at least a first inductor coupled to at least one port selected from the group consisting of the first and second port, and a first switching device coupled in series with the first inductor; and a controller for monitoring voltages at the high-current-producing and low-current-producing junctions and for determining switching of the first switching device to maintain at least an approximate maximum power point for each junction of the multijunction photovoltaic device.

A system designated by AB according to the system designated by AA further comprising a second energy transfer device for transferring energy from a high-current-producing junction of a second stacked multijunction photovoltaic device to a low-current-producing junction of the second photovoltaic device, the second energy transfer device, comprising: a third port for coupling to the high-producing junction of the second photovoltaic device; a fourth port for coupling to the low-producing junction of the second photovoltaic device; and at least a second inductor coupled to at least one port selected from the group consisting of the third and fourth port, and a second switching device coupled in series with the second inductor.

A system according to the system designated by AB further comprising a third energy transfer device for transferring energy from the first stacked multijunction photovoltaic device to the second stacked multijunction photovoltaic device.

An embodiment designated by AC comprises a system for driving a load comprising: a first DC-DC converter coupled to transfer power from a first energy source to a capacitor; and a second DC-DC converter coupled to transfer power from a second energy source to the capacitor; wherein the first and second energy sources, and the capacitor, are coupled electrically in series to drive the load; and wherein the energy sources are selected from the group consisting of photovoltaic devices, batteries, and fuel cells.

An embodiment of the system designated by AC wherein the energy sources are batteries An embodiment of the system designated by AC wherein the energy sources are photovoltaic devices.

An embodiment designated by AD comprises a system for driving an electrical load comprising: a plurality of blocks, the blocks having outputs electrically coupled together in series, each block further comprising a first photovoltaic device coupled to power a first controllable DC-DC converter, the first controllable DC-DC converter coupled to power the output of the block; a second photovoltaic device coupled to a second controllable DC-DC converter, the second DC-DC converter coupled to power the output of the block, and a controller; wherein the controller of each block comprises apparatus for determining a maximum power point for the first and for the second photovoltaic device, and apparatus for controlling the first and the second DC-DC converter to operate the DC-DC converters at the maximum power point while maintaining the output of each block at less than a predetermined maximum voltage.

The embodiment designated by AD further comprising a controller for monitoring a load voltage and for apportioning desired output voltages among the plurality of blocks.

An embodiment designated by AE comprises a subsystem comprising: at least one multiple junction stacked photovoltaic device; at least a first DC-DC converter coupled to transfer energy from a high-current-producing junction of the at least one stacked multijunction photovoltaic device to across at least a low-current-producing junction of the photovoltaic device, the high-current-producing junction electrically coupled in series with the low-current-producing junction; a controller for monitoring voltages at the high-current-producing and low-current-producing junctions and configured to determine switching of at least one switching device of the first DC-DC converter.

The embodiment designated by AE wherein the controller optimizes power output from the multijunction photovoltaic device by determining switching of the at least one switching device of the at least one DC-DC converter to maintain both the high-current-producing and low-current-producing junctions at approximately their respective maximum power points when the system is coupled to provide power to a load.

An embodiment designated by AF comprises the embodiment designated by AE wherein the multiple junction stacked photovoltaic device comprises at least three junctions, and further comprising a second DC-DC converter coupled to transfer energy from a second high-current-producing junction of the at least one stacked multijunction photovoltaic device to across at least one low-current-producing junction of the photovoltaic device.

The embodiment designated by AF wherein the controller optimizes power output from the multijunction photovoltaic device by determining switching of the at least one switching device of the first DC-DC converter and switching of at least one switching device of the second DC-DC converter to maintain both the second high-current-producing and the at least one low-current-producing junctions at approximately their respective maximum power points when the system is coupled to provide power to a load.

The embodiment designated by AF wherein the first and second DC-DC converter cooperate to optimize power output of the multiple junction stacked device.

The embodiment designated by AF wherein the first and second DC-DC converter cooperate to optimize power output of the subsystem.

An embodiment designated by AG of the embodiment designated by AF wherein at least the first DC-DC converter is a bidirectional converter.

The embodiment designated by AG wherein the second DC-DC converter is a unidirectional converter.

An embodiment designated by AH of a subsystem comprising: at least a first photovoltaic device selected from the group consisting of a multiple junction stacked photovoltaic device having a plurality of photovoltaic junctions coupled electrically in series, and a split-spectrum photovoltaic device having a plurality of photovoltaic junctions coupled electrically in series; at least a first bidirectional DC-DC converter coupled to transfer energy between an output of the first photovoltaic device and at least one specific junctions of the at least a first photovoltaic device; a controller configured to determine switching of at least one switching device of the first DC-DC converter to optimize power output from the first photovoltaic device.

The embodiment designated by AH wherein the controller monitors voltages at junctions of the first photovoltaic device to control switching of the at least one switching device.

The embodiment designated by AH wherein the subsystem provides power through a second DC-DC converter, and further comprising at least a second photovoltaic device selected from the group consisting of a multiple junction stacked photovoltaic device having a plurality of photovoltaic junctions coupled electrically in series, and a split-spectrum photovoltaic device having a plurality of photovoltaic junctions coupled electrically in series; at least a third bidirectional DC-DC converter coupled to transfer energy between an output of the second photovoltaic device and at least one specific junctions of the at least the second photovoltaic device; a fourth DC-DC converter coupled to receive power from the second photovoltaic device; and wherein outputs of the second and fourth DC-DC converters are electrically coupled in series.

An embodiment designated by AJ of the embodiment designated by AH further comprising a second photovoltaic device electrically coupled in series with the first photovoltaic device, and a second bidirectional DC-DC converter coupled to transfer energy between the first photovoltaic device and the second photovoltaic device to equalize current, thereby optimizing output power of the first and second photovoltaic devices.

The embodiment designated by AJ wherein the photovoltaic devices are stacked multiple-junction devices, and wherein the first and second DC-DC converter cooperate to optimize power from at least one junction of the photovoltaic devices.

The embodiment designated by AJ wherein the photovoltaic devices are stacked multiple junction devices, and wherein the first and second DC-DC converter cooperate to optimize power from the subsystem.

An embodiment designated by AK comprises a subsystem comprising at least a first and a second photovoltaic junction coupled to an energy transfer device adapted to equalizing current produced by the first and a second photovoltaic junction, the first photovoltaic junction capable of producing more current than the second photovoltaic junction, the energy transfer device comprising a DC-DC converter coupled to transfer energy from the first to at least the second photovoltaic junction.

An embodiment designated by AL of the embodiment designated by AK further comprising a third photovoltaic junction and a second DC-DC converter, the third photovoltaic junction capable of producing less current than the first and second photovoltaic junctions, the second DC-DC converter coupled to transfer energy from at least the first to at least the third photovoltaic junction.

The embodiment designated by AL wherein the first and second DC-DC converters have an output coupled across the second and third photovoltaic junctions, and the second DC-DC converter has an input coupled across the first and second photovoltaic junctions.

The embodiment designated by AL wherein the first and second DC-DC converters operate with a fixed, predetermined, gain.

The embodiment designated by AL wherein the first and second DC-DC converters operate with switching transitions phase-offset between converters.

The embodiment designated by AL wherein inductors of the first and second DC-DC converters are magnetically coupled.

Certain changes may be made in the above methods and systems without departing from the scope hereof, and the matter contained in the above description or shown in the accompanying drawings should be interpreted as illustrative and not in a limiting sense. Those skilled in the art should appreciate that items as shown in the embodiments may be constructed, connected, arranged, and/or combined in other formats without departing from the scope of the invention. The following claims cover all generic and specific features of the invention described herein, and all statements of the scope of the invention which, as a matter of language, might be said to fall therebetween.

What is claimed is:

1. An energy transfer device, comprising:
   a first bidirectional DC-DC converter electrically coupled between a first port and a capacitor;
   a second bidirectional DC-DC converter electrically coupled between a second port and the capacitor, such that the first bidirectional DC-DC converter, the second bidirectional DC-DC converter, and the capacitor are electrically coupled in parallel with each other;
   wherein the bidirectional DC-DC converters are adapted to operate with the first port having a voltage offset from the second port;
   wherein the first bidirectional DC-DC converter is adapted to transfer energy between the first port and the capacitor, and the second bidirectional DC-DC converter is adapted to transfer energy between the second port and the capacitor, such that the capacitor acts as a shared energy storage device for each of the first and second bidirectional DC-DC converters; and
   wherein the first and second bidirectional DC-DC converters are adapted to transfer energy from the first port to the capacitor and from the capacitor to the second port when energy available at the first port is greater than energy available at the second port, and
   wherein a terminal of the capacitor is directly electrically coupled to a common return node.

2. The energy transfer device of claim 1, wherein the first and second bidirectional DC-DC converters are adapted to transfer energy from the second port to the capacitor and from the capacitor to the first port when energy available at the second port is greater than energy available at the first port.

3. The energy transfer device of claim 2, further comprising a third port coupled to a third bidirectional DC-DC converter, the third bidirectional DC-DC converter being coupled to the capacitor;
   wherein the third bidirectional DC-DC converter is adapted to operate with the third port having a voltage offset from the first port and from the second port; and
   wherein the bidirectional DC-DC converters are adapted to transfer energy from a first selected port having a highest energy provided to the port, the first selected port selected from the group consisting of the first, second, and third ports, the energy being transferred to the capacitor, at least a portion of the energy being transferred from the capacitor to a second selected port having a lowest energy provided to the port.

4. The energy transfer device of claim 1, wherein the energy transfer device further comprises auxiliary circuitry powered by energy drawn from the capacitor.

5. The energy transfer device of claim 1, wherein each of the first and second bidirectional DC-DC converters is a bidirectional charge pump converter.

6. The energy transfer device of claim 1, wherein each of the first and second bidirectional DC-DC converters is a bidirectional Cuk converter.

7. The energy transfer device of claim 1, wherein each of the first and second bidirectional DC-DC converters is a bidirectional SEPIC converter.

8. An energy transfer device, comprising:
   a first port coupled to a first interface unit, the first interface unit being coupled to a capacitor;
   a second port coupled to a second interface unit, the second interface unit being coupled to the capacitor, such that the first interface unit, the second interface unit, and the capacitor are electrically coupled in parallel with each other; and
   a third port coupled to a third interface unit, the third interface unit being coupled to the capacitor;
   wherein the interface units are adapted to operate with the first port having a voltage offset from the second port;
   wherein the first interface unit is adapted to transfer energy between the first port and the capacitor, and the second interface unit is adapted to transfer energy between the second port and the capacitor;
   wherein the first and second interface units are adapted to transfer energy from the first port to the capacitor and from the capacitor to the second port when energy available at the first port is greater than energy available at the second port;
   wherein a terminal of the capacitor is directly electrically coupled to a common return node;
   wherein the first and second interface units are adapted to transfer energy from the second port to the capacitor and from the capacitor to the first port when energy available at the second port is greater than energy available at the first port;
   wherein the third interface unit is adapted to operate with the third port having a voltage offset from the first port and from the second port;
   wherein the interface units are adapted to transfer energy from a first selected port having a highest energy provided to the port, the first selected port selected from the group consisting the first, second, and third ports, the energy being transferred to the capacitor, at least a portion of the energy being transferred from the capacitor to a second selected port having a lowest energy provided to the port; and
   the third interface unit comprising a bidirectional DC-DC converter including an inductor, the DC-DC converter adapted to operate in a continuous current conduction mode if a magnitude of current transferred by the DC-DC converter is greater than or equal to a threshold value, the DC-DC converter adapted to operate in a discontinuous conduction operating mode if the magnitude of current transferred by the DC-DC converter is less than the threshold value.

9. A system comprising an energy transfer device, the energy transfer device including:
   an energy exchange bus;
   N ports, N being an integer greater than one; and
   N bidirectional DC-DC converters, each of the N bidirectional DC-DC converters electrically coupled between the energy exchange bus and a respective one of the N ports, each of the N bidirectional DC-DC converters being capable of transferring y bidirectionally between its respective one of the N ports and the energy exchange bus;
   wherein the N bidirectional DC-DC converters are adapted to operate with each of the N ports having a voltage offset relative to each of at least one other of the N ports; and
   wherein the N bidirectional DC-DC converters are adapted to pass energy from a high energy port of the N ports to the energy exchange bus and from the energy exchange bus to a low energy port of the N ports;
   wherein the N bidirectional DC-DC converters are either (a) bidirectional Cuk converters, (b) bidirectional SEPIC converters, or (c) bidirectional charge pump converters; and
   wherein the N bidirectional DC-DC converters are electrically coupled in parallel with the energy exchange bus.

10. The system of claim 9, wherein N is greater than or equal to three.

11. The system of claim 9, further comprising N energy sources, where each energy source is coupled to a separate port of the N ports of the energy transfer device, and wherein the energy sources are coupled in series.

12. The system of claim 11, wherein switching devices of at least two of the N bidirectional DC-DC converters operate at constant frequency and duty cycle, and wherein energy flow acts to equalize voltages at ports of the energy transfer device.

13. The system of claim 11, wherein the energy sources are battery cells and the energy transfer device operates to equalize voltages across the battery cells while the battery cells are charging.

14. The system of claim 11, wherein the energy transfer device operates to equalize voltages across the energy sources while the energy sources are providing power to an output of the system.

15. The system of claim 14 wherein, the energy sources are battery cells.

16. The system of claim 14 wherein, the energy sources are fuel cells.

17. The system of claim 14, wherein the N energy sources are photovoltaic devices of a solar power system.

18. The system of claim 17, wherein at least one of the energy sources further comprises:
   M photovoltaic cells, the M photovoltaic cells being coupled electrically in series; and
   a second energy transfer device, including:
      a second energy exchange bus;
      M ports, M being an integer greater than one, each of the M ports being coupled to an energy port of one of M interface units, where each interface unit is coupled to the second energy exchange bus and is capable of transferring energy bidirectionally between its energy port and the second energy exchange bus;

wherein the M interface units are adapted to pass energy from a high energy port of the M ports to the second energy exchange bus and from the second energy exchange bus to a low energy port of the M ports;

wherein each of the M ports of the second energy transfer device is coupled to a separate photovoltaic cell of the M photovoltaic cells.

19. The system of claim 11, wherein the energy sources are photovoltaic devices, and wherein the energy transfer device further comprises a controller configured and arranged to adjust a voltage gain of each bidirectional DC-DC converter based at least partially on a maximum power point of a respective photovoltaic device coupled to the interface unit.

20. The system of claim 17, further comprising an additional photovoltaic device coupled in parallel with one of the N photovoltaic devices.

21. A solar photovoltaic array, comprising:
a first and a second photovoltaic device each having a positive and a negative terminal, the first photovoltaic device being capable of producing a first electric current at a first voltage when illuminated, and the second photovoltaic device being capable of producing a second electric current at a second voltage when illuminated;
wherein the first and the second photovoltaic devices are coupled electrically together in series with the positive terminal of the first photovoltaic device coupled to the negative terminal of the second photovoltaic device; and
an energy transfer device having a first terminal coupled to the negative terminal of the first photovoltaic device, a second terminal coupled to the positive terminal of the first photovoltaic device and to the negative terminal of the second photovoltaic device, and a third terminal coupled to the positive terminal of the second photovoltaic device, the energy transfer device being capable of receiving energy from its first and second terminals and providing energy to its second and third terminals if a first parameter selected from the group consisting of the first current and the first voltage is greater than a second parameter selected from the group consisting of the second current and the second voltage, and of receiving energy from its second and third terminals and providing energy to its first and second terminals if the second parameter is greater than the first parameter;
wherein the energy transfer device comprises at least a first inductor, and wherein receiving energy from its first and second terminals is performed by alternately closing and opening a first switching device, the first switching device coupling the first inductor across the first and second terminals;
wherein the first photovoltaic device comprises at least a first and second photocell electrically connected in series with the second photovoltaic device, and a second energy transfer device is coupled to transfer energy from terminals of a high producing photocell selected from the group consisting of the first photocell and the second photocell of the first photovoltaic device, and to transfer the energy to terminals of a low producing photocell selected from the group consisting of the first photocell and the second photocell of the first photovoltaic device.

22. The photovoltaic array of claim 21, wherein the energy transfer device comprises a bidirectional Cuk converter.

23. The photovoltaic array of claim 22, wherein the Cuk converter is a transformer isolated Cuk converter.

24. The photovoltaic array of claim 21, wherein the energy transfer device comprises a bidirectional capacitively-isolated Cuk converter.

25. The photovoltaic array of claim 21, further comprising a third photovoltaic device having a negative terminal coupled to the positive terminal of the second photovoltaic device, the third photovoltaic device being capable of producing a third current at a third voltage when illuminated; wherein the energy transfer device has a fourth terminal coupled to a positive terminal of the third photovoltaic device, and wherein the energy transfer device is capable of receiving energy from its first and second terminal and providing energy to its third and fourth terminals if the first current is greater than the third current.

26. The photovoltaic array of claim 21, wherein the first and second photovoltaic devices are factory-assembled modules comprising multiple photovoltaic cells and adapted for field assembly into a multiple-module photovoltaic array.

27. The photovoltaic array of claim 21, wherein the photovoltaic array is a factory-assembled module adapted for field assembly into a multiple-module photovoltaic array, and wherein the first and second photovoltaic devices are photovoltaic cells within the module.

28. The photovoltaic array of claim 21, wherein the first photovoltaic device is a factory-assembled module incorporating the second energy transfer device and adapted for field assembly into a photovoltaic array.

29. The photovoltaic array of claim 28, further comprising a third photovoltaic device coupled in parallel with the first photovoltaic device.

30. The photovoltaic array of claim 29, further comprising a charge controller and a battery.

31. The photovoltaic array of claim 30, further comprising an energy transfer device coupled to balance charge in the battery by transferring energy from a high voltage cell of the battery to a low voltage cell of the battery.

32. The photovoltaic array of claim 21, further comprising a grid-tie inverter, energy from the photovoltaic devices being coupled to power the grid-tie inverter, the grid-tie inverter capable of synchronously feeding energy into an alternating-current power distribution system.

33. The photovoltaic array of claim 21, wherein the energy transfer device is a transformer-coupled bidirectional converter.

34. The photovoltaic array of claim 21, wherein the photovoltaic array is capable under standard conditions of producing power substantially in excess of a power rating of the energy transfer device.

35. A photovoltaic array, comprising:
a first, a second, and a third photovoltaic device each having a power output port having positive and negative terminals, the first photovoltaic device being capable of producing a first electric current at a first voltage when illuminated, the second photovoltaic device being capable of producing a second electric current at a second voltage when illuminated, and the third photovoltaic device being capable of producing a third electric current at a third voltage when illuminated;
wherein the power output ports of the first, the second, and the third photovoltaic devices are coupled electrically together in series;
an energy transfer device having a first port coupled to the power output port of the first photovoltaic device, a second port coupled to the power output port of the second photovoltaic device, and a third port coupled to the power output port of the third photovoltaic device, the energy transfer device being capable of receiving energy from its first port and providing energy to its second port if a first parameter selected from the group consisting of the first current and the first voltage is greater than a second parameter selected from the group consisting of the second current and the second voltage, and of receiving energy from its second port and providing energy to its first port if the second parameter is greater than the first parameter; and wherein the energy transfer device is capable of receiving energy from the first port and providing energy to its third port if the first parameter is greater than a third parameter selected from the group consisting of the third current and the third voltage, and of receiving energy from its third port and providing energy to its first port if the third parameter is greater than the first parameter;

wherein the energy transfer device comprises at least a first and a second converter stage, where each converter stage comprises:

a. an inductor having a first terminal coupled to a first terminal of a first port of the converter stage;

b. a switching device for coupling a second terminal of the inductor to a second terminal of the first port of the converter stage;

c. an isolation capacitor having a first terminal coupled to the second terminal of the inductor and a second terminal coupled to transfer power between the first port of the converter stage and a second port of the converter stage;

wherein the first port of the first converter stage is coupled to the first port of the energy transfer device; the first port of the second converter stage is coupled to the second port of the energy transfer device; and the second port of the first and second converter stages are coupled together and to a common energy storage device.

36. A system comprising:

a first energy transfer device for transferring energy from a high-producing device to a low-producing device, the first energy transfer device, comprising:

a first port for coupling to a first photovoltaic device;

a second port for coupling to a second photovoltaic device;

a controller for determining a port attached to a low producing device selected from the group consisting of the first port and the second port, and for determining a port attached to a high producing device selected from the group consisting of the first port and the second port;

at least a first inductor, and a first switching device coupled in series with the first inductor, the first inductor being coupled to the first port; and at least one photovoltaic module coupled to the first port of the first energy transfer device and at least one photovoltaic module coupled to the second port of the first energy transfer device, wherein each photovoltaic module comprises at least a plurality of series-connected photovoltaic cells assembled to a common module substrate;

wherein the energy transfer device is operable with the first and the second ports coupled together in series; and wherein energy transfer from the first port is performed by a method comprising alternately closing and opening the first switching device at a high frequency, and wherein opening the first switching device disconnects at least one terminal of the inductor from the first port;

wherein at least one photovoltaic module further comprises a second energy transfer device capable of transferring energy from at least one high-producing photovoltaic cell of the module to a lower-producing photovoltaic cell of the module.

37. The system of claim 36, wherein the first energy transfer device is incorporated into a module for assembly into a photovoltaic array, the module further comprising the at least one photovoltaic module coupled to the first port and the at least one photovoltaic module coupled to the second port.

38. The system of claim 36, wherein at least one port of the first energy transfer device is coupled to at least two photovoltaic modules coupled together in parallel.

39. The system of claim 36, wherein the first inductor is part of a CUK converter.

40. A subsystem, comprising:

at least a first photovoltaic device selected from the group consisting of a multiple-junction stacked photovoltaic device having a plurality of photovoltaic junctions coupled electrically in series, and a split-spectrum photovoltaic device having a plurality of photovoltaic junctions coupled electrically in series;

at least a first DC-DC converter coupled to transfer energy between an output of the first photovoltaic device and at least one specific junction of the at least a first photovoltaic device; and a controller configured to determine switching of at least one switching device of the first DC-DC converter to optimize power output from the first photovoltaic device;

wherein the subsystem provides power through a second DC-DC converter, and further comprising at least a second photovoltaic device selected from the group consisting of a multiple-junction stacked photovoltaic device having a plurality of photovoltaic junctions coupled electrically in series, and a split-spectrum photovoltaic device having a plurality of photovoltaic junctions coupled electrically in series; at least a third DC-DC converter coupled to transfer energy between an output of the second photovoltaic device and at least one specific junctions of the at least the second photovoltaic device; a fourth DC-DC converter coupled to receive power from the second photovoltaic device; and wherein outputs of the second and fourth DC-DC converters are electrically coupled in series.

* * * * *